(12) United States Patent
Haymore et al.

(10) Patent No.: US 12,331,155 B2
(45) Date of Patent: Jun. 17, 2025

(54) STRONG BINDING METAL-CHELATING RESINS USING MACROCYCLE MOLECULES

(71) Applicant: Sachem, Inc., Austin, TX (US)

(72) Inventors: Barry L. Haymore, Avon, IN (US); Sara S. Moghaddam, Dripping Springs, TX (US); Charles B. Little, Austin, TX (US); Ari K. Kar, Bee Cave, TX (US)

(73) Assignee: Sachem, Inc., Austin, TX (US)

( * ) Notice: Subject to any disclaimer, the term of this patent is extended or adjusted under 35 U.S.C. 154(b) by 206 days.

(21) Appl. No.: 17/736,559

(22) Filed: May 4, 2022

(65) Prior Publication Data
US 2022/0380520 A1   Dec. 1, 2022

Related U.S. Application Data

(60) Provisional application No. 63/183,946, filed on May 4, 2021.

(51) Int. Cl.
*C08G 59/14* (2006.01)
*C02F 1/42* (2023.01)
(Continued)

(52) U.S. Cl.
CPC ............ *C08G 59/1477* (2013.01); *C02F 1/62* (2013.01)

(58) Field of Classification Search
None
See application file for complete search history.

(56) References Cited

U.S. PATENT DOCUMENTS 4,650,866 A    3/1987  Rayudu
4,652,519 A    3/1987  Warshawsky et al.
(Continued)

FOREIGN PATENT DOCUMENTS

CN    102505480 B    8/2014
CN    104307495 A    1/2015
(Continued)

OTHER PUBLICATIONS

Cox et al., "Synthesis of C- and N-Functionalised Derivatives of 1,4,7-Triazacyclononane-1,4,7-triacetic acid (NOTA)," Journal of Chemical Society Perkin Transactions I, issue 9, (1990), pp. 2567-2576. (Year: 1990).*

(Continued)

*Primary Examiner* — Ha S Nguyen
(74) *Attorney, Agent, or Firm* — Michael E. Carmen

(57) ABSTRACT

A metal-chelating resin includes (a) a compound represented by Formula (I):

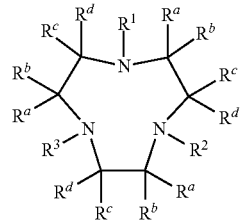

or a stereoisomeric form thereof or a salt thereof, wherein $R^1$, $R^2$, $R^3$, $R^4$, $R^a$, $R^b$, $R^c$ and $R^d$ are as defined herein; and (b) an organic polymer resin having at least one comple- (Continued)

mentary reactive functional group covalently linked with at least one linking group of the compound represented by Formula (I).

19 Claims, 3 Drawing Sheets

(51) Int. Cl.
  *C02F 1/44* (2023.01)
  *C02F 1/62* (2023.01)
  *C02F 1/68* (2023.01)
  *H04B 7/06* (2006.01)
  *H04B 7/08* (2006.01)

(56) References Cited

U.S. PATENT DOCUMENTS

| | | | |
|---|---|---|---|
| 5,874,573 | A | 2/1999 | Winchell et al. |
| 5,891,574 | A * | 4/1999 | Guilard ............... C08F 12/32 428/404 |
| 5,962,183 | A | 10/1999 | Rahman et al. |
| 6,646,157 | B2 | 11/2003 | McKearin |
| 6,774,228 | B1 | 8/2004 | Parker et al. |
| 7,083,732 | B1 | 8/2006 | Chollet et al. |
| 8,431,734 | B2 | 4/2013 | Nawrocki et al. |
| 9,981,967 | B2 | 5/2018 | Denat et al. |
| 2006/0030619 | A1 | 2/2006 | Liu et al. |
| 2014/0058072 | A1 | 2/2014 | Bhushan et al. |
| 2014/0073780 | A1 | 3/2014 | Bhushan et al. |
| 2014/0088314 | A1 | 3/2014 | Grimmond et al. |
| 2014/0142298 | A1* | 5/2014 | Denat ............... C07D 401/14 540/465 |
| 2014/0271461 | A1* | 9/2014 | Reb ............... A61P 35/00 525/360 |
| 2015/0336996 | A1 | 11/2015 | Caravan et al. |
| 2015/0361116 | A1 | 12/2015 | Lamarque et al. |
| 2018/0194766 | A1 | 7/2018 | Tatum et al. |
| 2020/0254398 | A1 | 8/2020 | Hamzik et al. |
| 2022/0105476 | A1 | 4/2022 | Hamzik et al. |

FOREIGN PATENT DOCUMENTS

| | | | |
|---|---|---|---|
| CN | 106824124 | A | 6/2017 |
| CN | 107353360 | A | 11/2017 |
| EP | 0299795 | B1 | 3/1992 |
| EP | 0523572 | A1 | 1/1993 |
| EP | 0290041 | B1 | 12/1993 |
| WO | 1989001476 | A1 | 2/1989 |
| WO | 1992022583 | A2 | 12/1992 |
| WO | 1993003045 | A1 | 2/1993 |
| WO | 1997044313 | A1 | 11/1997 |
| WO | 1999033521 | A1 | 7/1999 |
| WO | 2001045696 | A1 | 6/2001 |
| WO | 2001046114 | A1 | 6/2001 |
| WO | 2007028639 | A1 | 3/2007 |
| WO | 2010099536 | A2 | 9/2010 |
| WO | 2010133907 | A1 | 11/2010 |
| WO | 2014052087 | A1 | 4/2014 |
| WO | 2014107722 | A1 | 7/2014 |
| WO | 2016207265 | A1 | 12/2016 |
| WO | 2016207266 | A1 | 12/2016 |
| WO | 2017007807 | A1 | 1/2017 |
| WO | 2017027834 | A1 | 2/2017 |
| WO | PCT/US2022/027635 | | 9/2022 |
| WO | WO-2022204065 | A1 * | 9/2022 ............. A61K 49/10 |

OTHER PUBLICATIONS

Feng Liang, et al., "A convenient synthesis of octahydropyrazino[1,2-a]pyrazine," Synthetic Communications, 2004, pp. 845-851, 34(5).
Feng Liang, et al., "Synthesis and antitumor activities of hydroxyl-substituted macrocyclic polyamines and their complexes," Chem. J. Internet, 2003, 3 pages, 5(1).
Guo Ping Xue, et al., "A practical synthesis of novel hydroxyl-substituted macrocyclic triamines, tetramines, and hexamines," Chinese Journal of Chemistry, 1998, pp. 538-541, 16(6).
Jochen Schuhmacher, et al., "A bifunctional HBED-derivative for labeling of antibodies with gallium-67, indium-111 and iron-5. Comparative biodistribution with 111In-DPTA and iodine-131-labeled antibodies in mice bearing antibody internalizing and non-internalizing tumors," Nucl. Med. Biol., 1992, pp. 809-824, 19(8).
Nicholas E. Leadbeater, et al., "Preparation of Polymer-Supported Ligands and Metal Complexes for Use in Catalysis," Chem. Rev., 2002, pp. 3217-3273, 02(10).
Henna Pesonen, et al., "Synthesis, structure, and complexation properties of hydroxybenzyl analogs of diethylenetriaminepentaacetic acid," Journal of Coordination Chemistry, 2010, pp. 2026-2041, 63(12).
Shigeki, Kobayashi, et al., "Development of new double-stranded phenylalanyl chelators using N-X diagrams and binding constants for chelators and lanthanide ions," Chem. Pharm. Bull., 2010, pp. 620-627, 58(5).
Frederik Cleeren, et al., "New Chelators for Low Temperature Al18F-Labeling of Biomolecules," Bioconjugate Chem., 2016, pp. 790-798, 27(3).
William J. McBride, et al., "The radiolabeling of proteins by the [18F]AlF method," Applied Radiation Isotopes, 2012, pp. 200-204, 70(1).
Edit Y. Tshuva, et al., "Single-step synthesis of salans and substituted salans by Mannich condensation," Tetrahedron Letters, 2001, pp. 6405-6407, 42(36).
Carla J. Mathias, et al., "N,N'-bis(2-hydroxybenzyl)-1-(4-bromoacetamidobenzyl)-1,2-ethylene-diamine-N,N'-diacetic acid: a new bifunctional chelate for radio-labeling antibodies," Bioconjugate Chem., 1990, pp. 204-211, 1(3).
Andrew S. Craig, et al., "Towards tumor imaging with indium-111 labeled macrocycle-antibody conjugates," J. Chem. Soc., Chem. Commun., 1989, pp. 794-796, (12).
Jonathan P. L. Cox, et al., "Synthesis of a kinetically stable yttrium-90 labeled macrocycle-antibody conjugate," J. Chem. Soc. Chem. Commun., 1989, pp. 797-798, (12).
J. Richard Morphy, et al., "Towards tumor targeting with copper-radiolabeled macrocycle-antibody conjugates," J. Chem. Soc. Chem. Commun., 1989, pp. 792-794, (12).
J. Richard Morphy, et al., "Antibody labeling with functionalized cyclam. macrocycles," J.Chem. Soc. Chem. Commun., 1988, pp. 156-158, (3).
Arthur E. Martell, et al., "J. Synthesis of N,N'-di(2-hydroxybenzyl)ethylenediamine-N,N'-diacetic acid (HBED) and derivatives," Can. J. Chem., 1986, pp. 449-456, 64(3).
Peter Laverman, et al., "Optimized labeling of NOTA-conjugated octreotide with F-18," Tumour Biol., 2012, pp. 427-434, (2).
Andrew S. Craig, et al., "Stability, gallium-71 NMR and crystal structure of a neutral gallium(III) complex of 1,4,7-triazacyclononanetriacetate: a potential radiopharmaceutical?," J. Chem. Soc. Chem. Commun., 1989, pp. 1793-1794, (23).
Diana Utz, et al., "Syntheses and characterization of copper complexes with the ligand 2-aminoethyl(2-pyridylmethyl)-1,2-ethanediamine (apme)," J. Inorg. Biochem., 2008, pp. 1236-1245, 102(5-6).
Aysegul Efendioglu, et al., "Preconcentration of Cu(II), Cd(II) and Pb(II) on amberlite XAD-4 resin functionalized with N, N'-bis(o-vanillinidene)ethylenediamine and their determination by FAAS in water samples," Anal. Sci., 2010, pp. 1283-1288, 26(12).
Tao Zhou, et al., "Synthesis and Iron(III)-Chelating Properties of Novel 3-Hydroxypyridin-4-one Hexadentate Ligand-Containing Copolymers," Biomacromolecules, 2008, pp. 1372-1380, 9(5).
N. Nishat, et al., "Synthesis and characterization of trinuclear macrocyclic transition metal complexes," Synth. In React. Inorg. Met.-Org. Chem., 2001, pp. 1599-1610, 31(9).
B. Singh, et al., "Mono- and trinuclear metal complexes of a 12-membered tetraaza macrocycle: synthesis and characterization," Synth. React. Inorg. Met.-Org. Chem., 2000, pp. 897-907, 30(5).
B. Singh, et al., "V. L. Synthesis and characterization of mono and trinuclear lanthanide(III) complexes of 12-membered tetraaza

(56) References Cited

OTHER PUBLICATIONS macrocycle," Indian J. Chem., Sect. A: Inorg., Bio-inorg., Phys., Theor. Anal. Chem., Aug. 1999, pp. 802-807, 38A(8).
Fathi M.A.M. Agra, et al., "Transition metal complexes of a new 12-membered tetraaza macrocycle," Synth. React.Inorg. Met.-Org. Chem., 1994. pp. 1599-1612, 24(9).
David Parker, et al., "Implementation of macrocycle conjugated antibodies for tumor-targetting," Pure Appl. Chem., 1989, pp. 1637-1641, 61(9).
Fang Tian, et al., "Biomimetic design of chelating interfaces," J. Appl. Polym. Sci., 2015, pp. 41231/1-41231/8, 132 (1).
Andrew R. Vaino, et al., "Solid-Phase Organic Synthesis: A Critical Understanding of the Resin," J. Comb. Chem., Jun. 2000, pp. 579-596, 2(6).
Tai Tung Yip, et al., "Immobilized metal ion affinity chromatography," Methods Mol. Biol., Pract. Protein Chromatogr., 1992, pp. 17-31, 11(2).
Dirk Burdinski, et al., "Lanthanide Complexes of Triethylenetetramine Tetra-, Penta-, and Hexaacetamide Ligands as Paramagnetic Chemical Exchange-Dependent Saturation Transfer Contrast Agents for Magnetic Resonance Imaging: Nona-versus Decadentate Coordination." Inorg. Chem., 2009, pp. 6692-6712, 48(14).
Eric W. Price, et al., "H4octapa: An Acyclic Chelator for 111In Radiopharmaceuticals," J. Am. Chem. Soc., 2012, pp. 8670-8683, 134(20).
Edit Farkas, et al., "Equilibrium, Kinetic and Structural Properties of Gallium(III) and Some Divalent Metal Complexes Formed with the New DATAm and DATA5m Ligands," Chem. Eur. J., 2017, pp. 10358-10371, 23(43).
Ghassan Bechara, et al., "An efficient route to pyridine and 2,2'-bipyridine macrocycles incorporating a triethylenetetraminetetraacetic acid core as ligand for lanthanide ions," Tetrahedron Letters, 2009, pp. 6522-6525, 50 (47).
Kazuya Takenouchi, et al., "Novel bifunctional macrocyclic chelating agents appended with a pendant-type carboxymethylamino ligand and nitrobenzyl group and stability of the 88YIII complexes," J. Org. Chem., 1993, pp. 1955-1958, 58(7).
Arthur E. Martell, et al., "N,N'-Bis(2-hydroxybenzyl)ethylenediamine-N,N'-diacetic acid (HBED)," Inorg. Synth., 1998, pp. 120-122, 32.
Matthias Eder, et al., "68Ga-Complex Lipophilicity and the Targeting Property of a Urea-Based PSMA Inhibitor for PET Imaging," Bioconjugate Chem., 2012, pp. 688-697, 23(4).
Matthias Eder, et al., "Tetrafluorophenolate of HBED-CC: a versatile conjugation agent for 68Ga-labeled small recombinant antibodies," Eur. J. Nucl. Med. Mol. Imaging, 2008, pp. 1878-1886, 35(10).
Aaron C. Sather, et al., "Selective recognition and extraction of the uranyl ion from aqueous solutions with a recyclable chelating resin," Chem. Sci., 2013, pp. 3601-3605, 4(9).
Alexander V. Pestove, et al., "Synthesis of chelating polymer sorbents by using the S NH methodology," J. Appl. Polym. Sci., 2012, pp. 1970-1978, 125(3).
Diego D. Diogo, et al., "The role of matrix porosity in the adsorption of Cu(II) by amidoxime chelating resins: An electron paramagnetic resonance study," 2011, pp. 721-727, 71(7).
Amanda N. Puslam, et al., "Engineering selectivity into polymer-supported reagents for transition metal ion complex formation," React. Funct. Polym., 2010, pp. 545-554, 70(8).
Aminul Islam, et al., Characterization of a novel chelating resin of enhanced hydrophilicity and its analytical utility for preconcentration of trace metal ions, 2010, pp. 1772-1780, 81(4-5).
A. Nilchi, et al., "Adsorption properties of amidoxime resins for separation of metal ions from aqueous systems," React. Funct. Polym., 2008, pp. 1665-1670, 68(12).
Dorota Kolodynska et al., "Comparison of chelating ion exchange resins in sorption of copper(II) and zinc(II) complexes with ethylenediaminetetraacetic acid (EDTA) and nitrilotriacetic acid (NTA)," Can. J. Chem., 2008, pp. 958-969, 86(10).
Sadhan Pramanik, et al., "Separation and determination of some metal ions on new chelating resins containing N, N donor sets," Anal. Chim. Acta, 2006, pp. 430-437, 556(2).

H. Kaur, et al., "Functionalization of XAD-4 resin for the separation of lanthanides using chelation ion exchange liquid chromatography," React. Funct. Polym., 2005, pp. 277-283, 65 (3).
Hayal Bulbul Sonmez, et al., "An alternative approach for grafting of acrylate esters from crosslinked polystyrene beads by ATRP and their modification for selective mercury extraction," React. Funct. Polym., 2004, pp. 33-41 61(1).
Sadhan Pramanik, et al., "A chelating resin containing bis(2-benzimidazolylmethyl)amine: synthesis and metal-ion uptake properties suitable for analytical application." Talanta, 2004, pp. 485-490, 63(2).
F. Barbette, et al., "Extraction of uranyl ions from aqueous solutions using silica-gel-bound macrocycles for alpha contaminated wastewater treatment," Anal. Chim. Acta, 2004, pp. 179-187, 502(2).
Veronique Montembault, et al., "Synthesis and complexing properties of resins containing aminocarboxylic acid as functional groups from diethylenetriaminepentaacetic acid bisanhydride and polyvinyl alcohols," React. Funct. Polym . . . 1999, pp. 253-261, 39(3).
Spiro D. Alexandratos, et al. "Design of novel polymer-supported reagents for metal ion separations," ACS Symp. Ser., 1999, pp. 194-205.
J. M. Sanchez, et al., "New macroporous polymers for the selective adsorption of gold (III) and palladium (II). I. The synthesis, characterization, and effect of spacers on metal adsorption," J. Polym. Sci., Part A: Polym. Chem., 2000, pp. 269-278, 38(2).
Michael Zachariou, et al., "Immobilized metal ion affinity chromatography of proteins," Methods Mol. Biol. (Totowa, NJ, U.S.) 251 (HPLC of Peptides and Proteins), 2004, pp. 89-102.
R. K. Dey, et al. "Studies of metal ion uptake behaviour of formaldehyde condensed resins of phenolic Schiff bases derived from the reaction of 4,4'-diaminodiphenyl and 4,4'-diaminodiphenylmethane with o-hydroxybenzaldehyde," Indian J. Chem. Technol., 2004, pp. 695-703, 11(5).
Adam Charlton, et al., "Immobilized metal ion affinity chromatography of histidine-tagged fusion proteins," Methods Mol. Biol. (Totowa, NJ, U.S.) 421 (Affinity Chromatography (2nd Edition)), 2008, pp. 137-149.
Ata Makarem, et al., "A Convenient Synthesis for HBED-CC-tris(tert-butyl ester)," Synlett, 2018. pp. 1239-1243, 29(9).
Christian Maurer, et al., "Dioximate- and bis(salicylaldiminate)-bridged titanium and zirconium alkoxides: Structure elucidation by mass spectrometry," Chem. Plus. Chem., 2013, pp. 343-351, 78(4).
Xing Man Xu, et al., "Syntheses, characterization and DNA cleavage studies of acyclic copper(II) complexes," Transition Met. Chem. (Dordrecht, Neth.), 2004, pp. 658-662, 29(6).
Albert E. Frost, Jr., et al., "The Preparation and properties of some N,N'-dialkylethylene-diaminediacetic acids," J. Am. Chem. Soc., 1950, pp. 3743-672, vol. 72.
Michelle K. Taylor, et al., "The effect of donor groups and geometry on the redox potential of copper Schiff base complexes," Inorg. Chim. Acta., 2006, pp. 2455-2464, 359(8).
Sylvain Routier, et al., "Synthesis of a functionalized salen-copper complex and its interaction with DNA," J. Org. Chem., 1996, pp. 2326-2331, 61(7).
Marzena Bialek, et al., "Bidentate [N, N] nickel complexes with salen type ligands for polymerization of methyl methacrylate," Polimery (Warsaw, Pol.), 2008, pp. 883-887, 53(11/12).
Markus Scholl, et al., "Controlling Polymer Architecture in the Thermal Hyperbranched Polymerization of L-Lysine," Macromolecules (Washington, DC, U.S.), 2007, pp. 5726-5734, 40(16).
Sylvain Routier, et al., "Highly preferential cleavage of unpaired guanines in DNA by a functionalized salen-nickel complex," Bioorg. Med. Chem. Lett., 1997, pp. 63-66, 7(1).
N. Kahana,, et al., "A Conceptual Approach to the Synthesis of Bifunctional EDTA Analogs: EDTA-Extended Polyamides," J. Org. Chem., 1994, pp. 4832-4837, 59(17).
A. Warshawsky, "Chelating ion exchangers," Crit. Rep. Appl. Chem., 1987, pp. 166-225, 19.
Janina Altman, et al., "The synthesis of vicinal diacylamines via Bamberger ring cleavage of substituted imidazoles, 1,2,4-Triacylaminobutanes bearing different acyl groups," Isr. J. Chem., 1986, pp. 29-32, 27(1).

(56) References Cited

OTHER PUBLICATIONS

Sara J. Krivickas, et al., Effective Methods for the Biotinylation of Azamacrocycles. J. Org. Chem., 2007, pp. 8280-8289, 72(22).
Nevenka Cakic, et al., "Synthetic strategies for preparation of cyclen-based MRI contrast agents Synthesis of specifically deuterium labeled sulfur and oxygen ether side-chain-extended antileukemic (2-chloroethyl) nitrosoureas and study of their products and pathways of decomposition under physiological conditions," Tetrahedron Lett., 2015, pp. 759-765, 56(6).
Charles N. Moorefield, et al., "Eight-membered and larger rings," Prog. Heterocycl. Chem., 2009, pp. 459-475, 20.
Martina Delbianco, et al., "Highly Water-Soluble Triazacyclononane Europium Complexes to Detect Ligand Binding with Time-Resolved FRET Microscopy," Angew. Chem., Int. Ed., 2014, pp. 10718-10722, 53(40).
Mokhtar Dardouri, et al., "Aminoalkylated Merrifield Resins Reticulated by Tris-(2-chloroethyl) Phosphate for Cadmium, Copper, and Iron (II) Extraction," Int. J. Polym. Sci., 2015, pp. 1-7.
Nacer Ferrah, et al., "Removal of copper ions from aqueous solutions by a new sorbent: polyethyleneiminemethylene phosphonic acid," Desalination, 2011, pp. 17-24, 269(1-3).
Rongjun Qu, et al., "Removal and Separation of Hg(II) Ions from Aqueous Solutions by Macroporous Polystyrene-co-Divinylbenzene-Supported Polyamine Chelating Resins," J. Chem. Eng. Data, 2010, pp. 4650-4659, 55(11).
Xiao Zhao, et al., "Tetrahydrosalen Uranyl(VI) Complexes: Crystal Structures and Solution Binding Study," Eur. J. Inorg. Chem., 2018, pp. 1185-1191, 2018(10).
Sylvain Routier, et al., "Salen-anthraquinone conjugates. Synthesis, DNA-binding and cleaving properties, effects on topoisomerases and cytotoxicity," Bioorg. Med. Chem., 1996, pp. 1185-1196, 4(8).
Thomas J. McMurry, et al., "Convenient synthesis of bifunctional tetraaza macrocycles. Bioconjugate Chem." 1992, pp. 108-117, 3(2).
Yong Huang, et al., "An Efficient Synthesis of N, N, N-Substituted 1,4,7-Triazacyclononane," Eur. J. Org. Chem., 2018, pp. 1546-1551, 2018(13).
Rebecca C. Hoye, et al., "Synthesis of Polyazamacrocyclic Compounds via Modified Richman-Atkins Cyclization of 1²-Trimethylsilylethanesulfonamides," J. Org. Chem., 2001, pp. 2722-2725, 66(8).
Vicente Marti-Centelles, et al., "Macrocyclization Reactions: The Importance of Conformational, Configurational, and Template-Induced Preorganization," Chem. Rev. (Washington, DC, U.S.), 2015, pp. 8736-8834, 115(16).
Pauline Desogere, et al., "Efficient Synthesis of 1,4,7-Triazacyclononane and 1,4,7-Triazacyclononane-Based Bifunctional Chelators for Bioconjugation," Eur. J. Org. Chem., 2014, pp. 7831-7838, 2014(35).
Sophie Poty, et al., "MA-NOTMP: A Triazacyclononane Trimethylphosphinate Based Bifunctional Chelator for Gallium Radiolabelling of Biomolecules," Chem. Med. Chem., 2015, pp. 1475-1479, 10(9).
Jinshan Chen, et al., Synthesis of 12-membered macrocyclic templates and library analogs for PPI, Tetrahedron Lett., 2013, pp. 3298-3301, 54(25).
Pier Giorgio Cozzi, "Metal-Salen Schiff base complexes in catalysis: practical aspects," Chem. Soc. Rev., 2004, pp. 410-421, (7).
S. Fernandez-Puig, et al., "Modified Merrifield's resin materials used in capturing of Pb(II) ions in water," Mater. Res. Express 6, 2019, 12 pages, 115104, 6(11).
Krzysztof E. Krakowiak, et al., "Preparation of a variety of macrocyclic di- and tetraamides and their peraza-crown analogs using the crab-like cyclization reaction," J. Heterocycl. Chem., 1990, pp. 1585-1589, 27(6).
D. Allen Annis, et al., "Polymer-supported chiral Co(salen) complexes: synthetic applications and mechanistic investigations in the hydrolytic kinetic resolution of terminal epoxides," J. Am. Chem. Soc., 1999, pp. 4147-4154, 121 (17).
Anais Zulauf, et al., "Recoverable chiral salen complexes for asymmetric catalysis: recent progress," Dalton Trans., 2010, pp. 6911-6935, (30).
Dexuan Huang, et al., "Immobilized complexes of the salen Schiff's base with metal as oxidation catalysts," Russ. J. Gen. Chem., 2013, pp. 2361-2369, 83(12).
Francisco Galindo, et al., "A Sensitive Colorimetric Method for the Study of Polystyrene Merrifield Resins and Chloromethylated Macroporous Monolithic Polymers," J. Comb. Chem., 2004, pp. 859-861, (6).
Talha M. Gokmen, et al., "Porous polymer particles—A comprehensive guide to synthesis, characterization, functionalization and applications," Prog. Polym. Sci., 2012, pp. 365-405, 37(3).
F. Yunta et al., "Chelating Agents Related to Ethylenediamine Bis(2-hydroxyphenyl)acetic Acid (EDDHA): Synthesis, Characterization, and Equilibrium Studies of the Free Ligands and Their Mg2+, Ca2+, Cu2+, and Fe3+ Chelates," Inorganic Chemistry, vol. 42, No. 17, Jul. 30, 2003, pp. 5412-5421.
Viviane G. Teixeira, et al., "Morphological study on the reactivity of styrene-divinylbenzene copolymers in a chloromethylation reaction." J. Appl. Polym. Sci., 2010, pp. 2389-2396 118(4).
Georgina E. Pina-Luis, et al, "Sensitive single step fluorimetric method for monitoring solid-phase reactions on polystyrene resin-bound chloride groups," J. Braz. Chem. Soc., 2011, pp. 1024-1032, 22(6).
Viviane G. Teixeira, et al., "Determination of accessible chloromethyl groups in chloromethylated styrene-divinylbenzene copolymers.," J. Braz. Chem. Soc., 2005, pp. 951-956, 16(5).
Mi Sun Pyun, et al, "Synthesis of bifunctional chelating agent derived from lysine and its radiolabeling with 99mTc," Bull. Korean Chem. Soc., 2009, pp. 1187-1189, 2009.
Jingdan Hu, et al., "J. A New Method for the Synthesis of Nĺμ-Acetyl-Nĺμ-hydroxy-L-lysine, the Iron-Binding Constituent of Several Important Siderophores," J. Org. Chem., 1994, pp. 4858-4861, 59(17).
Arumugam Thangavel, et al., "1,4,7-Triazacyclononane Ligands Bearing Tertiary Alkyl Nitrogen Substituents," Inorg. Chem., 2013, pp. 13282-13287, (22).
P. Florio et al., "An efficient synthesis of 1,3-bis(1,4,7-triazacyclonon-1-yl)-2-hydroxypropane, [1,3-bis(TACN)-2-propanol]," Green Chem. Lett. Rev., 2012, pp. 251-254, 5(3).
Zoltan Koacs, et al., "A general synthesis of mono- and disubstituted 1,4,7-triazacyclononanes," Tetrahedron Lett., 1995, 92269-9272, 36(51).
Jacob Golenser, et al., "Iron chelators: correlation between effects on *Plasmodium* spp. and immune functions," J. Parasitol., 2006, pp. 170-177 (1).
Thomas, Muntener, et al., "Synthesis of chiral nine and twelve-membered cyclic polyamines from natural building blocks," Chem. Commun. (Cambridge, U.K.), Mar. 2019, pp. 4715-4718, (32).
Ata Makarem, et al., "HBED-NN: A Bifunctional Chelator for Constructing Radiopharmaceuticals," J. Org. Chem. 2019, pp. 7501-7508, (11).
Song Li et al., "Synthesis and Characterization of a Novel Chloromethylated Polystyrene-g-2-adenine Chelating Resin and its Application to Preconcentrate and Detect the Concentration of Mercury Ions in Edible Mushroom Samples," Canadian Journal of Chemistry, Jul. 6, 2016, pp. 751-758, vol. 94, No. 9.
Youning Chen et al., "A Novel Polyvinyltetrazole-Grafted Resin with High Capacity for Adsorption of Pb(II), Cu(II) and Cr(III) Ions From Aqueous Solutions," Journal of Materials Chemistry A, Apr. 16, 2014, pp. 10444-10453, vol. 2, No. 27.
Xuewen Tao et al., "Insight Into Selective Removal of Copper from High-Concentration Nickel Solutions with XPS and DFT: New Technique to Prepare 5N-Nickel with Chelating Resin," Journal of Environmental Sciences, Oct. 1, 2016, pp. 34-44, vol. 48.
Xiaosheng Jing et al., "Adsorption Performances and Mechanisms of the Newly Synthesized N, N'-di (Carboxymethyl) Dithiocarbamate Chelating Resin Toward Divalent Heavy Metal Ions from Aqueous Media," Journal of Hazardous Materials, Aug. 15, 2009, pp. 589-596, vol. 167, Nos. 1-3.
Hrishikesh S. Gupte et al., "Azo Resorcin[4]Calixpyrrole Grafted Amberlite XAD-2 Polymer: An Efficient Solid Phase Extractant for

(56) References Cited

OTHER PUBLICATIONS

Separation and Preconcentration of La(111) and Ce(111) from Natural Geological Samples," Journal of Inclusion Phenomena and Macrocyclic Chemistry, Apr. 2015, pp. 409-422, vol. 81, Nos. 3-4.

Cheng Cheng et al., "Preparation of New Hyper Cross-Linked Chelating Resin for Adsorption of Cu2+ and Ni2+ from Water," Chinese Chemical Letters, Aug. 23, 2012, pp. 245-248, vol. 23, No. 2.

Changqing Zhu et al., "Enhanced Removal of Cu(II) and Ni(II) from Saline Solution by Novel Dual-Primary-Amine Chelating Resin Based on Anion-Synergism," Journal of Hazardous Materials, Apr. 28, 2015, pp. 234-242, vol. 287.

Zengdi Wang et al., "Heterogeneous Synthesis of Chelating Resin Organophosphonic Acid-Functionalized Silica Gel and its Adsorption Property of Heavy Metal Ions from Fuel Ethanol Solutions," Journal of Applied Polymer Science, Oct. 15, 2012, pp. 544-551, vol. 126, No. 2.

Fuqiang Liu et al., "Interaction Mechanism of Aqueous Heavy Metals onto a Newly Synthesized IDA-Chelating Resin: Isotherms, Thermodynamics and Kinetics," Chemical Engineering Journal, Sep. 2011, pp. 106-114, vol. 173, No. 1.

Akil Ahmad et al., "New Generation Amberlite XAD Resin for the Removal of Metal Ions: A Review," Journal of Environmental Sciences, May 1, 2015, pp. 104-123, vol. 31.

Aysegül Karakücük et al., "Polymer Supported Calix[4]arene Schiff Bases: A Novel Chelating Resin for Hg2+ and Dichromate Anions," Journal of Macromolecular Science, Part A: Pure and Applied Chemistry, Jun. 2005, pp. 691-704, vol. 42, No. 6.

Seher Şener et al., "Preconcentration/Separation of Some Trace Metal Ions from Water Samples by a New Synthesized Chelating Resin," Journal of AOAC International, Mar.-Apr. 2014, pp. 598-604, vol. 97, No. 2.

Liuqing Yang et al., "Preparation and Adsorption Performance of a Novel Bipolar PS-EDTA Resin in Aqueous Phase," Journal of Hazardous Materials, Aug. 15, 2010, pp. 98-105, vol. 180, Nos. 1-3.

Serkan Emik, "Preparation and Characterization of an IPN Type Chelating Resin Containing Amino and Carboxyl Groups for Removal of Cu(II) from Aqueous Solutions," Reactive & Functional Polymers, Feb. 2014, pp. 63-74, vol. 75, No. 1.

K.V.K. Reddy et al., "Preparation of a Chelating Resin by Immobilizing 3-((E)-(2-Amino Phenyl Imino) Methyl) Phenol on Amberlite XAD-16 and its Application of Solid Phase Extraction of Fe(II), Cu(II), Mn(II), and Zn(II) in Natural Water Samples," Research Journal of Pharmaceutical, Biological and Chemical Sciences (RJPBCS), Jul.-Sep. 2012, pp. 340-349, vol. 3, No. 3.

In-Hwan Park et al., "Preparation of Chelating Resins Containing a Pair of Neighboring Carboxylic Acid Groups and the Adsorption Characteristics for Heavy Metal Ions," Separation Science and Technology, Nov. 14, 2005, pp. 2963-2986, vol. 40, No. 14.

C. Flassbeck et al., "Synthesis of N-Phenolate-Functionalized Macrocycles of 1,4,7-Triazacyclononane and of 1-Oxa-4,7-Diazacyclononane and their Cordination Chemistry with Iron(III)," Journal of the Chemical Society, Dalton Transactions, Feb. 1992, pp. 60-68, vol. 608, No. 8.

A.L. Crumbliss et al., "Synthesis and Characterization of Iron(III) Chelating Analogues of Siderophores on Organic Solid Supports," Inorganica Chimica Acta, Oct. 15, 1987, pp. 281-287, vol. 133, No. 2.

Takayuki Matsushita et al., "Synthesis of Copper(II) Selective Chelating Resin Bearing a Tetraaza Macrocyclic Schiff Base Ligand," Chemistry Letters, Oct. 1988, pp. 1577-1580, vol. 17, No. 10.

S. Samal et al., "Synthesis and Metal Ion Uptake Studies of Chelating Resins Derived from Formaldehyde-Furfuraldehyde Condensed Phenolic Schiff Bases of 4,4'-Diaminodiphenylether and o-Hydroxyacetophenone," Talanta, Jul. 19, 2002, pp. 1075-1083, vol. 57, No. 6.

Brian P. Murphy et al., "Lanthanide Complexes of New Ditopic, Tripodal Macrocycles: Synthetic, Structural, Stability and Luminescence Studies," Inorganic Chemistry Communications, Aug. 2002, pp. 577-580, vol. 5, No. 8.

Lidan Zong et al., "A Novel Pyridine Based Polymer for Highly Efficient Separation of Nickel from High-Acidity and High-Concentration Cobalt Solutions," Chemical Engineering Journal, Feb. 15, 2018, pp. 995-1005, vol. 334.

Mojtaba Shamsipur et al., "A Stoichiometric Imprinted Chelating Resin for Selective Recognition of Copper(II) Ions in Aqueous Media," Analytica Chimica Acta, Sep. 19, 2007, pp. 294-301, vol. 599, No. 2.

F. Cleeren et al., "New Chelators for Low Temperature Al18F-Labeling of Biomolecules," Bioconjugate Chemistry, Feb. 2, 2016, pp. 790-798, vol. 27, No. 3.

Levi M. Bin et al., "Effectiveness of FeEDDHA, FeEDDHMA, and FeHBED in Preventing Iron-Deficiency Chlorosis in Soybean," Journal of Agricultural and Food Chemistry, Oct. 3, 2016, pp. 8273-8281, vol. 64, No. 44.

Koji Oshita et al., "Development of Chelating Resins and Their Ability of Collection and Separation for Metal Ions," Bunseki Kageku, May 2008, pp. 291-311, vol. 57, No. 5.

Felipe Yunta et al., "Chelating Agents Related to Ethylenediamine Bis(2-Hydroxyphenyl)acetic Acid (EDDHA): Synthesis, Characterization, and Equilibrium Studies of the Free Ligands and their Mg2+, Ca2+, Cu2+, and Fe3+ Chelates," Inorganic Chemistry, Jul. 30, 2003, pp. 5412-5421, vol. 42, No. 17.

Cheri A. Barta et al., "Molecular Architectures for Trimetallic d/f/d Complexes: Structural and Magnetic Properties of a LnNi2 Core," Inorganic Chemistry, Apr. 7, 2008, pp. 2280-2293, vol. 47, No. 7.

C. Allen Chang et al., "Synthesis, Characterization, and Crystal Structures of M(DO3A) (M=Fe, Gd) and Na[M(DOTA)] (M=Fe, Y, Gd)," Inorganic Chemistry, Aug. 4, 1993, pp. 3501-3508, vol. 32, No. 16.

Jonathan P.L. Cox et al., "Synthesis of C- and N-Functionalised Derivatives of 1,4,7-Triazacyclononane-1,4,7-Triyltriacetic acid (NOTA), 1,4,7,10-Tetra-Azacyclododecane-1,4,7,10-Tetrayltetra-Acetic Acid ( DOTA), and Diethylenenetriaminepenta-Acetic Acid (DTPA): Bifunctional Complexing Agents for the Derivatisation of Antibodies," Journal of the Chemical Society Perkin Transactions 1, Sep. 1990, pp. 2567-2576, vol. 9.

Thomas Clement Loomis, "Metal Chelates of Cyclohexenediaminetetraacetic Acid," Iowa State College, Retrospective Theses and Dissertations, 1953, 205 pages.

Paloma Nadal et al., "Evaluation of Fe-N, N'-Bis(2-Hydroxybenzyl)Ethylenediamine-N, N'-Diacetate (HBED/Fe3+) as Fe Carrier for Soybean (*Glycine max*) Plants Grown in Calcareous Soil," Plant Soil, May 2, 2012, pp. 349-362, vol. 360, Nos. 1-2.

Teresa M. Jones-Wilson et al., "New Hydroxybenzyl and Hydroxypyridylmethyl Substituted Triazacyclononane Ligands for Use with Gallium(III) and Indium(III)," Nuclear Medicine and Biology, Oct. 1995, pp. 859-868, vol. 22, No. 7.

Niyazi Biçak et al., "Poly (Styrene Sulfonamides) with EDTA-Like Chelating Groups for Removal of Transition Metal Ions," Journal of Applied Polymer Science, Jul. 19, 2000, pp. 2749-2755, vol. 77, No. 12.

Krishnapillai Girish Kumar et al., "Polystyrene Anchored Vanillin Schiff Base-Complexation and Ion Removal Studies," Journal of Applied Polymer Science, Nov. 15, 2005, pp. 1536-1539, vol. 98, No. 4.

Elif V. Oral et al., "Preconcentration and Determination of Copper and Cadmium Ions with 1,6-Bis(2-Carboxy Aldehyde Phenoxy) Butane Functionalized Amberlite XAD-16 by Flame Atomic Absorption Spectrometry," Journal of Hazardous Materials, Feb. 15, 2011, pp. 724-730, vol. 186, No. 1.

Elizabeth M. Moyers et al., "Preparation and Analytical Applications of a Propylenediaminetetraacetic Acid Resin," Analytical Chemistry, Mar. 1977, pp. 418-423, vol. 49, No. 3.

Hiroaki Egawa et al., "Preparation of Macroreticular Chelating Resins Containing Dihydroxyphosphino and/or Phosphono Groups and Their Adsorption Ability for Uranium," Journal of Applied Polymer Science, Jun. 1984, pp. 2045-2055, vol. 29, No. 6.

Ö. Szabadka, "Studies on Chelating Resins—I: General Equation for the Calculation of the Protonation Constants of Chelating Resins," Talanta, Mar. 1982, pp. 177-181, vol. 29, No. 3.

(56) References Cited

OTHER PUBLICATIONS

Ö. Szabadka, "Studies on Chelating Resins—II: Determination of the Protonation Constants of a Chelating Resin Containing Iminodiacetic Acid Groups," Talanta, Mar. 1982, pp. 183-187, vol. 29, No. 3.

Berrin Topuz et al., "Solid Phase Extraction and Preconcentration of Cu(II), Pb(II), and Ni(II) in Environmental Samples on Chemically Modified Amberlite XAD-4 with a Proper Schiff Base," Environmental Monitoring and Assessment, Feb. 2011, pp. 709-722, vol. 173, Nos. 1-4.

Chunhua Xiong et al., "Synthesis, Characterization and Application of Triethylenetetramine Modified Polystyrene Resin in Removal of Mercury, Cadmium and Lead from Aqueous Solutions," Chemical Engineering Journal, Dec. 15, 2009, pp. 844-850, vol. 155, No. 3.

\* cited by examiner

STRONG BINDING METAL-CHELATING RESINS USING MACROCYCLE MOLECULES

PRIORITY CLAIM

The present application claims priority to U.S. Provisional Patent Application Ser. No. 63/183,946, entitled "Strong Binding Metal-Chelating Resins," filed May 4, 2021, the content of which is incorporated by reference herein in its entirety.

BACKGROUND

Ultra-pure liquids free from metallic contamination are required for many industrial purposes such as, for example, the manufacture of integrated circuits in the microelectronics industry and of pharmaceutical products. For example, in the manufacture of integrated circuits, it is known that many processing liquids come into contact with a bare silicon wafer or a resist coated surface. These processing liquids include photoresists and treatment chemicals such as organic liquids and aqueous solutions which contain acids, bases, oxidants, reductants and other chemical agents. It is known that these solutions can be a source of contamination of the components of integrated circuits and may interfere with their performance. Thus, the reduction or removal in concentration of soluble metallic contaminants from processing fluids that are used in the production of integrated circuits reduces or prevents damage to the integrated circuits.

SUMMARY

In accordance with an illustrative embodiment, a metal-chelating resin comprises:

(a) a compound represented by Formula (I):

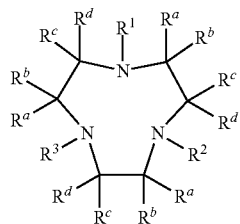

(I)

or a stereoisomeric form thereof or a salt thereof, wherein $R^1$, $R^2$, $R^3$, $R^a$, $R^b$, $R^c$, and $R^d$ are as defined herein; and (b) an organic polymer resin having at least one complementary reactive functional group covalently linked with at least one linking group of the compound represented by Formula (I).

In accordance with another illustrative embodiment, a process for removing one or more metallic components contained in an aqueous solution and/or a non-aqueous solution comprises the step of contacting an aqueous solution or a non-aqueous solution containing one or more metallic components with a metal-chelating resin comprising:

(a) a compound represented by Formula (I):

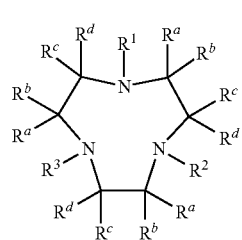

(I)

or a stereoisomeric form thereof or a salt thereof, wherein $R^1$, $R^2$, $R^3$, $R^a$, $R^b$, $R^c$, and $R^d$ are as defined herein; and (b) an organic polymer resin having at least one complementary reactive functional group covalently linked with at least one linking group of the compound represented by Formula (I) for a time period sufficient to reduce the concentration of the one or more metallic components in the aqueous solution and/or the non-aqueous solution.

In accordance with yet another illustrative embodiment, a metal-chelating resin comprises:

(a) a compound represented by Formula (II):

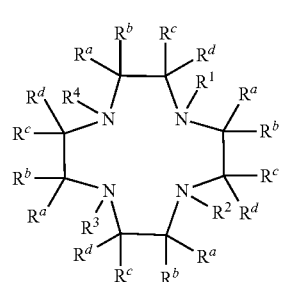

(II)

or a stereoisomeric form thereof or a salt thereof; wherein $R^1$, $R^2$, $R^3$, $R^4$, $R^a$, $R^b$, $R^c$, and $R^d$ are as defined herein; and (b) an organic polymer resin having at least one complementary reactive functional group covalently linked with at least one linking group of the compound represented by Formula (II).

In accordance with still yet another illustrative embodiment, a process for removing one or more metallic components that are contained in an aqueous solution or a non-aqueous solution comprises the step of contacting an aqueous solution or a non-aqueous solution containing one or more metallic components with a metal-chelating resin comprising:

(a) a compound represented by Formula (II):

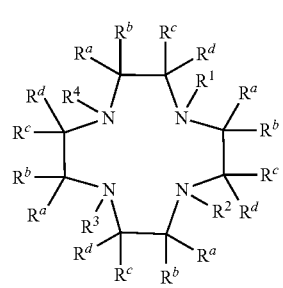

(II)

or a stereoisomeric form thereof or a salt thereof; wherein $R^1$, $R^2$, $R^3$, $R^4$, $R^a$, $R^b$, $R^c$, and $R^d$ are as defined herein; and (b) an organic polymer resin having at least one complementary reactive functional group covalently linked with at least one linking group of the compound represented by Formula (II) for a time period sufficient to reduce the concentration of the one or more metallic components in the aqueous solution or the non-aqueous solution.

BRIEF DESCRIPTION OF THE DRAWINGS

The disclosure may be more completely understood in consideration of the following description of various illustrative embodiments in connection with the accompanying drawings.

or even lower yet in the sub-parts-per-trillion levels (i.e., parts-per-quadrillion level). Some processing reagents and mixtures are basic in nature or acidic in nature. Also, some processing reagents and mixtures contain quaternary ammonium hydroxides. Reducing levels of soluble metallic impurities is made even more difficult in the presence of hydroxide ions that strongly bind to the metal ions and interfere in their removal by use of present methods known to those skilled in the art (e.g., filtration, ion exchange resins, chelating agents and chelating resins).

Thus, reducing levels of soluble divalent, trivalent and higher-valent metal ions and related chemical species to such desired low levels is a challenging task. Present metal-chelating resins in use do not possess a binding constant sufficient to bind metals in order to reduce the concentration of the metals to the desired levels. A list of common metal-chelating agents is shown below in Table 1.

TABLE 1

| Chelating Functional group | Trade name examples | $K_f$ of chelate with metal ions | | | | | |
|---|---|---|---|---|---|---|---|
| | | $Mg^{2+}$ | $Ni^{2+}$ | $Cu^{2+}$ | $Zn^{2+}$ | $Al^{3+}$ | $Fe^{3+}$ |
| Carboxylate ($COO^{1-}$) | WK40L, Lewatit ® S 8528 | $10^{0.55}$ | $10^{0.84}$ | $10^{1.82}$ | $10^{1.20}$ | $10^{1.61}$ | $10^{3.05}$ |
| Iminodi acetate ($IDA^{2-}$) | Lewatit ® MonoPlus TP 207, DIAION ™ CR11, Chelex ® 100, Chelex ® 20 | $10^{3.0}$ | $10^{8.3}$ | $10^{10.6}$ | $10^{7.2}$ | $10^{8.1}$ | $10^{10.8}$ |
| Amino methyl phosphonate ($AMPA^{2-}$) | | $10^{2.0}$ | $10^{5.3}$ | $10^{8.1}$ | $10^{5.3}$ | — | $10^{10.4}$ |
| Iminodimethylenephosphonate ($IDMPA^{4-}$) | Lewatit ® MonoPlus TP 260, Puromet ™ MTS9500 | — | — | $10^{12.7}$ | — | — | $10^{13.3}$ |

$K_f$ values are for metal chelates of fully deprotonated chelates.

Figure 2:
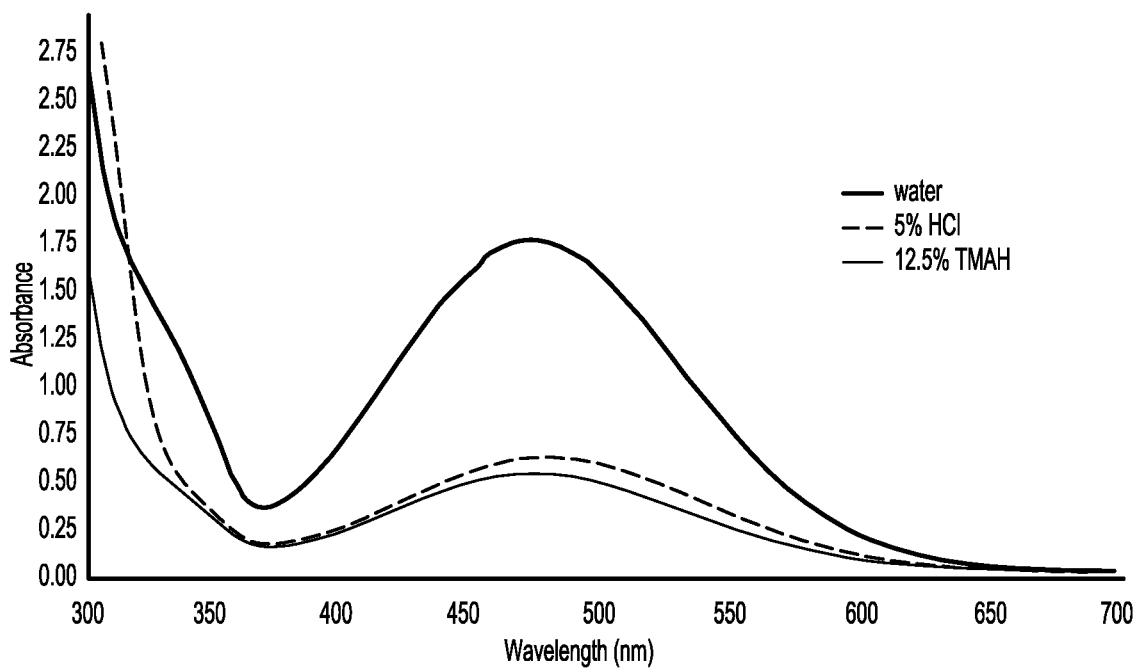

FIG. 2 is graph illustrating three different sample of an Fe complex of the metal-chelating resin of Example 3 tested at room temperature.

Figure 3:
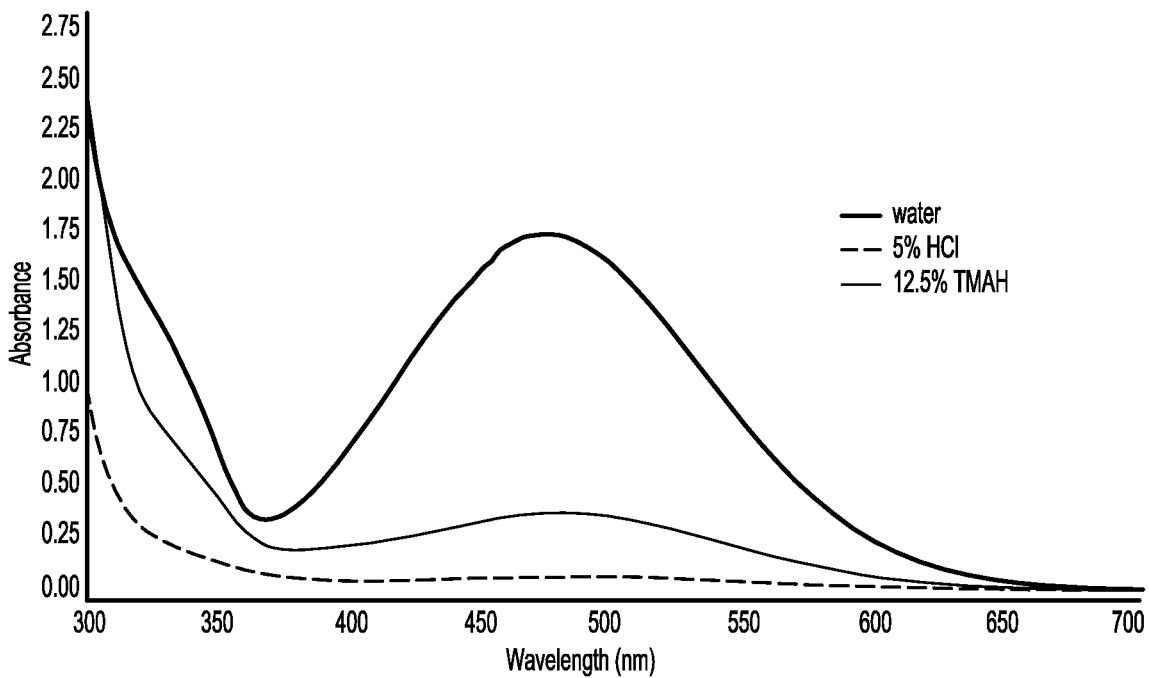

FIG. 3 is graph illustrating three different sample of an Fe complex of the chelating compound of Example 4 tested at 45° C.

Figure 4:
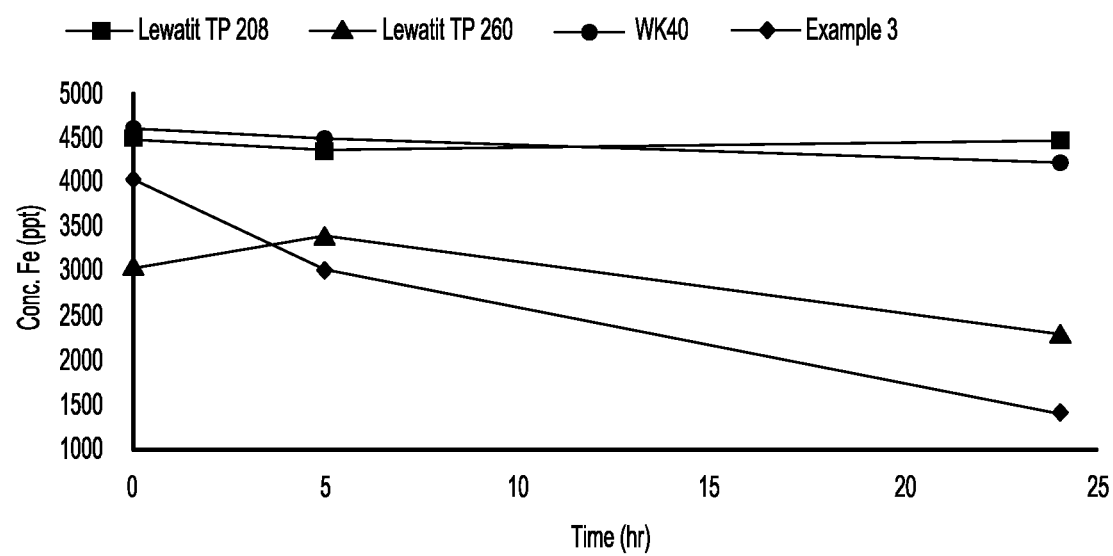

FIG. 4 is graph showing a comparison of the metal-chelating resin of Example 3 against commercial resins for removal of Fe over time.

DETAILED DESCRIPTION

The illustrative embodiments described herein are directed to metal-chelating resins that contain immobilized "ultra chelates", that is, metal-chelates that possess very strong (i.e., high) binding constants ($K_f$) for removing desired metallic components such as divalent metals, trivalent metals or higher-valent metals from aqueous and non-aqueous solutions, which will be discussed hereinbelow. Metal-chelating resins are widely used in the chemical industry for a wide range of purposes. For example, metal-chelating resins have been used to remove divalent, trivalent and higher-valent metals from reagents and mixtures used in the microelectronics industry. Presently, it is desired in the microelectronics industry that the level of, for example, iron (Fe) species in reagents and mixtures be reduced to sub-part-per-billion levels or sub-part-per-trillion (ppt) levels (e.g., 100 down to 10 parts-per-trillion). In addition, future metal concentration levels may need to be further reduced to levels such as in the range of 10 down to 1 parts-per-trillion, Accordingly, there remains a need for improved metal-chelating resins that can significantly reduce the level of one or more metallic components such as divalent, trivalent and higher-valent metal ions to very low levels from, for example, acidic and basic reagents and mixtures that are used in industrial processes including the microelectronics industry. The metal-chelating resins disclosed herein solve the foregoing problems and are believed to be able to remove one or more metals such as divalent metals, trivalent metals and higher-valent metals from aqueous and non-aqueous solutions used in any of the chemical and microelectronics industries, for example, solutions of quaternary ammonium salts, to levels such as in the sub-parts-per-billion levels and sub-parts-per-trillion levels, e.g., range of 10 down to 1 parts-per-trillion, and even lower yet in the sub-parts-per-trillion levels.

In addition, the metal-chelating resins disclosed herein are believed to be chemically stable when used in manufacturing environments. For example, the metal-chelating resins disclosed herein are believed to be stable towards acid (i.e., hydrolytic stability at low pH), stable towards base (i.e., hydrolytic stability at high pH), stable towards heat (i.e., thermal stability), stable towards oxygen (i.e., air) and oxidizing environments, stable towards reducing environments, and stable toward exposure to light (i.e., photostability). Finally, it is useful but not required that the used metal-chelating resins disclosed herein may be regenerated, recycled and reused.

Moreover, it is contemplated that the metal-chelating resins disclosed herein can be used for removing metals to these levels from any aqueous solution, non-aqueous solution or mixtures thereof containing such metals. Accordingly, the term "aqueous solution, non-aqueous solution or mixtures thereof" as used herein is intended to be broadly construed, so as to encompass, for example, organic salt solutions (e.g., quaternary ammonium and phosphonium compounds), quaternary hydroxides, brine, buffer solutions, biochemical/biomedical solutions, bodily fluids, drinking water, waste water, industrial effluent streams, chemical waste, mining and metal working fluids, organic amines, organic halides, organic solvents, surfactant solutions, chemical formulations, processing fluids, drilling fluids, hydraulic fracturing fluids, and well stimulation fluids.

In an illustrative example, the metal-chelating resins disclosed herein can be used for removing metals such as $Fe^{2+}$ and $Fe^{3+}$ to the foregoing levels from solutions comprising amines and amino alcohols. Aqueous amines are employed in the fabrication of semiconductors. For example, hydroxylamine is often a component in photoresist strippers, which remove photoresist after lithography. Reduction of metallic ion contaminants across the semiconductor supply chain is of increasing importance towards the effort to reduce defects and improve yield. Metallic ion reduction is critical for materials that come in direct contact with the wafer surface such as hydroxylamine, hydrazine and ammonium hydroxide.

The metal-chelating resins disclosed herein are formed from macrocycle compounds. A "macrocycle compound" as used herein refers to a molecule containing a ring of nine or more atoms with three or more donor atoms that may coordinate a metal, particularly a cation. The macrocycle compounds may be polyazamacrocyclic compounds, such as, for example, triaza- and tetraazacyclic compounds as described below.

In a non-limiting illustrative embodiment, a metal-chelating resin comprises (a) a compound represented by Formula (I):

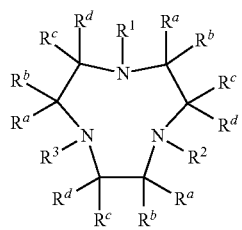

(I)

or a stereoisomeric form thereof or a salt thereof, wherein $R^1$, $R^2$ and $R^3$ are independently a protonated or deprotonated, substituted or unsubstituted 2-hydroxybenzyl moiety optionally containing a linking group for covalently linking the compound of Formula (I) to an organic polymer resin, a protonated or deprotonated, substituted or unsubstituted carboxyalkyl-containing moiety wherein the alkyl group is a substituted or unsubstituted methylene group or a substituted or unsubstituted ethylene group optionally containing a linking group for covalently linking the compound of Formula (I) to an organic polymer resin, a protonated or deprotonated, substituted or unsubstituted phosphonoalkyl-containing moiety wherein the alkyl group is a substituted or unsubstituted methylene group or a substituted or unsubstituted ethylene group optionally containing a linking group for covalently linking the compound of Formula (I) to an organic polymer resin or a protonated or deprotonated, substituted or unsubstituted hydroxyalkyl-containing moiety wherein the alkyl group is a substituted or unsubstituted ethylene group or a substituted or unsubstituted propylene group optionally containing a linking group for covalently linking the compound of Formula (I) to an organic polymer resin, wherein at least one of $R^1$, $R^2$ and $R^3$ is a protonated or deprotonated, substituted or unsubstituted 2-hydroxybenzyl moiety optionally containing a linking group for covalently linking the compound of Formula (I) to an organic polymer resin;

$R^a$, $R^b$, $R^c$ and $R^d$ are independently R or a linking group for covalently linking the compound of Formula (I) to an organic polymer resin or wherein one of adjacent $R^a$ and R or $R^a$ and $R^d$ or $R^b$ and $R^c$ or $R^b$ and $R^d$ are joined together to form a cis- or trans-cyclopentane moiety or a cis- or trans-cyclohexane moiety;

R is independently hydrogen, a substituted or unsubstituted hydrocarbyl group of from 1 to about 18 carbon atoms, a halogen (e.g., F, Cl, Br, I), and a polar functional group such as $SO_3H$, $SO_3^-$, $CO_2H$, $CO_2^-$, carboxyethyl, carboxymethyl, phosphonomethyl, phosphonoethyl, hydroxyethyl, hydroxypropyl, $CF_3$, $NO_2$, OH, and CN;

wherein at least one linking group for covalently linking the compound of Formula (I) to an organic polymer resin occurs in the compound; and (b) an organic polymer resin having at least one complementary reactive functional group covalently linked with the at least one linking group of the compound represented by Formula (I).

In some embodiments, a protonated or deprotonated, substituted or unsubstituted 2-hydroxybenzyl moiety can include, for example, a moiety represented by the structure of Formula (II) or a moiety represented by the structure of Formula (III):

 (II)

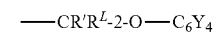 (III)

wherein R' is independently hydrogen, a linear or branched $C_1$ to $C_4$ alkyl moiety, a linear or branched $C_1$ to $C_4$ hydroxyalkyl or a linear or branched $C_1$ to $C_4$ alkyl moiety containing one or more ether linkages. In an embodiment, R' is hydrogen. In another embodiment, R' is methyl. In an embodiment, $R^L$ is an optional linking group for covalently linking the compound of Formula (I) to the organic polymer resin as discussed below.

In some embodiments, a protonated or deprotonated, substituted or unsubstituted carboxymethyl moiety can include, for example, a moiety represented by the structure of Formula (IV) or a moiety represented by the structure of Formula (V):

 (IV)

 (V)

wherein R' and $R^L$ have the aforestated meanings.

In an illustrative embodiment, a protonated or deprotonated, substituted or unsubstituted 2-carboxyethyl moiety can include, for example, a moiety represented by the structure of Formula (VI) or a moiety represented by the structure of Formula (VII):

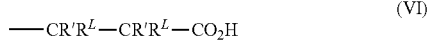
$$—CR'R^L—CR'R^L—CO_2H \quad (VI)$$

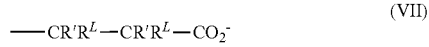
$$—CR'R^L—CR'R^L—CO_2^- \quad (VII)$$

wherein R' and $R^L$ have the aforestated meanings.

In an illustrative embodiment, a protonated or deprotonated, substituted or unsubstituted phosphonomethyl moiety can include, for example, a moiety represented by the structure of Formula (VIII) or a moiety represented by the structure of Formula (IX) or a moiety represented by the structure of Formula (X):

$$—CR'R^L—PO_3H_2, \quad (VIII)$$

$$—CR'R^L—PO_3H^- \quad (IX)$$

$$—CR'R^L—PO_3^{2-} \quad (X)$$

wherein R' and $R^L$ have the aforestated meanings.

In an illustrative embodiment, a protonated or deprotonated, substituted or unsubstituted 2-phosphonoethyl moiety can include, for example, a moiety represented by the structure of Formula (XI) or a moiety represented by the structure of Formula (XII) or a moiety represented by the structure of Formula (XIII):

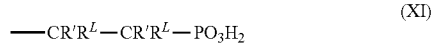
$$—CR'R^L—CR'R^L—PO_3H_2 \quad (XI)$$

$$—CR'R^L—CR'R^L—PO_3H^- \quad (XII)$$

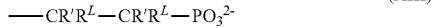
$$—CR'R^L—CR'R^L—PO_3^{2-} \quad (XIII)$$

wherein R' and $R^L$ have the aforestated meanings.

In an illustrative embodiment, a protonated or deprotonated, substituted or unsubstituted 2-hydroxyethyl moiety can include, for example, a moiety represented by the structure of Formula (XIV) or a moiety represented by the structure of Formula (XV):

$$—CR'R^L—CR'R^L—OH \quad (XIV)$$

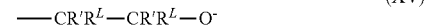
$$—CR'R^L—CR'R^L—O^- \quad (XV)$$

wherein R' and $R^L$ have the aforestated meanings.

In an illustrative embodiment, a protonated or deprotonated, substituted or unsubstituted 3-hydroxypropyl moiety can include, for example, a moiety represented by the structure of Formula (XVI) or a moiety represented by the structure of Formula (XVII):

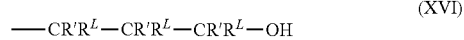
$$—CR'R^L—CR'R^L—CR'R^L—OH \quad (XVI)$$

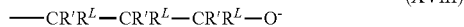
$$—CR'R^L—CR'R^L—CR'R^L—O^- \quad (XVIII)$$

wherein R' and $R^L$ have the aforestated meanings.

The term "substituted" as used herein may be the same or different substituent and includes, for example, hydrogen, halogens (e.g., fluorine), substituted or unsubstituted alkyl groups, substituted or unsubstituted alkoxy groups, substituted or unsubstituted alkenyl groups, substituted or unsubstituted alkynyl groups, substituted or unsubstituted aryl groups, substituted or unsubstituted arylalkyl groups, substituted or unsubstituted cycloalkyl groups, substituted or unsubstituted cycloalkenyl groups, substituted or unsubstituted heteroaryl groups, substituted heterocyclylalkyl groups, substituted or unsubstituted heteroarylalkyl groups, substituted or unsubstituted heterocyclic ring groups, amide-containing groups, carboxylic acid-containing groups, carbonyl-containing groups, ester-containing groups, ether-containing groups, ketone-containing groups and the like.

Suitable hydrocarbyl groups include, by way of example, a substituted or unsubstituted, straight or branched $C_1$ to $C_{18}$ alkyl group, a substituted or unsubstituted $C_3$ to $C_{18}$ cycloalkyl group, a substituted or unsubstituted $C_3$ to $C_{18}$ cycloalkylalkyl group, a substituted or unsubstituted $C_3$ to $C_{18}$ cycloalkenyl group, a substituted or unsubstituted $C_6$ to $C_{18}$ aryl group, and a substituted or unsubstituted $C_6$ to $C_{18}$ arylalkyl group.

Representative examples of alkyl groups for use herein include, by way of example, a straight or branched hydrocarbon chain radical containing carbon and hydrogen atoms of from 1 to about 18 carbon atoms, e.g., methyl, ethyl, n-propyl, 1-methylethyl (isopropyl), n-butyl, n-pentyl, etc., and the like. In an embodiment, examples of alkyl groups for use herein include a straight or branched hydrocarbon chain radical containing carbon and hydrogen atoms of from 1 to about 12 carbon atoms. In an embodiment, examples of alkyl groups for use herein include a straight or branched hydrocarbon chain radical containing carbon and hydrogen atoms of from 1 to about 9 carbon atoms. In an embodiment, examples of alkyl groups for use herein include a straight hydrocarbon chain radical containing carbon and hydrogen atoms of from 1 to 6 carbon atoms.

Representative examples of cycloalkyl groups for use herein include, by way of example, a substituted or unsubstituted non-aromatic mono or multicyclic ring system of about 3 to about 18 carbon atoms or about 3 to about 12 carbon atoms such as, for example, cyclopropyl, cyclobutyl, cyclopentyl, cyclohexyl, bridged cyclic groups or spirobicyclic groups and the like, optionally containing one or more heteroatoms, e.g., O and N, and the like.

Representative examples of cycloalkenyl groups for use herein include, by way of example, a substituted or unsubstituted cyclic ring-containing radical containing from about 3 to about 18 carbon atoms or about 3 to about 12 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of cycloalkylalkyl groups for use herein include, by way of example, a substituted or unsubstituted cyclic ring-containing radical containing from about 3 to about 18 carbon atoms or about 3 to about 12 carbon atoms directly attached to the alkyl group which are then attached to the main structure at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of aryl groups for use herein include, by way of example, a substituted or unsubstituted monoaromatic or polyaromatic radical containing from about 6 to about 30 carbon atoms or about 5 to about 12 carbon atoms such as, for example, phenyl, naphthyl, tetrahydronaphthyl, indenyl, biphenyl and the like, optionally containing one or more heteroatoms, e.g., O and N, and the like.

Representative examples of arylalkyl groups for use herein include, by way of example, a substituted or unsubstituted aryl group as defined above directly bonded to an alkyl group as defined herein, e.g., —CH$_2$C$_6$H$_5$, —C$_2$H$_4$C$_6$H$_5$ and the like, wherein the aryl group can optionally contain one or more heteroatoms, e.g., O and N, and the like.

In an embodiment, R is independently a substituted or unsubstituted C$_1$ to C$_{18}$ alkyl moiety, a straight or branched, substituted or unsubstituted C$_1$ to C$_{18}$ hydroxyalkyl moiety, a straight or branched substituted or unsubstituted C$_1$ to C$_{18}$ alkyl moiety containing one or more stable ether linkages, a substituted or unsubstituted aryl moiety, or a substituted or unsubstituted alkyl aryl moiety.

In an illustrative embodiment, a compound of Formula (I) includes at least one pair of adjacent R$^a$ and R$^c$ or R$^a$ and R$^d$ or R$^b$ and R$^c$ or R$^b$ and R$^d$ which is joined together to form either a trans-cyclopentane moiety or a trans-cyclohexane moiety.

In an illustrative embodiment, one of R$^1$, R$^2$ and R$^3$ is a protonated or deprotonated, substituted or unsubstituted 2-hydroxybenzyl moiety containing a linking group for covalently linking the compound of Formula (I) to an organic polymer resin, and the other of R$^1$, R$^2$ and R$^3$ are a protonated or deprotonated, substituted or unsubstituted 2-hydroxybenzyl moiety not containing a linking group for covalently linking the compound of Formula (I) to an organic polymer resin.

In an illustrative embodiment, two of R$^1$, R$^2$ and R$^3$ are a protonated or deprotonated, substituted or unsubstituted 2-hydroxybenzyl moiety containing a linking group for covalently linking the compound of Formula (I) to an organic polymer resin, and the other of R$^1$, R$^2$ and R$^3$ is a protonated or deprotonated, substituted or unsubstituted 2-hydroxybenzyl moiety not containing a linking group for covalently linking the compound of Formula (I) to an organic polymer resin.

In an illustrative embodiment, each of R$^1$, R$^2$ and R$^3$ is a protonated or deprotonated, substituted or unsubstituted 2-hydroxybenzyl moiety containing a linking group for covalently linking the compound of Formula (I) to an organic polymer resin.

In an illustrative embodiment, each of R$^1$, R$^2$ and R$^3$ is a protonated or deprotonated, substituted or unsubstituted 2-hydroxybenzyl moiety not containing a linking group, and one R$^a$ is a linking group for covalently linking the compound of Formula (I) to an organic polymer resin, and each of the other R$^a$'s together with each of the R$^b$, R$^c$ and R$^d$'s are hydrogen.

In an illustrative embodiment, one, two or three linking groups occur in the compound of Formula I.

In an illustrative embodiment, a linking group as discussed above can be a group represented by the formula —(CR"R")$_x$—(C$_6$Y$_4$)$_y$—(CR"R")$_z$—NR$^5$R$^6$ where R" is independently hydrogen, a substituted or unsubstituted hydrocarbyl group as defined herein such as a straight or branched, substituted or unsubstituted C$_1$ to C$_{18}$ alkyl moiety, a straight or branched, substituted or unsubstituted C$_1$ to C$_{18}$ hydroxyalkyl moiety, or a straight or branched substituted or unsubstituted C$_1$ to C$_{18}$ alkyl moiety containing one or more stable ether linkages, x is 0 to 4, y is 0 or 1, z is 1 to 4, R$^5$ and R$^6$ are independently hydrogen, methyl, ethyl, hydroxyethyl or hydroxypropyl, or R$^5$ and R$^6$ together with the nitrogen atom they are bonded to can be joined together to form a ring structure, e.g., a phthalimide, and Y is independently a halogen (e.g., F, Cl, Br, I), a functional group chosen from SO$_3$H, SO$_3^-$, CO$_2$H, CO$_2^-$, carboxyethyl, carboxymethyl, hydroxyethyl, hydroxypropyl, CF$_3$, NO$_2$, OH, CN, C$_6$H$_5$, CH$_2$C$_6$H$_5$, a straight or branched, substituted or unsubstituted C$_1$ to C$_{18}$ alkyl moiety or a C$_1$ to C$_4$ alkyl moiety, and a straight or branched C$_1$ to C$_{18}$ fluoroalkyl moiety or a C$_1$ to C$_4$ fluoroalkyl moiety.

In another embodiment, a linking group can be a group represented by the formula —(CR"R")$_x$—(CR"R")$_z$—NHR$^5$ where x, z, R" and R$^5$ have the aforestated meanings. In an embodiment, a linking group can be a group represented by the formula —(CH$_2$)$_x$—NH$_2$ where x is from 2 to 6.

In an illustrative embodiment, a linking group can be a group represented by the formula —(CR"R")$_x$—(C$_6$Y$_4$)$_y$—(CR"R")$_z$—NR$^6$R$^6$ where x, y, z, R", and Y have the aforestated meanings, and R$^6$ is 2-hydroxyethyl.

In an illustrative embodiment, a linking group can be a group represented by the formula —(CR"R")$_x$—(C$_6$Y$_4$)$_y$—X where x, y, Y and R" have the aforestated meanings, and X is Br or I.

In another illustrative embodiment, a linking group can be a group represented by the formula —(CR"R")$_x$—(C$_6$Y$_4$)$_y$—(CR"R")$_z$—CR$^7$=CR$^8$R$^9$ wherein x, y, z, Y and R" have the aforestated meanings, and R$^7$, R$^8$ and R$^9$ are independently hydrogen or a group with C$_1$ to C$_4$ carbon atoms.

In another illustrative embodiment, a linking group can be a group represented by the formula —(CR"R")$_x$—(C$_6$Y$_4$)$_y$—(CR"R")$_z$—R$^{10}$ wherein x, y, z, Y and R" have the aforestated meanings, and R$^{10}$ is an epoxide derivative of the olefinic linking group —(CR"R")$_x$—(C$_6$Y$_4$)—(CR"R")$_z$—CR$^7$=CR$^8$R$^9$.

One skilled in the art will readily understand that the linking groups disclosed herein can be in various protonated states as will be illustrated in more detail below.

In an illustrative embodiment, a compound of Formula (I) can be represented by a structure of Formula (Ia):

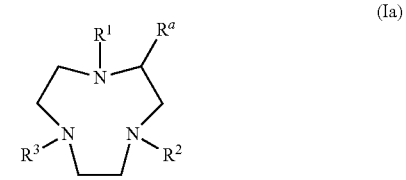

(Ia)

or a salt thereof, wherein R$^1$, R$^2$ and R$^3$ are as defined above and R$^a$ is hydrogen or a linking group for covalently linking the compound of Formula (Ia) to an organic polymer resin, with at least one linking group occurring in the compound of Formula (Ia).

In an illustrative embodiment, one of R$^1$, R$^2$ and R$^3$ is a protonated or deprotonated, substituted or unsubstituted 2-hydroxybenzyl moiety optionally containing a linking group for covalently linking the compound of Formula (Ia) to an organic polymer resin.

In an illustrative embodiment, two of R$^1$, R$^2$ and R$^3$ are a protonated or deprotonated, substituted or unsubstituted 2-hydroxybenzyl moiety with the other of R$^1$, R$^2$ and R$^3$ being a protonated or deprotonated, substituted or unsubstituted 2-hydroxybenzyl moiety optionally containing a linking group for covalently linking the compound of Formula (Ia) to an organic polymer resin.

In an illustrative embodiment, each of $R^1$, $R^2$ and $R^3$ is a protonated or deprotonated, substituted or unsubstituted 2-hydroxybenzyl moiety optionally containing a linking group for covalently linking the compound of Formula (Ia) to an organic polymer resin.

In an illustrative embodiment, one of $R^1$, $R^2$ and $R^3$ is a protonated or deprotonated, substituted or unsubstituted 2-hydroxybenzyl moiety containing a linking group for covalently linking the compound of Formula (Ia) to an organic polymer resin, and the other of $R^1$, $R^2$ and $R^3$ are a protonated or deprotonated, substituted or unsubstituted 2-hydroxybenzyl moiety not containing a linking group for covalently linking the compound of Formula (Ia) to an organic polymer resin.

In an illustrative embodiment, two of $R^1$, $R^2$ and $R^3$ are a protonated or deprotonated, substituted or unsubstituted 2-hydroxybenzyl moiety containing a linking group for covalently linking the compound of Formula (Ia) to an organic polymer resin, and the other of $R^1$, $R^2$ and $R^3$ is a protonated or deprotonated, substituted or unsubstituted 2-hydroxybenzyl moiety not containing a linking group for covalently linking the compound of Formula (Ia) to an organic polymer resin.

In an illustrative embodiment, each of $R^1$, $R^2$ and $R^3$ is a protonated or deprotonated, substituted or unsubstituted 2-hydroxybenzyl moiety containing a linking group for covalently linking the compound of Formula (Ia) to an organic polymer resin, and $R^a$ is hydrogen.

In an illustrative embodiment, each of $R^1$, $R^2$ and $R^3$ is a protonated or deprotonated, substituted or unsubstituted 2-hydroxybenzyl moiety containing no linking group, and $R^a$ is a linking group for covalently linking the compound of Formula (Ia) to an organic polymer resin.

In an illustrative embodiment, a compound of Formula (I) can be represented by a structure of Formula (Ib):

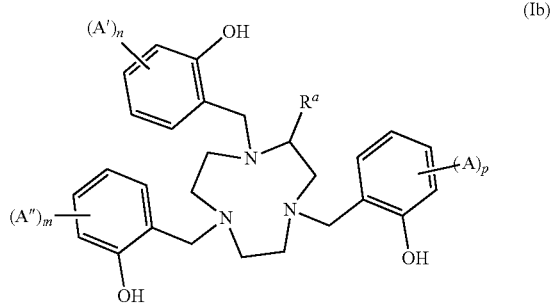

(Ib)

or a salt thereof, wherein n, m and p each are independently an integer from 1 to 4; A, A', A" and $R^a$ are independently hydrogen, a substituted or unsubstituted hydrocarbyl group of from 1 to about 18 carbon atoms, a halogen, a polar functional group or a linking group for covalently linking the compound of Formula (Ib) to an organic polymer resin, wherein at least one linking group occurs in the compound. Examples of suitable substituted or unsubstituted hydrocarbyl groups, halogens and polar functional groups can be any of those discussed above. As one skilled in the art will readily appreciate, a polar functional group as used herein is a group to assist in modifying the hydrophilicity characteristics for certain applications such as, for example, biomedical applications, or better facilitate the synthesis of linking the linking group to the organic polymer resin.

In some embodiments, one of A, A', A" and $R^a$ is a linking group for covalently linking the compound of Formula (Ib) to an organic polymer resin, and the other of A, A', A" and R are as defined above. In an embodiment, a linking group can be a group represented by the formula $-(CH_2)_x-NH_2$ where x is from 2 to 6.

In some embodiments, one of A, A' and A" is a linking group for covalently linking the compound of Formula (Ib) to an organic polymer resin and the other A, A' and A" and $R^a$ are as defined above. In an embodiment, a linking group can be a group represented by the formula $-(CH_2)_x-NH_2$ where x is from 2 to 6.

In some embodiments, two of A, A' and A" are a linking group for covalently linking the compound of Formula (Ib) to an organic polymer resin and the other one of A, A' and A" and $R^a$ are as defined above. In an embodiment, a linking group can be a group represented by the formula $-(CH_2)_x-NH_2$ where x is from 2 to 6.

In some embodiments, each of A, A' and A" is a linking group for covalently linking the compound of Formula (Ib) to an organic polymer resin and $R^a$ is as defined above. In an embodiment, a linking group can be a group represented by the formula $-(CH_2)_x-NH_2$ where x is from 2 to 6.

In some embodiments, each of A, A' and A" are independently hydrogen or R as defined above and $R^a$ is a linking group for covalently linking the compound of Formula (Ib) to an organic polymer resin. In an embodiment, a linking group can be a group represented by the formula $-(CH_2)_x-NH_2$ where x is from 2 to 6.

Representative examples of a compound represented by Formula (I) include at least the following:

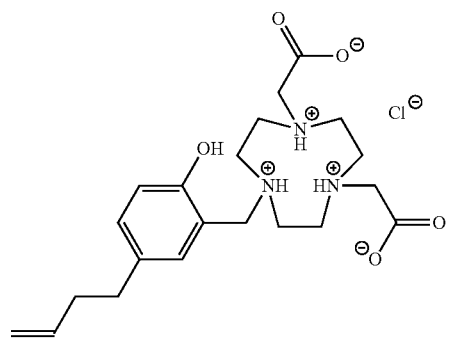

-continued

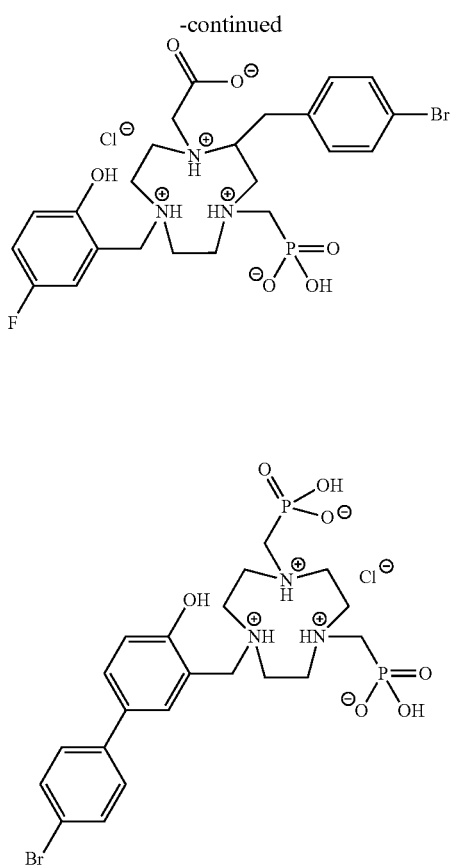

-continued

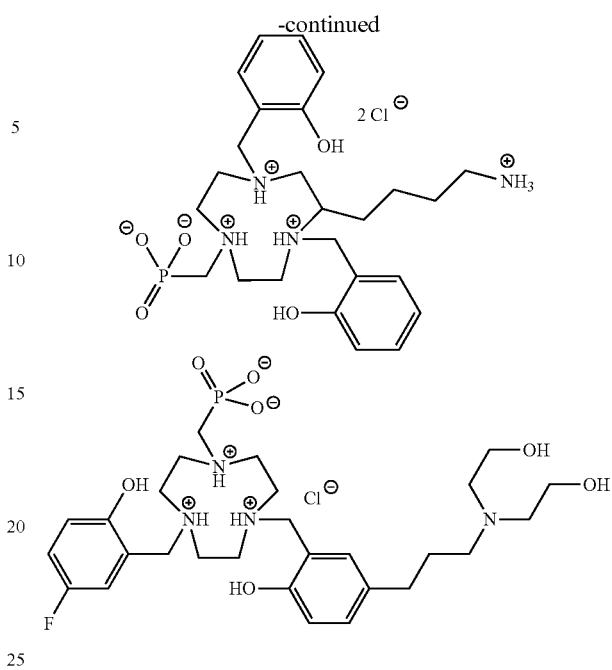

In general, the compounds represented by Formula (I) can be prepared by methods known in the art, see, for example, U.S. Pat. No. 9,981,967, Cox et al., J. Chem. Soc. Perkin Trans., Vol. 1, pp. 2567-2576 (1990) and Laverman et al., *Tumor Biol.*, 33, pp. 427-434 (2012), the contents of each of which are incorporated by reference herein.

For example, in an illustrative embodiment, compounds represented by Formula (I) and linking arms can be prepared as generally set forth below in the following schemes. It is to be appreciated that these and other schemes for obtaining the metal-chelating resins disclosed herein are presented by way of example only, and should not be construed as limiting in any way. In addition, the following schemes illustrate certain protecting groups for the benzyl group and linking arm. These protecting groups are merely illustrative and should not be construed as limiting in any way. Any suitable protecting group is contemplated and can be used herein.

In an illustrative embodiment, a compound represented by Formula (I) can be prepared as generally set forth below in Scheme I.

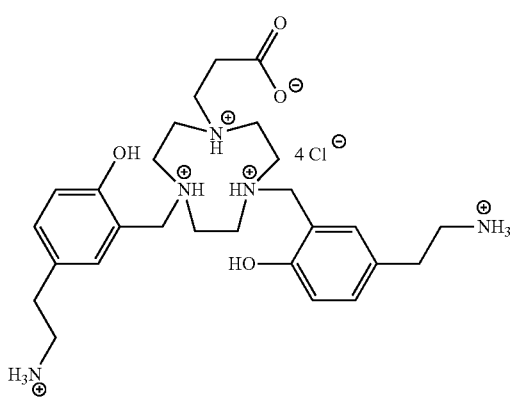

SCHEME I

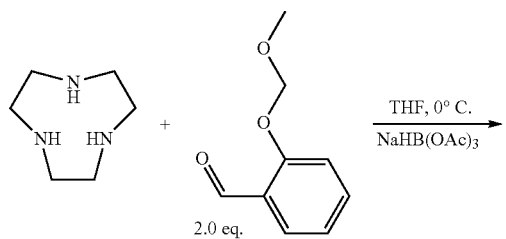

-continued
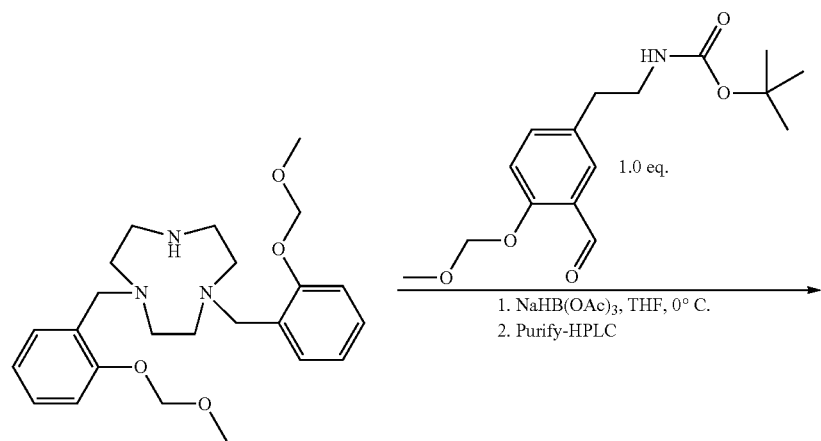
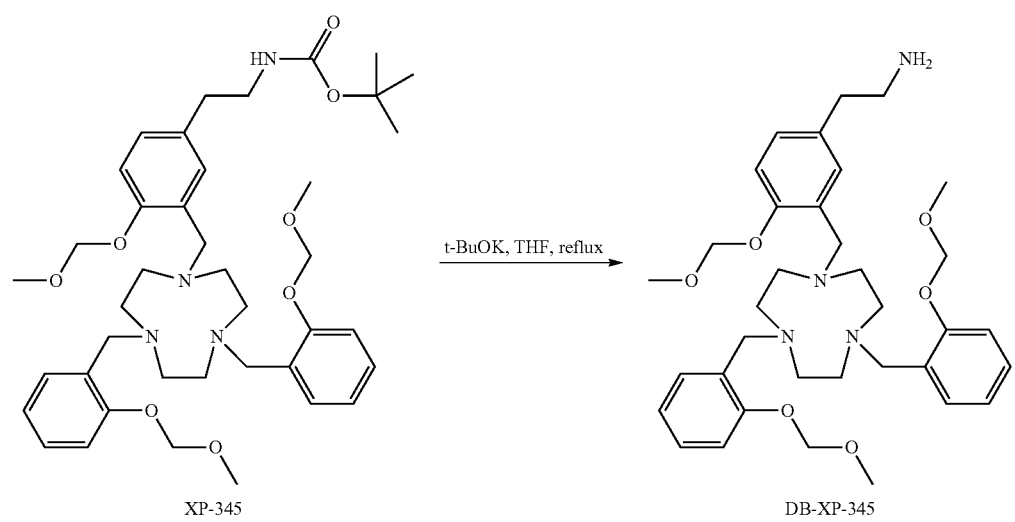

The resulting compound identified as DB-XP-345 in Scheme I is then attached to an organic polymer resin by way of the amine group of the linking arm and the methoxymethyl protecting groups are thereafter removed and hydroxyl groups are formed on the benzyl groups to obtain the metal-chelating resin.

In an illustrative embodiment, the linking arm to attach to the macrocycle compound via an aldehyde group can be prepared as generally set forth below in Scheme II.

In another illustrative embodiment, another linking arm with a different protecting group to attach to the macrocycle compound via an aldehyde group can be prepared as generally set forth below in Scheme III.

SCHEME II

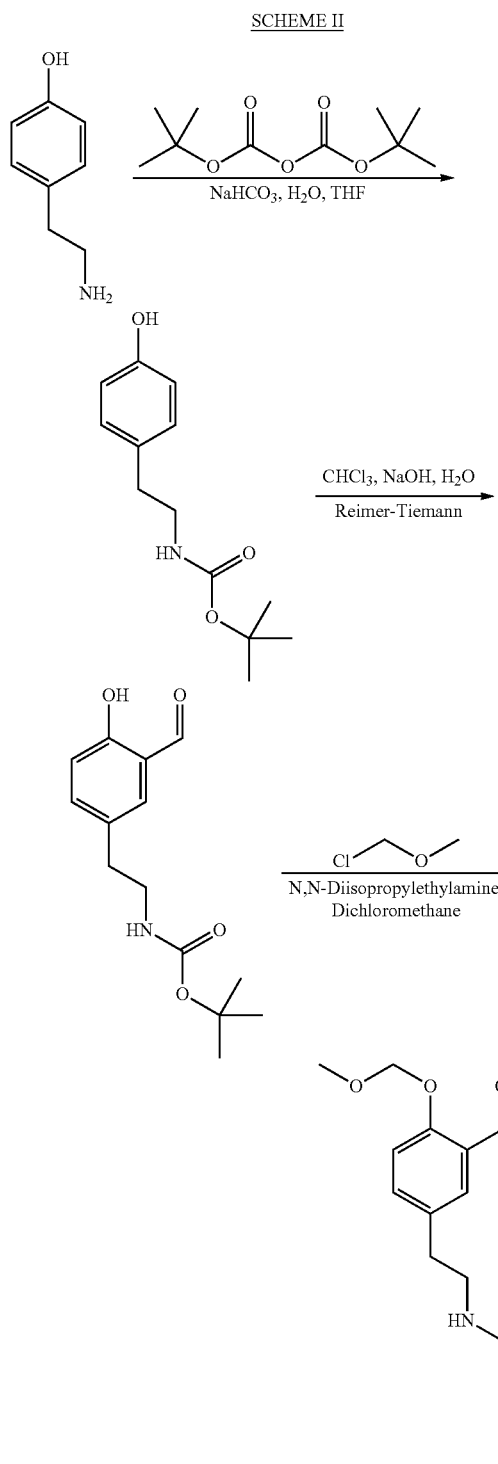

SCHEME III

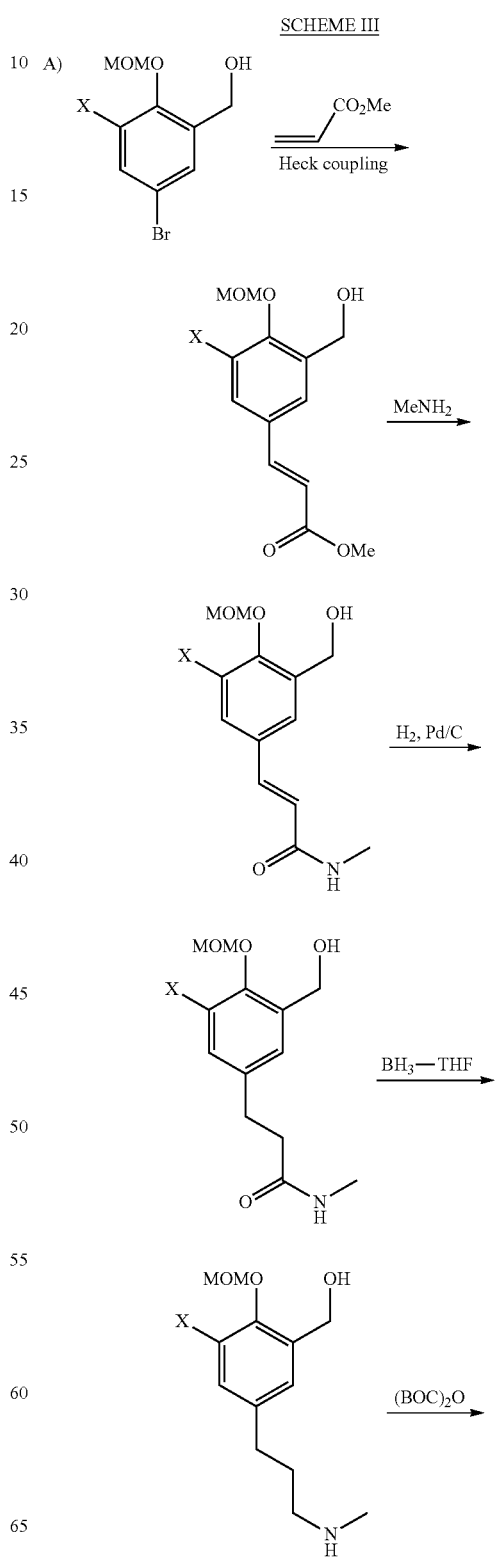

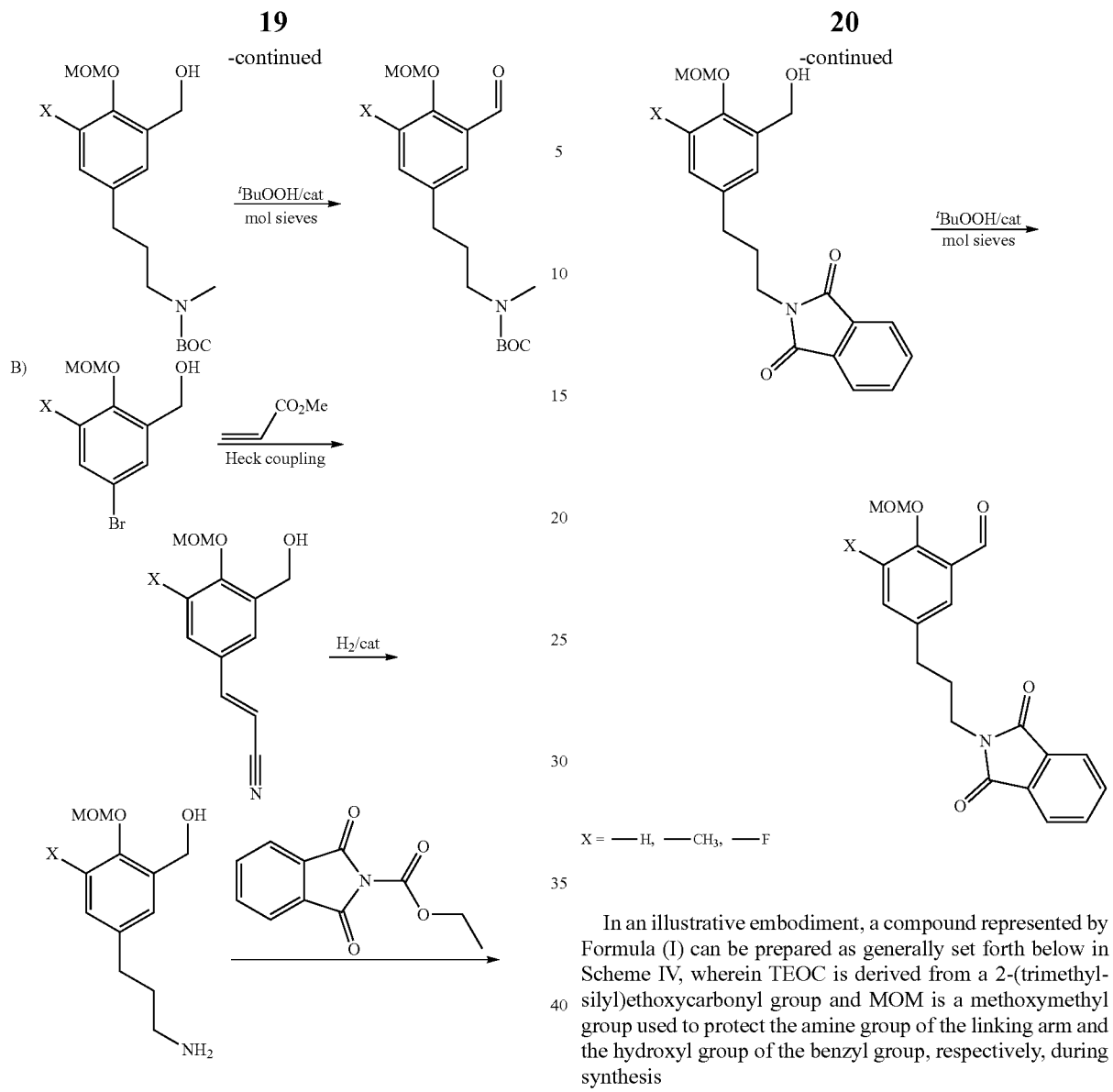

$X = $ —H, —$CH_3$, —F

In an illustrative embodiment, a compound represented by Formula (I) can be prepared as generally set forth below in Scheme IV, wherein TEOC is derived from a 2-(trimethylsilyl)ethoxycarbonyl group and MOM is a methoxymethyl group used to protect the amine group of the linking arm and the hydroxyl group of the benzyl group, respectively, during synthesis

SCHEME IV

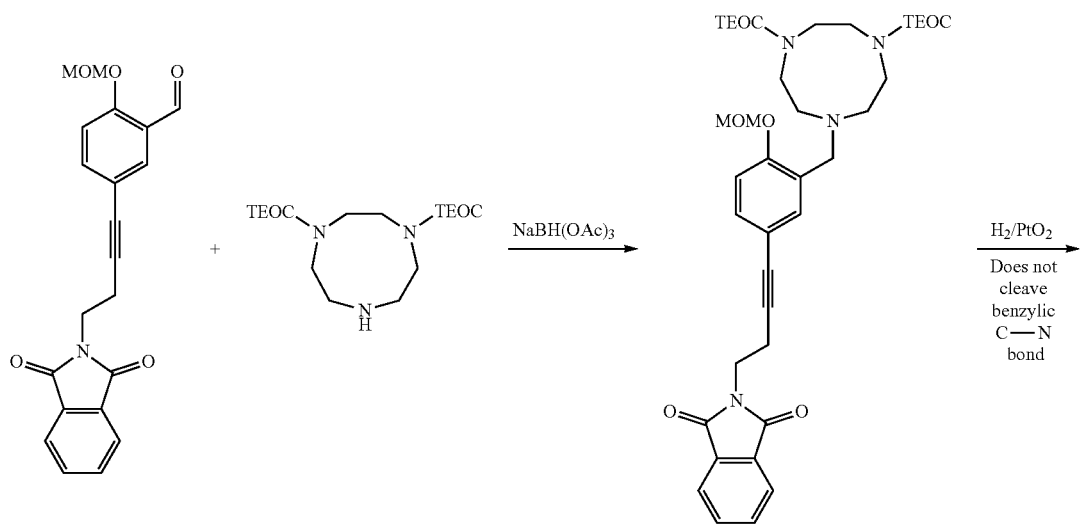

21     -continued     22
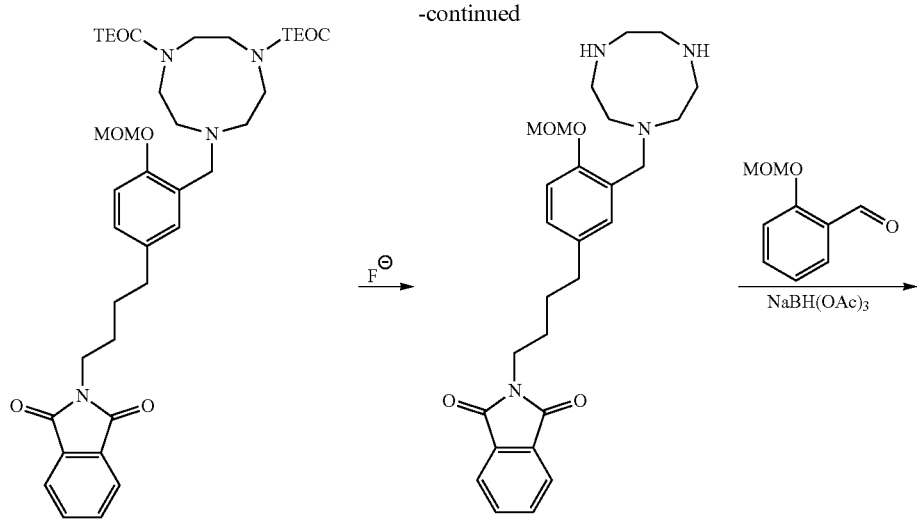
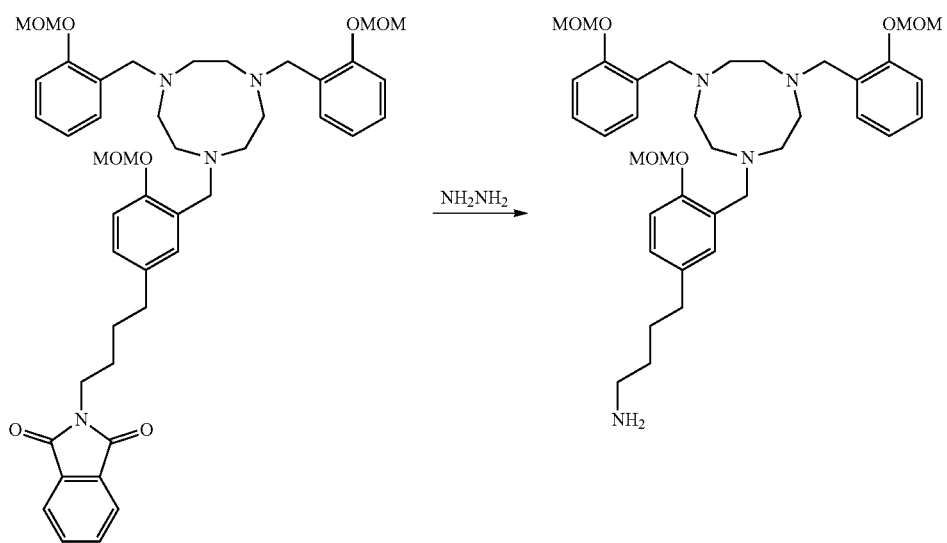

The resulting compound in Scheme IV is then attached to an organic polymer resin by way of the amine group of the linking arm and the methoxymethyl protecting groups are thereafter removed and free hydroxyl groups are formed on the benzyl groups to obtain the metal-chelating resin.

The starting compound used in Scheme IV above can be prepared as follows:

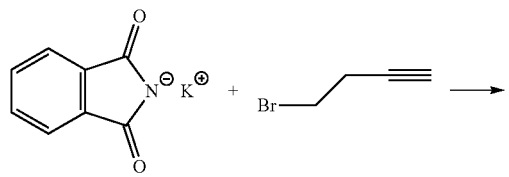

-continued

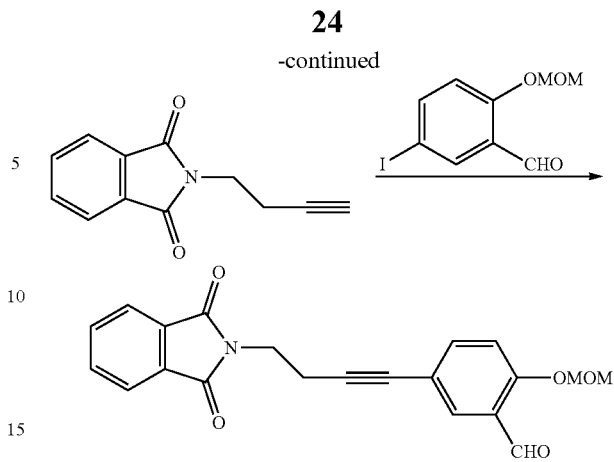

In an illustrative embodiment, a compound represented by Formula (I) can be prepared as generally set forth below in Scheme V.

SCHEME V

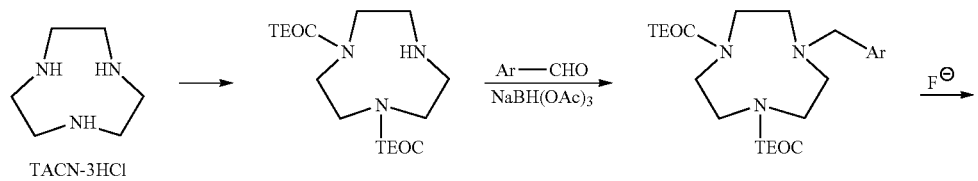

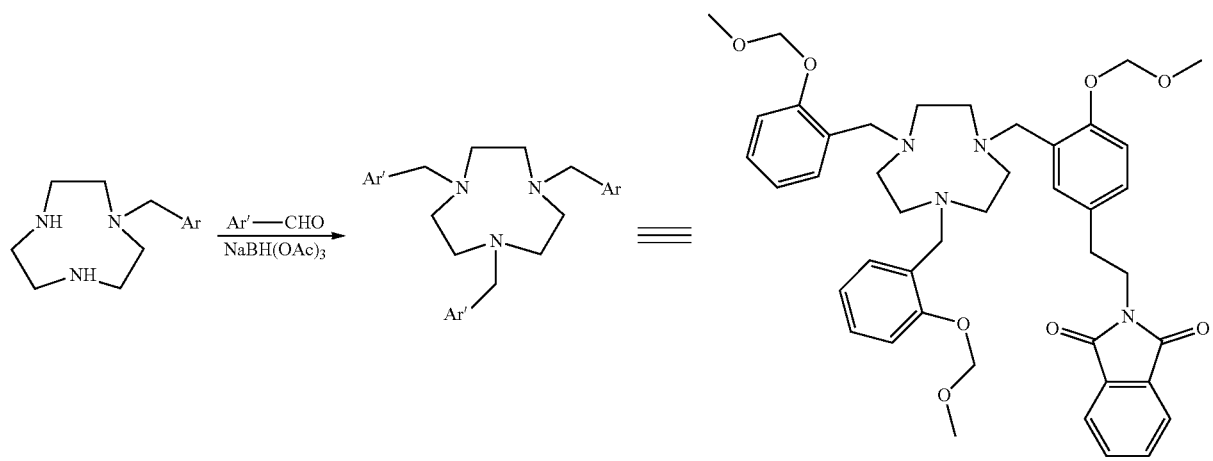

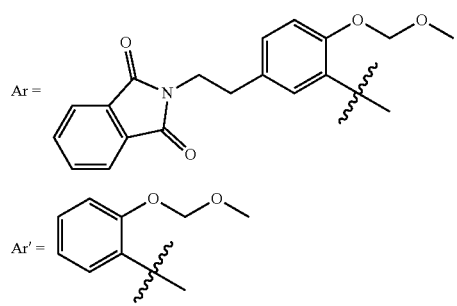

The protecting group on the linking arm of the resulting compound in Scheme V is then removed by, for example, the process shown in Scheme IV, and then attached to an organic polymer resin by way of the amine group of the linking arm. The methoxymethyl protecting groups are thereafter removed and free hydroxyl groups are formed on the benzyl groups to obtain the metal-chelating resin.

In an illustrative embodiment, compounds represented by Formula (I) can be prepared as set forth below in Scheme VI and Scheme VII.

SCHEME VI

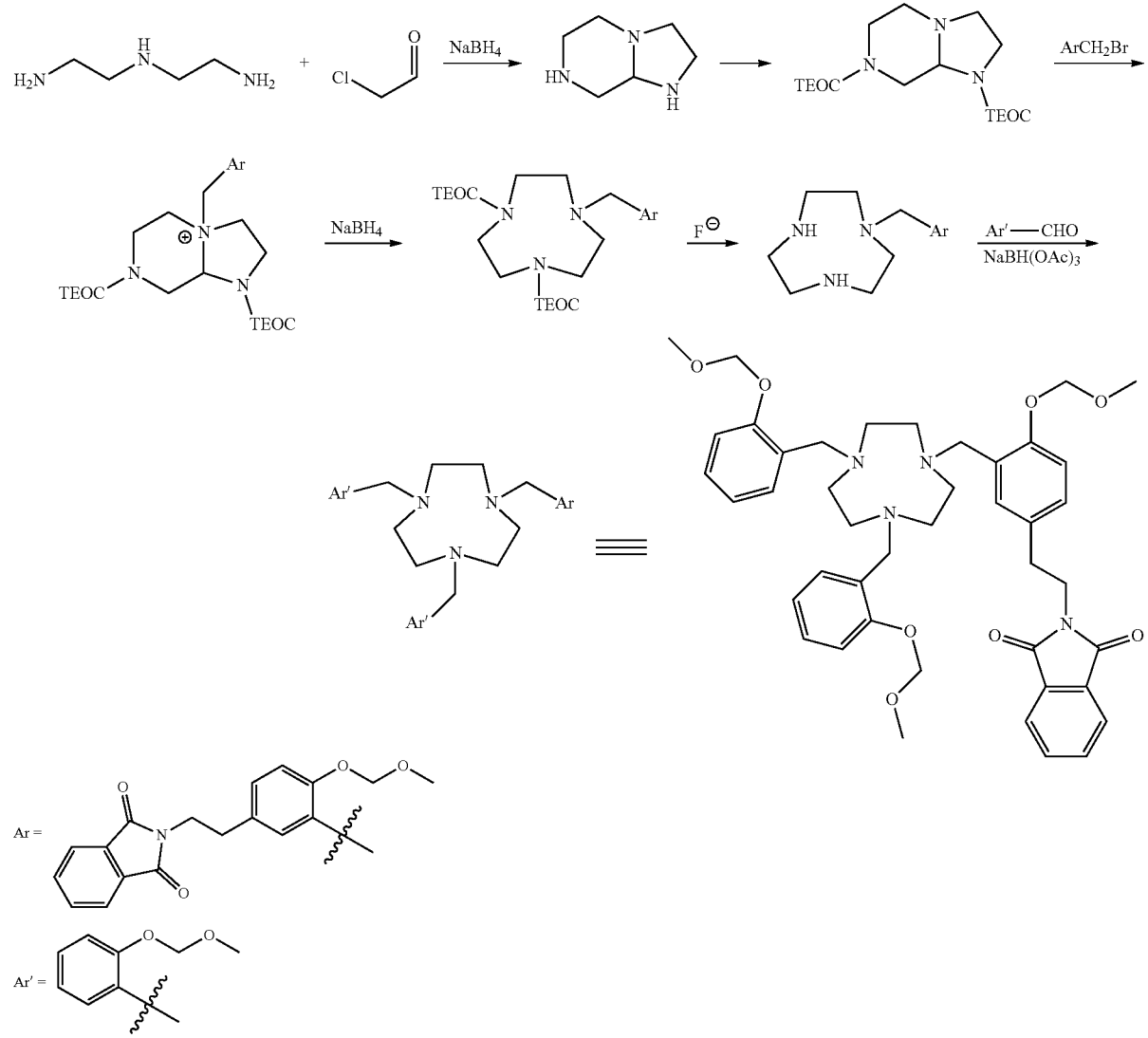

The protecting group on the linking arm of the resulting compound in Scheme VI is then removed by, for example, the process shown in Scheme IV, and an amine group is formed. Next, an organic polymer resin is attached to the compound in Scheme VI by way of the amine group of the linking arm. The methoxymethyl protecting groups are thereafter removed and free hydroxyl groups are formed on the benzyl groups to obtain the metal-chelating resin.

SCHEME VII

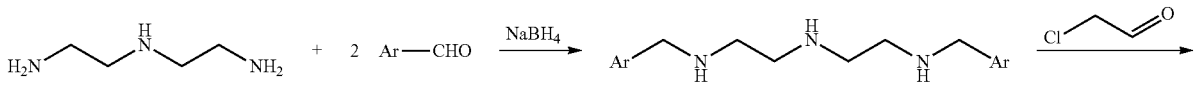

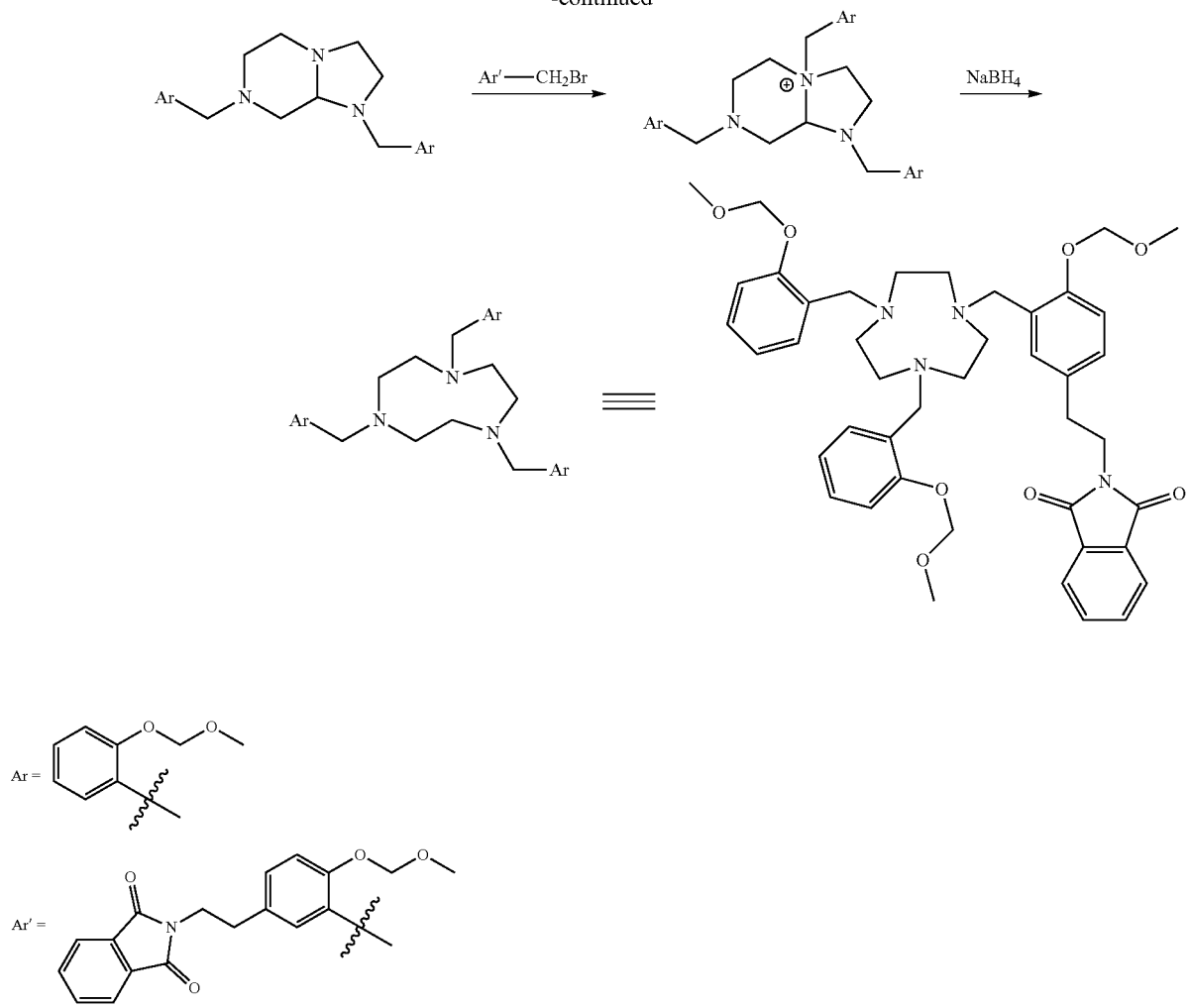

The protecting group on the linking arm of the resulting compound in Scheme VII is then removed by, for example, the process shown in Scheme IV, and an amine group is formed. Next, an organic polymer resin is attached to the compound in Scheme VII by way of the amine group of the linking arm. The methoxymethyl protecting groups are thereafter removed and free hydroxyl groups are formed on the benzyl groups to obtain the metal-chelating resin.

In an illustrative embodiment, a compound represented by Formula (I) can be prepared as generally set forth below in Scheme VIII.

SCHEME VIII

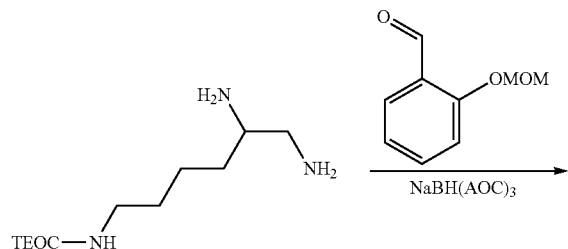

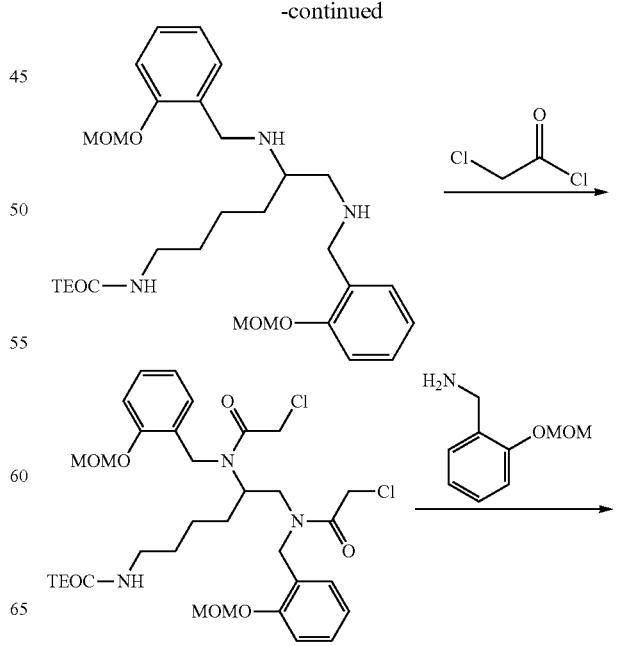

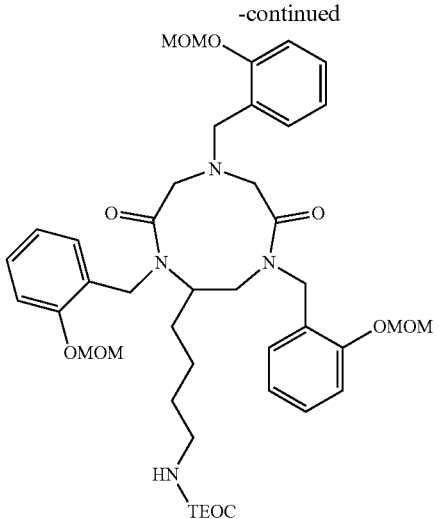

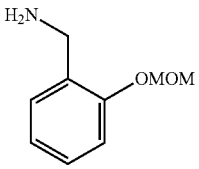

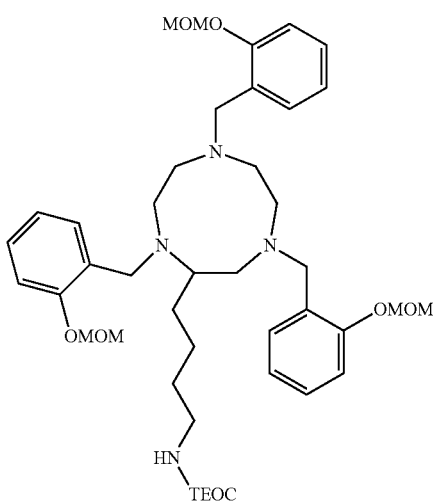

The TEOC protecting group on the linking arm of the resulting compound in Scheme VIII is then removed and an amine group is formed. Next, an organic polymer resin is attached to the resulting compound in Scheme VIII by way of the amine group of the linking arm. The methoxymethyl protecting groups are thereafter removed and free hydroxyl groups are formed on the benzyl groups to obtain the metal-chelating resin.

The benzylamine used in the synthesis above can be prepared as follows.

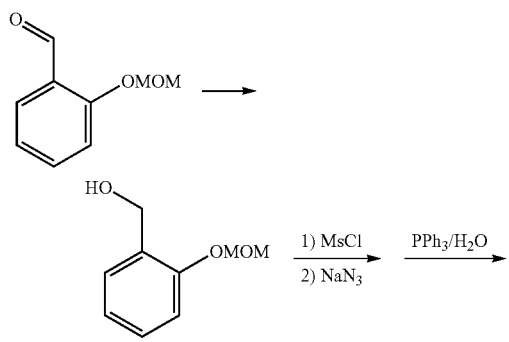

As one skilled in the art will readily appreciate, the benzylamine can be prepared according to other methods known in the art. Therefore, the above description should not be construed as limiting, but merely as exemplary for making a benzylamine.

In an illustrative embodiment, a compound represented by Formula (I) can be prepared as generally set forth below in Scheme IX.

SCHEME IX

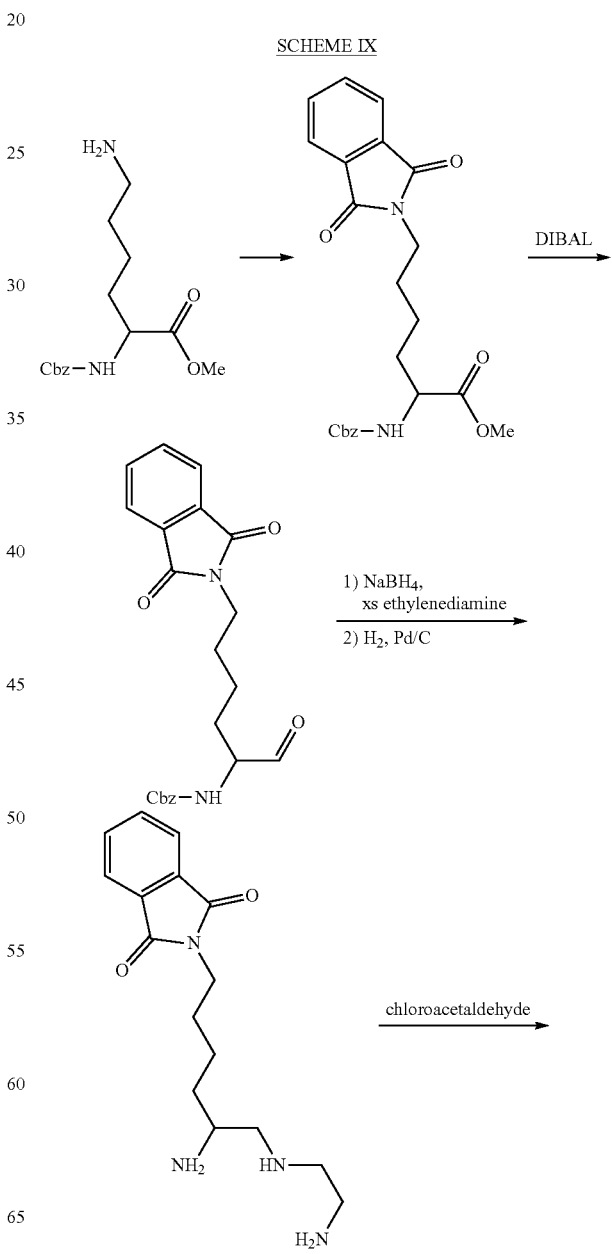

31
-continued

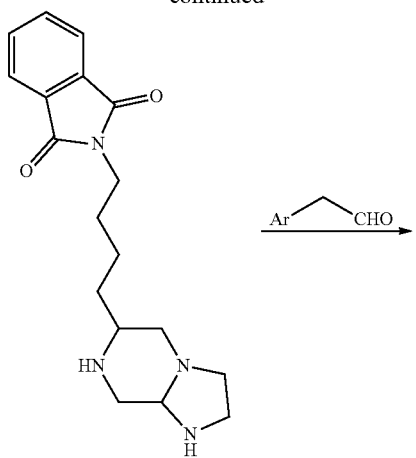

32
-continued

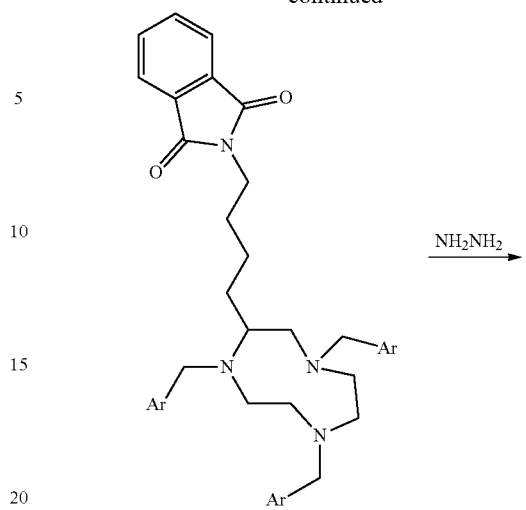

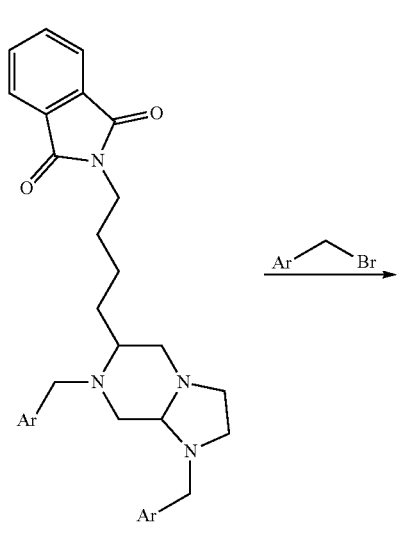

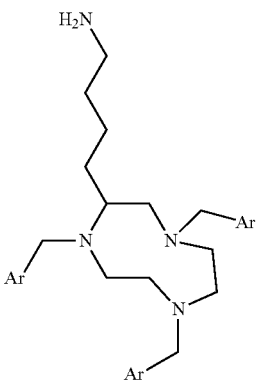

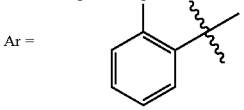

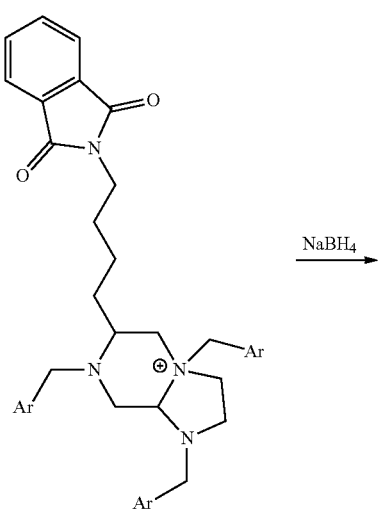

The resulting compound shown in Scheme IX is then attached to an organic polymer resin by way of the amine group of the linking arm. The methoxymethyl protecting groups are thereafter removed and free hydroxyl groups are formed on the benzyl groups to obtain the metal-chelating resin.

In an illustrative embodiment, a compound represented by Formula (I) can be prepared as generally set forth below in Scheme X.

SCHEME X
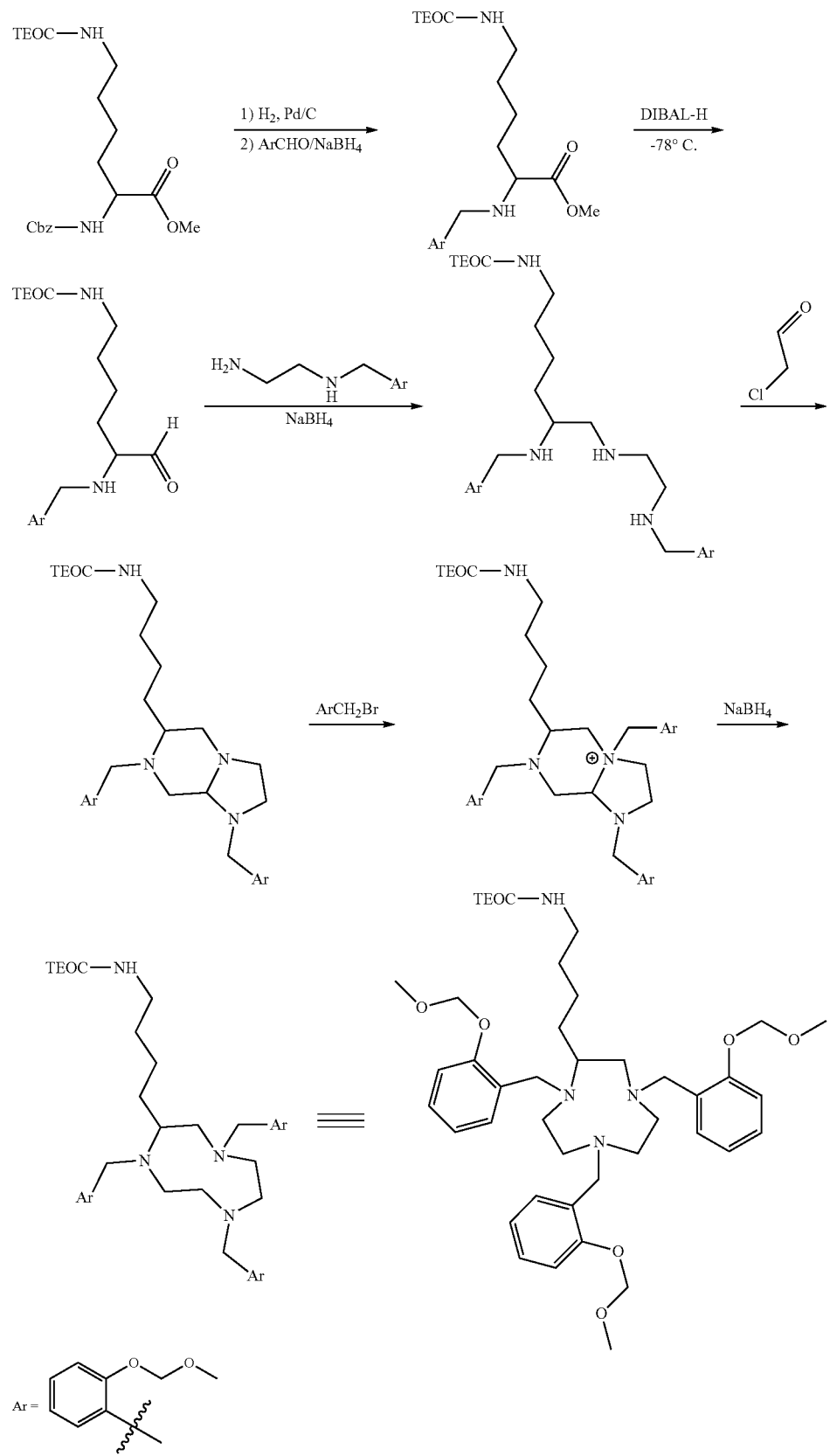

The TEOC protecting group on the linking arm of the resulting compound in Scheme X is then removed and an amine group is formed. Next, an organic polymer resin is attached to the compound in Scheme X by way of the amine group of the linking arm. The methoxymethyl protecting groups are thereafter removed and free hydroxyl groups are formed on the benzyl groups to obtain the metal-chelating resin.

In another embodiment, a metal-chelating resin comprises (a) a compound represented by Formula (II):

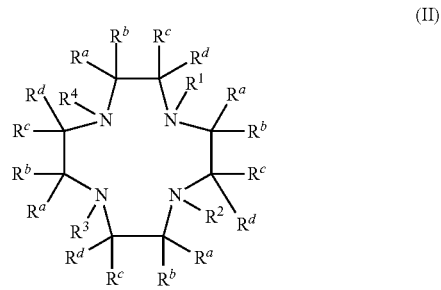

(II)

or a stereoisomeric form thereof or a salt thereof, wherein $R^1$, $R^2$, $R^3$ and $R^4$ are independently hydrogen, a protonated or deprotonated, substituted or unsubstituted 2-hydroxybenzyl moiety optionally containing a linking group for covalently linking the compound of Formula (II) to an organic polymer resin, a protonated or deprotonated, substituted or unsubstituted carboxyalkyl-containing moiety wherein the alkyl group is a substituted or unsubstituted methylene group or a substituted or unsubstituted ethylene group optionally containing a linking group for covalently linking the compound of Formula (II) to an organic polymer resin, a protonated or deprotonated, substituted or unsubstituted phosphonoalkyl-containing moiety wherein the alkyl group is a substituted or unsubstituted methylene group or a substituted or unsubstituted ethylene group optionally containing a linking group for covalently linking the compound of Formula (II) to an organic polymer resin or a protonated or deprotonated, substituted or unsubstituted hydroxyalkyl-containing moiety wherein the alkyl group is a substituted or unsubstituted ethylene group or a substituted or unsubstituted propylene group optionally containing a linking group for covalently linking the compound of Formula (II) to an organic polymer resin, wherein the 2-hydroxybenzyl moiety occurs no more than three times in the compound, and with the proviso that no more than one of $R^1$, $R^2$, $R^3$ and $R^4$ can be hydrogen;

$R^a$, $R^b$, $R^c$ and $R^d$ are independently R or a linking group for covalently linking the compound of Formula (II) to an organic polymer resin or wherein one of adjacent $R^a$ and R or $R^a$ and $R^d$ or $R^b$ and $R^c$ or $R^b$ and $R^d$ are joined together to form a cis- or trans-cyclopentane moiety or a cis- or trans-cyclohexane moiety;

R is independently hydrogen, or a substituted or unsubstituted hydrocarbyl group of from 1 to about 18 carbon atoms as defined herein, a halogen as defined herein, and a polar functional group as defined herein;

wherein when one of $R^1$, $R^2$, $R^3$ and $R^4$ is not hydrogen then at least one linking group for covalently linking the compound of Formula (II) to an organic polymer resin occurs in the compound; and (b) an organic polymer resin having at least one complementary reactive functional group covalently linked with $R^1$, $R^2$, $R^3$ or $R^4$ when one of $R^1$, $R^2$, $R^3$ and $R^4$ is hydrogen, at least one linking group of the compound represented by Formula (II) or both.

In an embodiment, the compound of Formula (II) includes at least one pair of adjacent $R^a$ and $R^c$ or $R^a$ and $R^d$ or $R^b$ and $R^c$ or $R^b$ and $R^d$ which is joined together to form either a trans-cyclopentane moiety or a trans-cyclohexane moiety.

In an embodiment, one of $R^1$, $R^2$, $R^3$ and $R^4$ is hydrogen and no additional linking groups occur in the compound of Formula (II).

In an embodiment, one of $R^1$, $R^2$, $R^3$ and $R^4$ is hydrogen and at least one linking group occurs in the compound of Formula (II).

In an embodiment, one of $R^1$, $R^2$, $R^3$ and $R^4$ is hydrogen and at least one linking group occurs in the compound of Formula (II).

In an embodiment, $R^1$, $R^2$, $R^3$ and $R^4$ are not hydrogen and at least one linking group occurs in the compound of Formula (II).

In an embodiment, $R^1$, $R^2$, $R^3$ and $R^4$ are not hydrogen and at least one linking group but no more than three linking groups occur in the compound of Formula (II).

In an embodiment, at least one but no more than three linking groups occur in the compound of Formula (II).

Examples of the protonated or deprotonated, substituted or unsubstituted 2-hydroxybenzyl moiety, the protonated or deprotonated, substituted or unsubstituted carboxyalkyl-containing moiety wherein the alkyl group is a substituted or unsubstituted methylene group or a substituted or unsubstituted ethylene group, the protonated or deprotonated, substituted or unsubstituted phosphonoalkyl-containing moiety wherein the alkyl group is a substituted or unsubstituted methylene group or a substituted or unsubstituted ethylene group and the protonated or deprotonated, substituted or unsubstituted hydroxyalkyl-containing moiety wherein the alkyl group is a substituted or unsubstituted ethylene group or a substituted or unsubstituted propylene group includes any of those discussed hereinabove.

Representative examples of a compound represented by Formula (II) include the following:

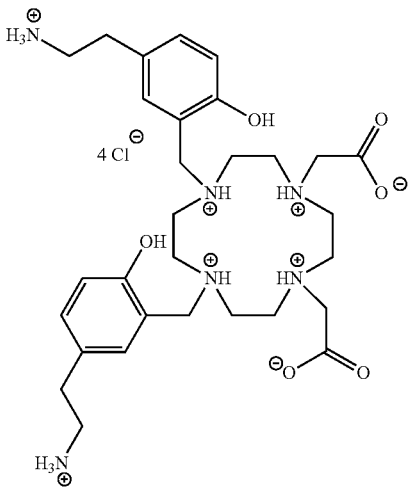

-continued

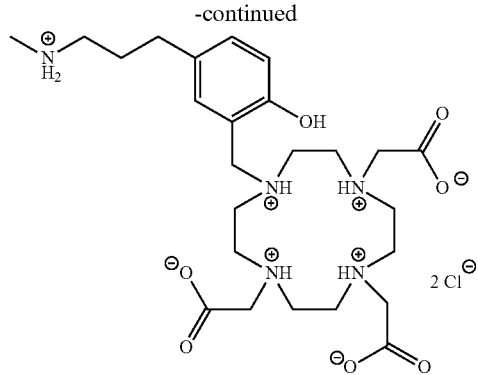
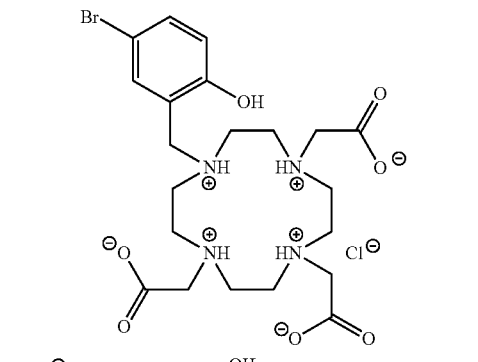
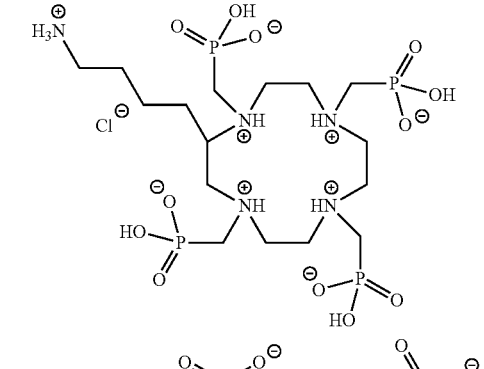
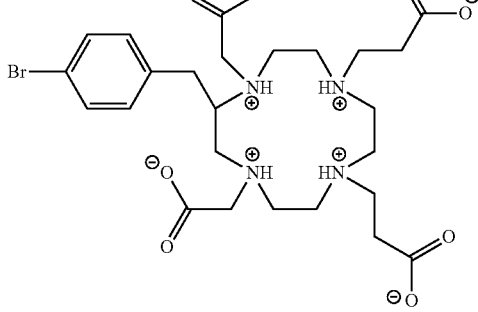
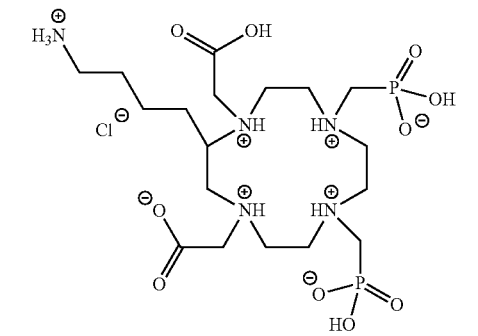

-continued

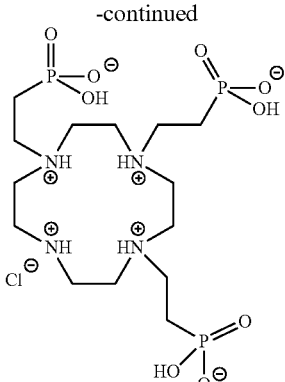
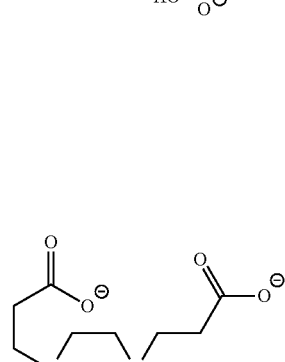
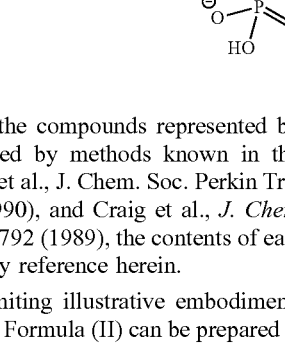

In general, the compounds represented by Formula (II) can be prepared by methods known in the art, see, for example, Cox et al., J. Chem. Soc. Perkin Trans., Vol. 1, pp. 2567-2576 (1990), and Craig et al., *J. Chem. Soc., Chem. Commun.*, p. 1792 (1989), the contents of each of which are incorporated by reference herein.

In a non-limiting illustrative embodiment, a compound represented by Formula (II) can be prepared as generally set forth below in Scheme XI.

SCHEME XI

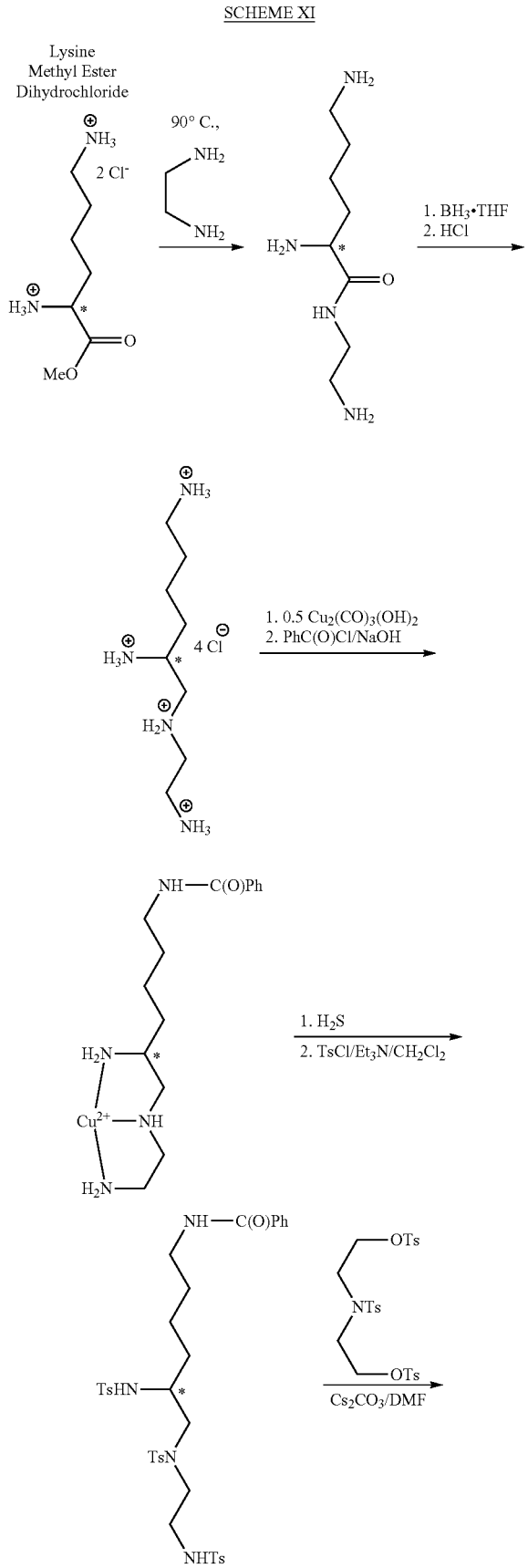

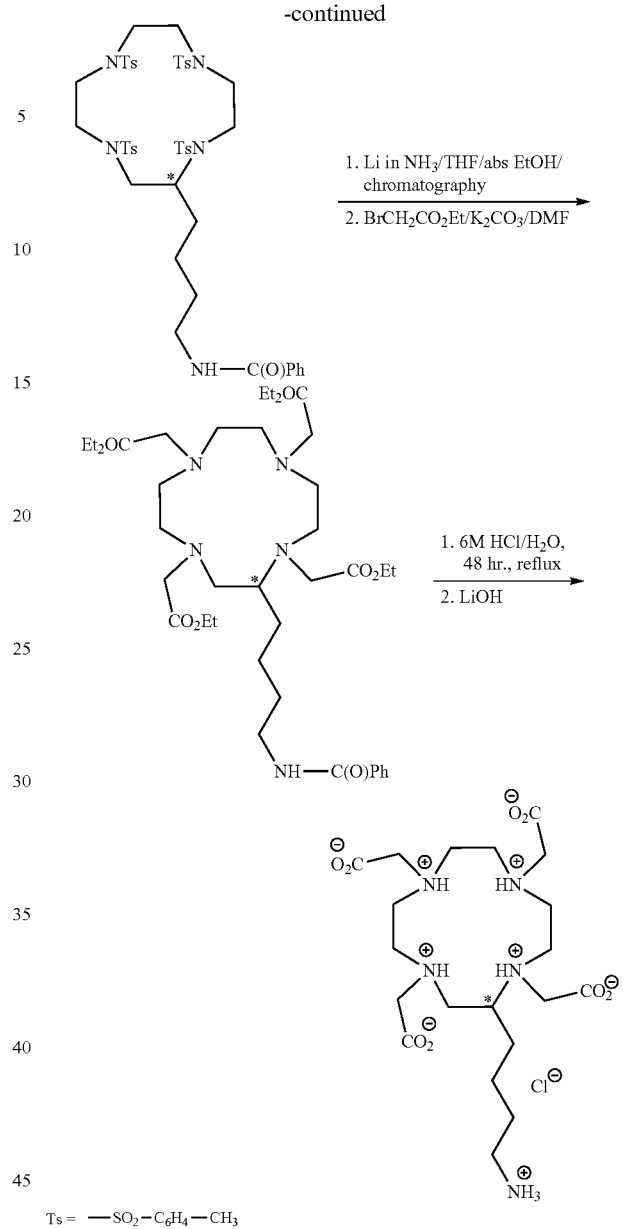

Ts = —SO$_2$—C$_6$H$_4$—CH$_3$

The foregoing compounds represented by Formula (I) and (II) are merely exemplary; and the foregoing description provides a sufficiently detailed description of the compounds represented by Formula (I) and (II) within the scope of the present disclosure such that a person of skill in the art can readily appreciate both the variations within the scope of the description and how to make the various compounds within the scope of the description.

The organic polymer resin for covalently linking with the compounds represented by Formula (I) and (II) can be any organic polymer resin known for making metal-chelating resins. In some embodiments, the organic polymer resins can be in the form of microporous, mesoporous or gel beads. For example, the organic polymer resins can be in the form of small beads such as beads of about 0.001 to about 5 mm diameter. In an embodiment, the organic polymer resins can be in the form of small beads such as beads of about 0.1 to about 1 mm diameter. In general, suitable organic polymer resins include resins that are chemically stable toward harsh chemical environments such as, for example, a strong base, a strong acid, and atmospheric oxygen. It is also desirable, but not required, that the resins can be de-metallated, regenerated and recycled, thus reducing their cost of use.

Suitable organic polymer resins include, for example, a polymer or copolymer base of, for example, styrenic polymers or copolymers such as polystyrene and the like, acrylic polymers or copolymers such as polyacrylic resins and the like, methacrylic polymers and copolymers such as polymethacrylic resins and the like, with each containing one or more complementary reactive functionalities for covalently linking with the at least one linking group of the compounds represented by Formula (I) and (II). In some embodiments, suitable organic polymer resins include, for example, a modified polymer or copolymer base prepared by modifying the polymers or copolymers with a crosslinking agent such as divinylbenzene or the like, e.g., styrene-divinylbenzene copolymers, methacrylate-divinylbenzene copolymers each containing one or more complementary reactive functionalities for covalently linking with the at least one linking group of the compounds represented by Formula (I) and (II). In an embodiment, suitable organic polymer resins include, for example, a polyacrylic acid or a polyethyleneimine backbone and a cyclic polyamine attached to a polyaddition and polycondensation resin.

As stated above, the organic polymer resins can be in the form of microporous, mesoporous or gel beads. Accordingly, in some embodiments, a filter system includes one or more columns in which the metal-chelating resin is loaded. In an embodiment, the column is vertically oriented to allow for passage of at least some liquid materials through the column by gravity. As will be understood by those of ordinary skill in the art, a pump may also be used in either a downwardly or upwardly flowing column, for example, to increase the flow rate that would be obtained by gravity alone, or for other reasons. As also will be understood, if the column is vertically oriented, to obtain countercurrent flow, i.e., to have the liquid flow upward through the column, a pump or other means may be used. Other means may include, for example, a reservoir of liquid material held at a position above the column, so that gravity can be used as the driving force for the countercurrent flow of the liquid material up through the column. Any suitable liquid transfer means known in the art may be used.

In an embodiment, the column is formed of a relatively inert or chemically unreactive material. Thus, in an embodiment, the column may be fabricated of a glass or in another embodiment of a fluorinated polymer or in yet another embodiment of a virgin polypropylene. Some fluorinated polymers have chemical resistance to various solvents and chemicals, including organic solvents and strong bases, and may be used. Examples include Teflon®, Avatrel®, polyvinylidene difluoride (PVDF), THV Fluorothermoplastic (Dyneon, St. Paul Minn.), Hostaflon TF 5035 (Dyneon), fluorinated ethylene propylene (FEP), polytetrafluoroethylene (PTFE), and perfluoroalkoxy polymer (PFA), among others. However, any suitable material may be selected for use as the column.

As will be recognized, it is not necessary for a packed column to be oriented in any particular direction or orientation. The column may be vertical, horizontal, coiled or arranged in any suitable way, provided that it can be loaded with the metal-chelating resin and that the appropriate liquids can be passed through it. The rate of passage of the solution through the column can vary depending on such factors as the product being passed, or when in service or in regeneration.

In some illustrative embodiments, an organic polymer resin can be a filter membrane. A "filter," refers to an article having a structure that includes a filter membrane. For example, the filter can be in any useful form for a filtering process, such as a porous membrane, the filter being made from one or more filter materials such as polymers, including synthetic and natural polymers, metal-containing materials, such as alloys, natural materials, ceramic, carbon fiber, etc. Further, in some aspects, the material of the filter can have a chemistry suitable for attachment to the linking arms of the compounds represented by Formula (I) and (II). Alternatively, the surface of the filter material can be modified so that it is chemically reactive with the linking arms of the compounds represented by Formula (I) and (II). In some embodiments, the compounds represented by Formula (I) and (II) can be covalently bound to the filter membrane.

The filter can be in any desired form suitable for a filtering application. Material that forms the filter can be a structural component of a filter itself and that provides the filter with a desired architecture. The filter can be porous or non-porous and can be of any desired shape or configuration. The filter per se can be a unitary article such as a nonwoven porous filter membrane.

In some embodiments, the filter material is formed from a polymeric material, a mixture of different polymeric materials, or a polymeric material and a non-polymeric material. Polymeric materials forming the filter can be crosslinked together to provide a filter structure with a desired degree of integrity. Polymeric materials that can be used to form the filter membranes disclosed herein include, for example, hydrophobic polymers. In some embodiments, the membranes include a polyolefin or a halogenated polymer. Suitable polyolefins include, for example, polyethylene (PE), polypropylene (PP), polymethylpentene (PMP), polybutene (PB), polyisobutylene (PIB), and copolymers of two or more of ethylene, propylene, and butylene. In a further illustrative embodiment, the membranes include ultra-high molecular weight polyethylene (UPE). UPE filter materials, such as UPE membranes, are typically formed from a resin having a molecular weight (weight average molecular weight) greater than about $1\times10^6$ Daltons (Da), such as in the range of about $1\times10^6$ to $9\times10^6$ Da, or $1.5\times10^6$ to $9\times10^6$ Da. Crosslinking between polyolefin polymers such as polyethylene can be promoted by use of heat or crosslinking chemicals, such as, for example, peroxides (e.g., dicumyl peroxide or di-tert-butyl peroxide), silanes (e.g., trimethoxyvinylsilane), or azo ester compounds (e.g., 2,2'-azo-bis(2-acetoxy-propane). Suitable halogenated polymers include polytetrafluoroethylene (PTFE), polychlorotrifluoro-ethylene (PCTFE), fluorinated ethylene polymer (FEP), polyhexafluoropropylene, and polyvinylidene difluoride (PVDF).

In other embodiments, the filter membranes include a polymer chosen from polystyrenes, polyamides, polyimides, polysulfones, polyether-sulfones, polyarylsulfone polyamides, polyacrylates, polyesters, nylons, celluloses, cellulose esters, polycarbonates, or combinations thereof.

As discussed above, the filter can include a porous filter membrane with a compound represented by Formula (I) and (II) appended to the polymeric material that forms the membrane. As used herein, a "porous filter membrane" is a porous solid that contains porous (e.g., microporous) interconnecting passages that extend from one surface of the membrane to an opposite surface of the membrane. The passages generally provide tunnels or paths through which a liquid being filtered must pass. Metal species of sizes small enough to pass through the pores of the membrane can be trapped on the membrane by interaction with the compound represented by Formula (I) and (II), such as by a chelation interaction between the compound represented by Formula (I) and (II) and the metal. This is referred to as a "non-sieving filtration mechanism."

The filter can also function to prevent any particles (e.g., metal containing particles) present within an aqueous or non-aqueous solution that are larger than the pores from entering the microporous membrane or can function to trap the particles within the pores of the microporous membrane (i.e., wherein particles are removed by a sieving-type filtration mechanism). The solution to be treated can pass through the membrane resulting in flow-through having a reduced amount of metals, such as a reduced amount of ionic metal species, a reduced amount of metal-containing particulates, or both.

Accordingly, a porous polymeric membrane on which the compound represented by Formula (I) and (II) is attached can remove metal and metal ion contaminants in a solution that is passing through the membrane, as well as any material that is of a size too large to pass through the pores of the membrane.

Porous membranes of the disclosure can be described with reference to one or more properties of the membrane. Example porous polymeric filter membranes as described herein can be characterized by physical features that include pore size, bubble point, and porosity. For example, the membrane can be described in terms of bubble point, which is commonly used to reflect pore size.

The bubble point method is based on the premise that, for a particular fluid and pore size with constant wetting, the pressure needed to force an air bubble through the pore is in inverse proportion to the size of the hole. The diameter of the capillary can be calculated by determining the pressure required to force water out of the capillary. A Porosimetry Bubble Point test method measures the pressure required to push air through the wet pores of a membrane. A bubble point test is thus a well-known method for determining the pore size of a membrane. To determine the bubble point of a porous material a sample of the porous material is immersed in and wetted with ethoxy-nonafluorobutane HFE 7200 (available from 3M) at a temperature of 20-25° C. (e.g., 22° C.). A gas pressure is applied to one side of the sample by using compressed air and the gas pressure is gradually increased. The differential pressure at which wet flow is equal to one-half the dry flow (flow without wetting solvent) is called the bubble point.

In certain aspects of the disclosure, the porous polymeric membrane can have a bubble point in the range of from about 2 psi to about 400 psi, about 4 psi to about 200 psi, or about 4 psi to about 160 psi, when ethoxy-nonafluorobutane (IFE-7200) is used as the wetting solvent, and at a temperature of 22° C.

Alternatively, pore size can be measured by known techniques such as by Mercury Porosimetry (MP), Scanning Electron Microscopy (SEM), Liquid Displacement (LLDP), or Atomic Force Microscopy (AFM).

The porous polymeric filter membrane can have any pore size that will allow the filter membrane to be effective for performing as a filter membrane. The pore size can be correlated with bubble point determination. In some embodiments, porous membranes can have an average pore size in a range of from about 0.001 microns to about 5 or 10 microns, e.g., from 0.01 to 0.8 microns. The average pore size can be selected based on one or more factors that include: fluid flow rate, pressure, pressure drop considerations, viscosity considerations, impurities in the liquid to be treated (such as amount of metal impurities), and any particle size of the impurities.

Further, the filter membranes disclosed herein contemplate use of polymeric membranes with generally uniform pore sizes resulting from a higher degree of pore symmetry, as well as membranes with non-uniform pore sizes (variable pore diameters) resulting from pore asymmetry. Pores can be isotropic or anisotropic, skinned or unskinned, symmetric or asymmetric, and any combination of these.

A porous polymer filter layer as described may have any porosity that will allow the porous polymer filter layer to be effective as described herein. Example porous polymer filter layers can have a relatively high porosity, for example, a porosity of at least 60, 70 or 80 percent. As used herein, and in the art of porous bodies, a "porosity" of a porous body (also sometimes referred to as void fraction) is a measure of the void (i.e., "empty") space in the body as a percent of the total volume of the body and is calculated as a fraction of the volume of voids of the body over the total volume of the body. For example, a body that has zero percent porosity is completely solid.

Porous filter membranes disclosed herein can be of any desired geometric configurations suitable for use in a system for reducing metal or metal ion contamination in an aqueous or non-aqueous solution. For example, the porous filter membranes disclosed herein can have any one or more of a variety of geometric configurations or forms such as one or more shapes selected from circular, semi-circular, oval, semi-oval, or polygonal such as square, rectangular, hexagonal, or octagonal, etc. The porous filter membrane can be in the form of a flat sheet, a corrugated sheet, a pleated sheet, and a hollow fiber, among others.

A porous polymeric filter membrane as disclosed herein can be in the form of a sheet or hollow fiber having any useful thickness, e.g., a thickness in a range from about 20 to about 400 microns, e.g., from about 40 or about 80 to about 100 or about 200 microns.

Porous filter membranes disclosed herein can be associated with a support structure, a housing, or both. For example, a porous filter membrane can be supported by a frame, bracket, clip, web, net, and cage, and the like. In some constructions, at least part of the support structure can be a housing, as described herein. Alternatively, the porous membrane is unsupported.

The porous filter membrane can be present as a part of a filter assembly or a filter cartridge that includes a housing. For example, the housing is fluidically sealed (aside from inlet and outlet ports) and able to hold a volume of liquid and configured to allow the liquid to pass through the membrane. A housing can be used to form a larger filter structure such as a filter assembly (single or multilayer) or a filter cartridge that is used in a filtering system. The filtering system will place the filter membrane, e.g., as part of a filter assembly or as part of a filter cartridge, in a filter housing to expose the filter membrane to a flow path of a liquid chemical to cause at least a portion of the flow of the liquid chemical to pass through the filter membrane, so that the filter membrane removes an amount of the impurities or contaminants from the liquid chemical. The structure of a filter assembly or filter cartridge may include one or more of various additional materials and structures that support the composite filter membrane within the filter assembly or filter cartridge to cause fluid to flow from a filter inlet, through the filter material (e.g., filter membrane), and through a filter outlet.

The filter membrane supported by the filter assembly or filter cartridge can be in any useful shape, e.g., a pleated cylinder, a cylindrical pad, one or more non-pleated (flat) cylindrical sheets, a pleated sheet, among others.

Figure 1:
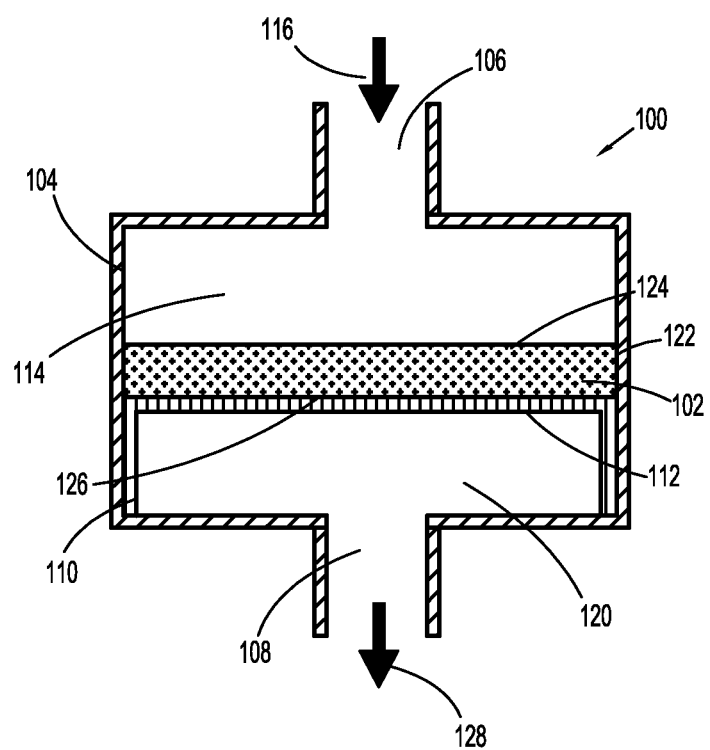
FIG. 1 is an illustration of an exemplary cross-section of a filter with a single porous membrane.

An illustrative embodiment includes a filter device and a method of removing metal contaminants from an aqueous and/or non-aqueous solution, wherein the solution is passed through a porous polymeric membrane that has the compound represented by Formula (I) and (II) affixed thereto. In a non-limiting illustrative embodiment, FIG. 1 illustrates a filter 100 that includes a porous polymeric membrane 102. The porous polymeric membrane 102 includes the compound represented by Formula (I) and (II) affixed on a surface of the membrane. The filter 100 can have a housing 104 that provides a structure to the filter 100 and that fluidically seals an internal portion of the filter. The housing 104 can be any shape and size, such as cylindrical, polygonal, etc.

One portion of the filter can include an inlet port 106, to receive a metal/metal ion-containing aqueous or non-aqueous solution to be filtered. The inlet port 106 can be configured to be connected to a fluid supply line. As such, the inlet port 106 can include, for example, a valve, a gasket, etc. (not shown) to facilitate connection to a fluid supply. The metal/metal ion-containing aqueous or non-aqueous solution to be filtered can flow through inlet port 106 in the direction indicated by arrow 116, and into a headspace 114 in the filter 100, as defined by an input-facing surface 124 of porous polymeric membrane 102, the internal surface of the housing 104, and the inlet port 106. In embodiments, the filter can be constructed so the headspace has a volume that is a desired percentage of the total internal volume of the filter.

The internal portion of the filter can include the porous filter membrane in any suitable placement or arrangement, with FIG. 1 showing the porous polymeric membrane 102 having a disc-like architecture (a cross-sectional view is shown). A side 122 of the porous polymeric membrane 102, such as the outer circumference of the membrane, can be in contact with the inner surface of the housing 104. The porous polymeric membrane 102 can also have an input-facing surface 124, which first contacts the metal/metal ion-containing fluid, and an output-facing surface 126, from which treated fluid with reduced amounts of metal/metal ions flow. Aspects of the filter can optionally be described in terms of the range of the ratio of the surface area of the input-facing surface 124 to the volume of the porous polymeric membrane 102, or the ratio of the surface area to the thickness of the filter.

The filter 100 can also include one or more features that support the porous polymeric membrane 102 within the filter. Any arrangement for supporting the filter can be used and can include one or more distinct structural feature(s), such as a frame, frame, bracket, clip, web, net, and cage, and the like, or a material such as an adhesive can be used to support the membrane. A combination of an adhesive and a structural supporting feature can be used. In an embodiment, and with reference to FIG. 1, the filter includes a frame having frame portions 110 and 112, with frame portion 110 in contact with the inner surface of the housing 104, which is attached to portion 112. Portion 112 can be in contact with the output-facing surface 124 of the porous polymeric membrane 102 and can provide support to the membrane during filtering. Frame portion 112 can have a grid-like structure to freely allow filtered liquid to pass into the backspace 120 of the filter, while still providing structural support to the polymeric porous membrane under increased fluidic pressures.

In use, an aqueous or non-aqueous solution enters the filter through inlet port 106 in direction indicated by arrow 116, and then fills the headspace 114 within the filter 100. Sufficient fluidic pressure is applied to cause the solution to move through the porous polymeric membrane at a desired flow rate. Exemplary flow rates for porous membranes can range from about 0.1 L/min to about 40 L/min, or about 5 L/min to about 20 L/min. Alternatively, the flow rate for a porous membrane is expressed in terms of the amount of liquid flowed per area of the filter per time (e.g., Liter/m.sup.2/h=LMH), such as about 100 LMH/bar to about 30,000 LMH/bar, or about 5,000 LMH/bar to about 15,000 LMH/bar. The filtered liquid having a reduced metal content then exits the filter through outlet port 108 in the direction indicated by arrow 128.

In some embodiments, a filter disclosed herein can include a composite membrane arrangement. For example, a filter with a composite membrane can include two or more filter materials, such as two or more filter articles. In an embodiment, the filter can include a first porous polymeric membrane that includes one of the compounds represented by Formula (I) and (II), and a second filter material that does not include the compound represented by Formula (I) and (II) present in the first porous polymeric membrane (i.e., a different ligand or some other ligand) or that is in some way different from the first porous polymeric membrane. The second filter material can also be in the form of a porous membrane, or can be different, such as having a non-porous form. The second filter material can be made of the same or of a different polymeric material than the first membrane, and can either be modified, such as modified with a compound represented by Formula (I) and (II) not present in the first membrane (e.g., the ligand), or unmodified.

In some embodiments, the filter includes a first porous polymeric membrane that includes the compound represented by Formula (I) and (II), and a second porous polymeric membrane that includes no compound represented by Formula (I) and (II) or a different compound represented by Formula (I) and (II). In certain embodiments, the first and second porous polymeric membranes are constructed from the same or a similar polymeric material and have the same or a similar pore size. In other embodiments, the first and second porous polymeric membranes are constructed from the different polymeric materials and/or have different pore sizes.

There are various available linking chemistries that allow the compounds represented by Formula (I) and (II) to be immobilized in a stable manner onto an organic polymer resin. As noted, suitable chelating resins should be able to endure acidic and/or basic operating environments in the presence of air. Thus, hydrolytic stability, oxidative stability and thermal stability are all important factors. Accordingly, in non-limiting illustrative embodiments, the linking-chemistry used herein can involve the use of hydrocarbon linkages, amine linkages and ether linkages. In other illustrative embodiments, sulfone linkages and sulfoxide linkages can be used. Examples of linking chemistries that can be used to link the compounds of Formula (I) and (II) with an organic polymer resin are shown below:

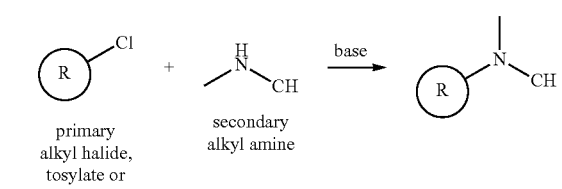

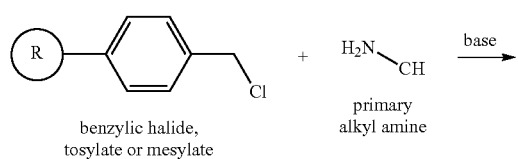

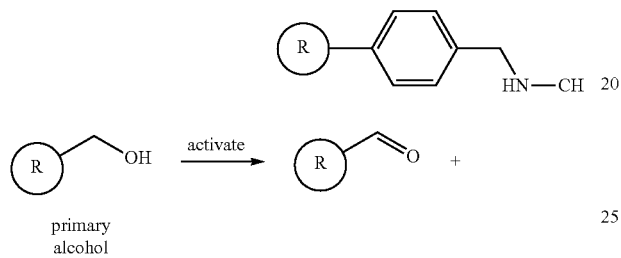

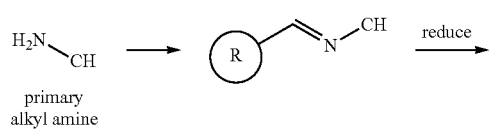

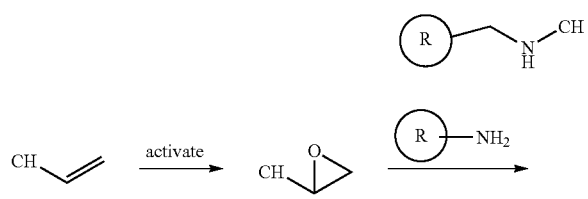

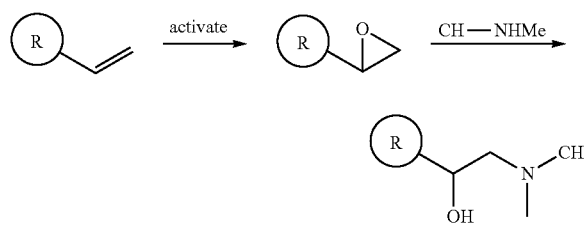

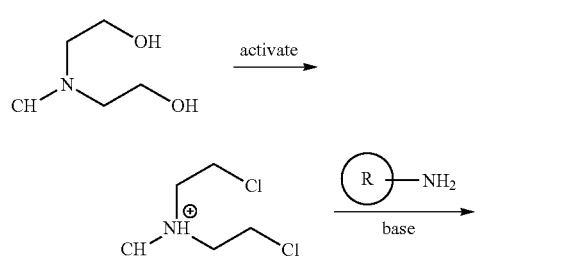

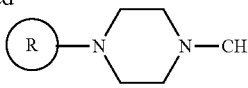

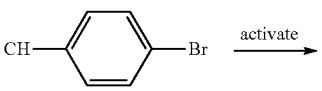

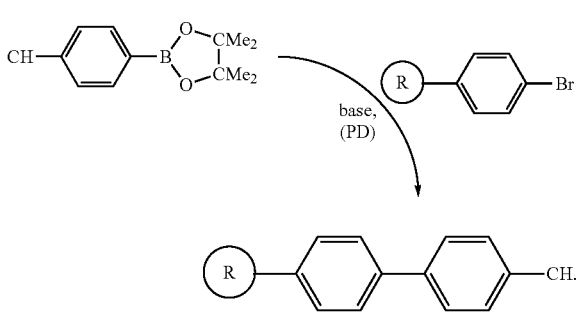

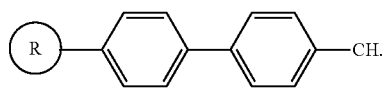

R = Resin
CH = Chelate

In some embodiments, the metal-chelating resins can be provided in sodium salt form or potassium salt form. If desired, the sodium ion or potassium ion can be removed from the resin prior to its use in order to prevent sodium or potassium from entering the solution treated with the resin. This can be accomplished by replacing the sodium cation or potassium cation with another cation such at $H^+$, $Me_4N^+$ or other quaternary ammonium cation.

In general, the compounds represented by Formula (I) and (II) can be covalently linked with an organic polymer resin by methods known in the art. For example, in an illustrative embodiment, a metal-chelating resin can be prepared by reacting a compound represented by Formula (I) and (II) having at least one linking group, or at least one ligating atom (e.g., a nitrogen atom) with the organic polymer resin which is chemically activated so as to contain one or more complementary reactive functionalities for covalently linking with the attachment site(s) on the compound represented by Formula (I) and (II).

In cases where the linking group or ligating atom of the compounds represented by Formula (I) and (II) (e.g., a nitrogen atom) are in a protected form, the protecting group must first be removed (or selectively removed) prior to immobilization on the organic polymer resin. Once the compounds represented by Formula (I) and (II) are covalently linked to the organic polymer resin (immobilized) any remaining protecting groups (e.g., on the 2-hydroxybenzyl moieties) must then be removed to activate the "ultra chelating" function of the resin. In an embodiment, the selective deprotection, immobilization and final resin deprotection are carried out as generally described below in Scheme XII.

SCHEME XII

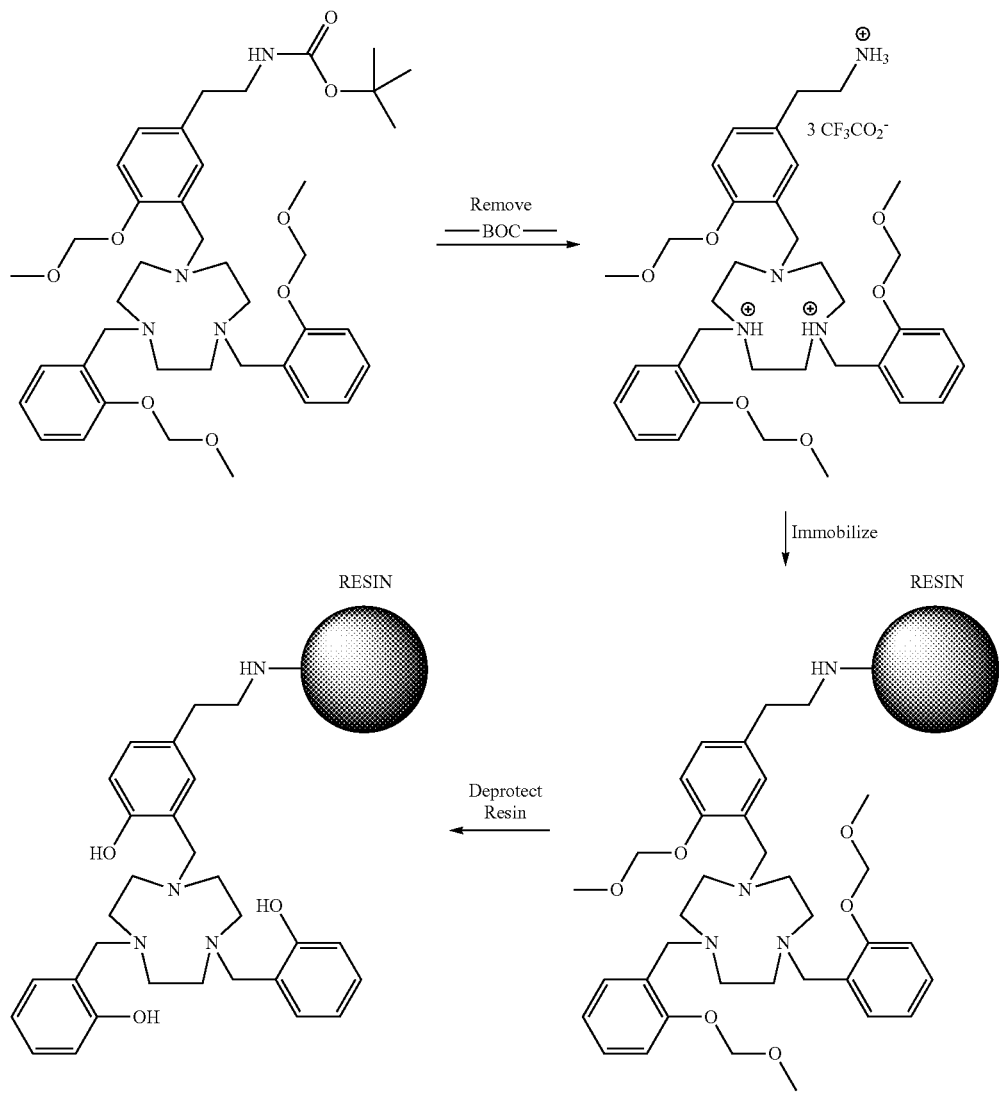

The one or more of the compounds represented by Formula (I) and (II) can be reacted with the organic polymer resin at a temperature and time period suitable to covalently bond the one or more complementary reactive functionalities of the organic polymer resin with the at least one linking group of the compounds occurring in Formula (I) and (II). In general, the one or more of the compounds represented by Formula (I) and (II) can be reacted with the organic polymer resin in a stoichiometric excess or a stoichiometric deficiency of the activated organic polymer resin, e.g., an amount ranging from about 0.1 equivalent to about 10 equivalent of organic polymer resin to the one or more of the compounds represented by Formula (I) and (II). In an embodiment, a suitable reaction temperature can range from about 20° C. to about 200° C. In an embodiment, a suitable reaction temperature can range from about 40° C. to about 160° C. In an embodiment, a suitable time period for carrying out the reaction can range from about 1 hour to about 200 hours. In an embodiment, a suitable time period for carrying out the reaction can range from about 12 hours to about 120 hours.

If desired, the reaction can be carried out in a solvent. Suitable solvents include, for example, benzene, fluorobenzene, benzonitrile, acetonitrile, propionitrile, toluene, xylene, tetrahydrofuran, 1,2-dimethoxyethane, p-dioxane, diglyme, triglyme, dimethylsulfoxide, N,N-dimethylformamide, N,N-dimethylacetamide, hexamethylphosphoramide, N-methylpyrrolidone and the like.

In an illustrative embodiment, a metal-chelating resin disclosed herein can be prepared by stepwise solid-state synthesis of a compound represented by Formula (I) and (II) on an organic polymer resin. In another illustrative embodiment, a metal-chelating resin disclosed herein can be prepared by first forming a chelating pre-polymer (monomer), followed by polymerization and bead formation. In this embodiment, a compound represented by Formula (I) and (II) can be covalently linked with the organic polymer resin by (i) reacting one of the compounds represented by Formula (I) and (II) with a suitable monomer, (ii) polymerizing the functionalized monomer in the presence of a cross-linking agent, a pore-forming agent and a polymerization catalyst under suitable polymerization conditions and (iii)

forming beads of the metal-chelating resins disclosed herein, see, e.g., Zhou et al., *Biomacromolecules*, 9(5), pp. 1372-1380 (2008).

As discussed above, the metal-chelating resins disclosed herein are believed to contain immobilized "ultra chelates," that is, the compounds (i.e., metal-chelates) represented by Formula (I) and (II) are believed to possess strong (i.e., high) metal-binding constants ($K_f$) for many divalent and trivalent metal ions of interest. While not wishing to be bound by theory, it is believed that the strong binding constants of the metal-chelates represented by Formula (I) and (II) are a result of one or more of (a) selecting suitable ligating atoms that have high affinity for the sequestered metal-ion, (b) positioning the ligating atoms in the chelate structure so as to have favorable geometric arrangements in order to accommodate the bonding requirements metal-ion, (c) adding coordinating arms to amines which leads to suitable chelating arrangements and (d) properly utilizing the "chelate-effect" and/or the "macrocyclic effect" in order to enhance metal-chelate binding strength.

Accordingly, when the compounds represented by Formula (I) and (II) are covalently linked with an organic polymer resin to form a metal-chelating resin as disclosed herein, they are believed to be capable of removing metal ions and associated metallic species to significantly lower levels from aqueous solution and non-aqueous solutions such as, for example, from solutions of quaternary ammonium salts, or from solutions of quaternary ammonium hydroxides or from processing solutions used in the microelectronics industries, than currently known metal-chelating resins. In an embodiment, a non-aqueous solution is a solution containing one or more organic solvents such as, for example, alcohols such as methanol, ethanol, n-propanol, isopropanol, propylene glycol and ethylene glycol, sulfoxides such as dimethyl sulfoxide, pyrrolidones such as N-methylpyrrolidone, organic chlorides such as dimethyl chloride, long chain alkyl halides such as butyl halide and the like. In an embodiment, a non-aqueous solution is a solution containing a liquid organic solvent such as liquid amines including, for example, monoethanolamine, trimethylamine, triethylamine and the like. In another embodiment, an aqueous solution/non-aqueous solution is a solvent mixture containing water and an organic solvent such as, for example, one or more alcohol solvents such as methanol, ethanol, propanol, isopropanol and butanol.

For example, in an illustrative embodiment, at ambient temperatures the compounds represented by Formula (I) and (II) can have an aqueous binding constant ($K_f$) for $Fe^{3+}$ of greater than or equal to about $10^{39}$. In an embodiment, the compounds represented by Formula (I) and (II) can have a binding constant ($K_f$) for $Fe^{3+}$ of greater than or equal to about $10^{44}$. In an embodiment, the compounds represented by Formula (I) and (II) can have a binding constant ($K_f$) for $Al^{3+}$ of greater than or equal to about $10^{20}$. In an embodiment, the compounds represented by Formula (I) and (II) can have a binding constant ($K_f$) for $Al^{3+}$ of greater than or equal to about $10^{25}$. In an embodiment, the compounds represented by Formula (I) and (II) can have binding constants ($K_f$) for $Zn^{2+}$, $Ni^{2+}$ and $Cu^{2+}$ of greater than or equal to about $10^{20}$, about $10^{21}$ and about $10^{22}$, respectively.

In general, as one skilled in the art will appreciate, strong metal-chelate binding constants are difficult to measure, but established methods are known in the art. For example, such methods include (a) pH titrations in the presence of competing $H^+$ using calibrated pH electrodes, (b) pM titrations in the presence of a competing metal ion using calibrated pM metal-ion specific electrodes, (c) thermometric titrations in the presence of a competing metal ion, (d) spectroscopic titrations (UV-visible) in the presence of competing $H^+$, (e) spectroscopic titrations (UV-visible) in the presence of competing metal ions, (f) radiometric titrations in the presence of immobilized metal-chelates, and (g) radiometric analysis of metal-chelate mixtures in the presence of metal-ion-permeable osmosis membranes and the like.

The metal-chelating resins disclosed herein are useful in reducing the level of one or more soluble metallic components contained in an aqueous solution and/or a non-aqueous solution such as, for example, solutions of quaternary ammonium hydroxides and solutions of quaternary phosphonium hydroxides, or from processing solutions used in the microelectronics industry. Representative examples of quaternary ammonium hydroxides to be purified include tetramethylammonium hydroxide, tetraethylammonium hydroxide, tetra-n-propylammonium hydroxide, tetra-n-butylammonium hydroxide, tetra-n-octylammonium hydroxide, trimethyl-2-methoxyethylammonium hydroxide, benzyltrimethylammonium hydroxide, benzyltriethylammonium hydroxide, N,N-dimethylpyrrolidinium hydroxide, N, N-dimethylpiperidinium hydroxide, N,N'-diisopropylimidazolinium hydroxide and N-alkylpyridinium hydroxide. Representative examples of quaternary phosphonium hydroxides to be purified include tetramethylphosphonium hydroxide, tetraethylphosphonium hydroxide, tetrapropylammonium hydroxide and tetrabutylphosphonium hydroxide.

In general, the aqueous and non-aqueous solutions or processing solutions used in the microelectronics industry will contain some amount of undesired metals such as divalent metals and trivalent metals. Thus, it is believed that the metal-chelating resins disclosed herein can reduce the content of the undesired metals contained in these solutions to significantly lower levels, such as, for example, less than or equal to 10 ppt and even lower, e.g., less than 1 ppt. Representative examples of divalent metals include barium ($2^+$), beryllium ($2^+$), cadmium ($2^+$), calcium ($2^+$), cobalt ($2^+$), copper ($2^+$), europium ($2^+$), iron ($2^+$), lead ($2^+$), magnesium ($2^+$), manganese ($2^+$), mercury ($2^+$), nickel ($2^+$), osmium ($2^+$), platinum ($2^+$), ruthenium ($2^+$), strontium ($2^+$), tin ($2^+$), and zinc ($2^+$). Representative examples of trivalent metals include chromium ($3^+$), iron ($3^+$), aluminum ($3^+$), gadolinium ($3^+$), lanthanum ($3^+$) and gallium ($3^+$).

In non-limiting illustrative embodiments, the initial concentration of the heavy metal in the solution can range from about 0.1 ppm to about 1000 ppm, or from about 0.1 ppm to about 500 ppm, or from about 1 ppm to about 500 ppm, or from about 1 ppm to about 100 ppm. The final concentration of the heavy metal in the solution can range from about 0.02 ppt to about 10 ppt, or from about 0.02 ppt to about 5 ppt, or from about 0.1 ppt to about 5 ppt, or from about 0.1 ppt to about 1 ppt, or from about 0.2 ppt to about 1 ppt. In some embodiments, the final concentration of the heavy metal in the solution is less than 1 ppt.

In some embodiments, the solution containing the heavy metal can have an acidic pH. For example, the solution can have an acidic pH of about 0 to about 5, or about 1 to about 5, or about 1 to about 4, or about 1 to about 3.

In some embodiments, the solution containing the heavy metal can have a basic pH. For example, the solution can have a basic pH of about 9 to about 14, or about 10 to about 14, or about 12 to about 14.

In some embodiments, the solution containing the heavy metal can have a neutral pH. For example, the solution can have a neutral pH of about 6 to about 8.

The solutions can also contain one or more background metals such as calcium, zinc, magnesium, or sodium.

The aqueous and non-aqueous solutions can be contacted with the metal-chelating resins in a variety of different ways generally depending upon the state of the metal-chelating resins. For example, solutions to be de-metallated can be combined with the metal-chelating resins in a stirred container, or the solutions can be passed through a column where the column contains the metal-chelating resins, or the solutions can be passed through media such as a filter as discussed above containing the metal-chelating resins. There is no particular limitation as to the methodology of contacting the aqueous/non-aqueous solutions with the metal-chelating resins.

In general, the one or more metals are removed from the aqueous or non-aqueous solutions by contacting the aqueous or non-aqueous solutions containing the one or more metals with a metal-chelating resin disclosed herein for a time sufficient to reduce the concentration of the one or more metals in the solution. The time period can range widely and can range from about 2 hours to about 96 hours. As one skilled in the art will readily appreciate, the aqueous or non-aqueous solutions may be optionally concentrated or diluted or treated to facilitate the purifying process. For example, the concentration of quaternary ammonium hydroxide in the aqueous or non-aqueous solutions may be increased prior to being contacted with a metal-chelating resin. In some embodiments, the aqueous or non-aqueous solutions can be diluted with an additional solvent prior to contacting the solution with the metal-chelating resin. Concentration procedures are known to those skilled in the art and include, for example, evaporation, ion-exchange, electrodialysis, and reverse osmosis among others.

Following the removal of the one or more metal components from the aqueous solution or non-aqueous solution, the metal-chelating resins disclosed herein can be recycled or discarded without regeneration. The resulting solutions can then be used for their intended application. For example, solutions of the quaternary ammonium hydroxides can be packaged and stored prior to being used in such chemical industries as semiconductor industries.

The following example is provided to enable one skilled in the art to practice the invention and is merely illustrative of the invention. The examples should not be read as limiting the scope of the invention.

Example 1

A 9-membered macrocyclic chelate compound, also referred to as XP-345, was prepared according to the following process.

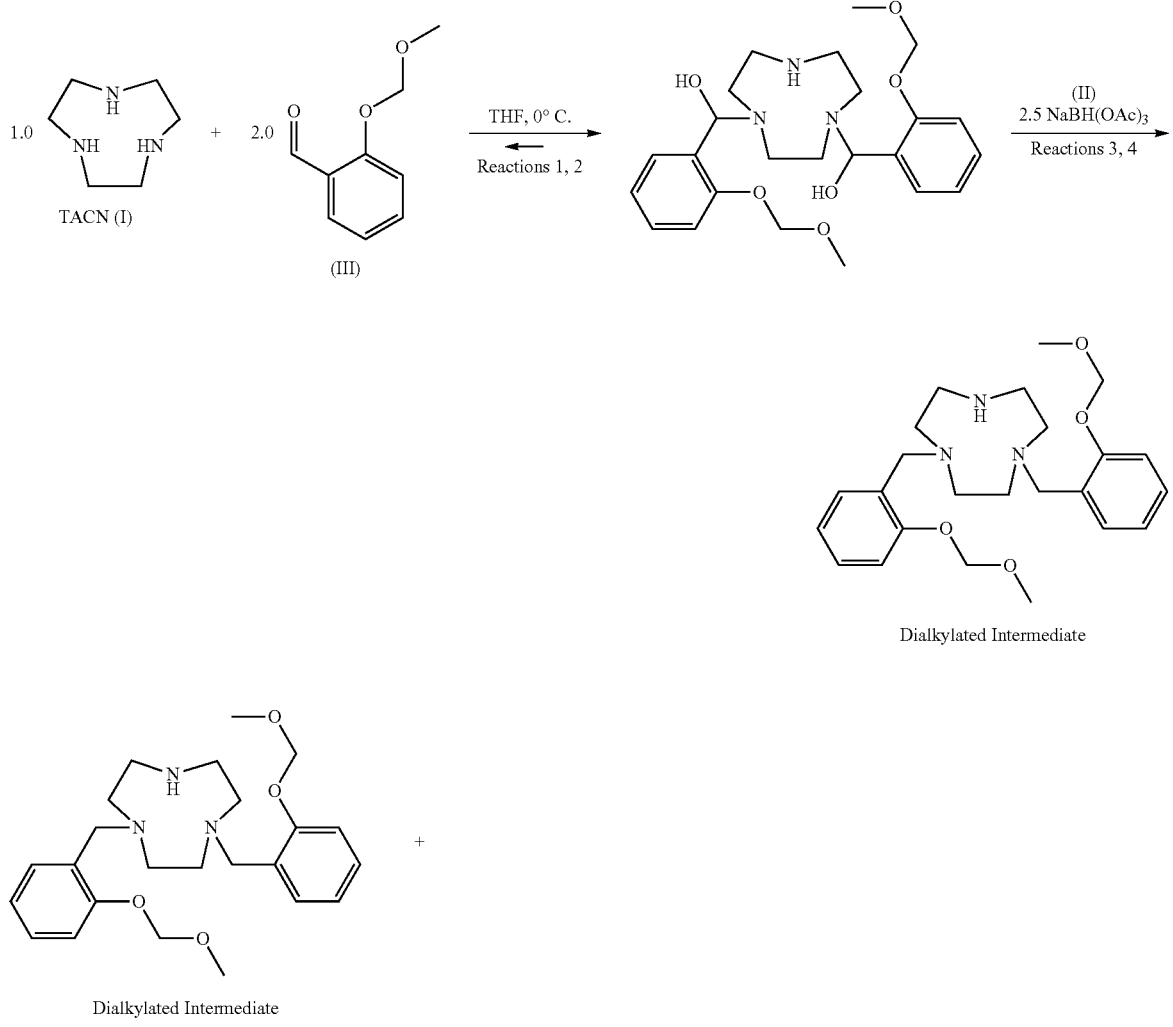

Dialkylated Intermediate

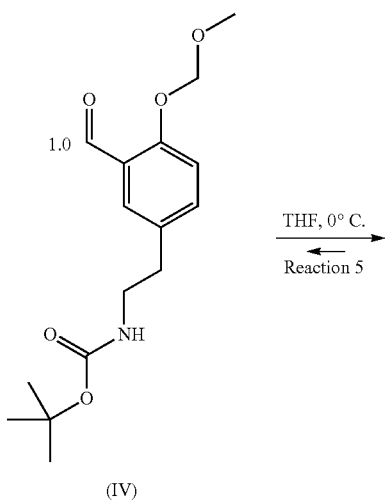

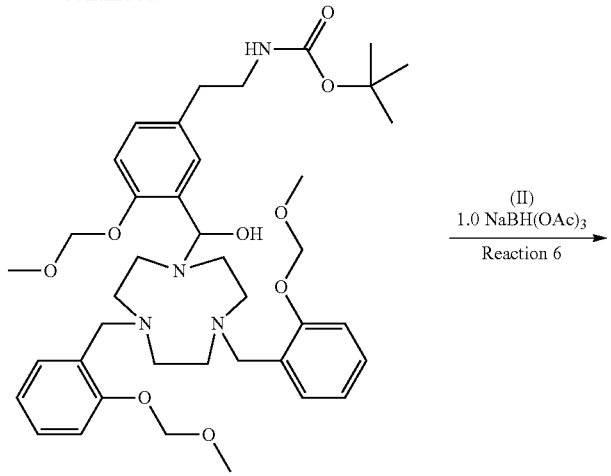

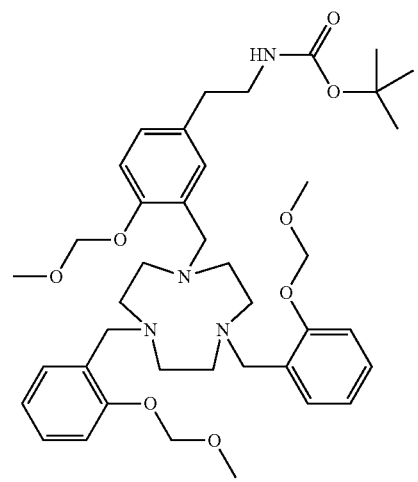

XP-345

The process of this example is a six-step reaction sequence in a single pot with chromatographic purification after the final step. The process is as follows.

Reactions 1 and 2: A dried, 250 mL, 3-neck jacked flask is connected to a chiller and is carefully purged with Argon. The flask was fitted with a thermometer, an Argon port, a port for adding solid/liquid reagents and a suitable Teflon-coated stir-bar for magnetic stirring. The chiller temperature was set at −5° C., while the temperature of contents of the flask remains at 0-1° C. To the reaction flask under an Argon atmosphere are added TACN (I) (2.59 g, 20 mmol, fw=129.20), and then 100 mL anhydrous tetrahydrofuran (THF) was carefully added. The mixture was stirred, and a cloudy solution/suspension formed. MOM-salicylaldehyde (III) (6.65 g, 40 mmol, fw=166.18) was added all at once, and there was a mild resulting exotherm (~2° C.). After about 20 minutes, the cloudy solution/suspension disappeared, and a clear solution formed. After the cold reaction mixture was stirred overnight (~15 hr), a pale yellow color formed, and then the borohydride reagent was added in portions Reactions 3 and 4: To the resultant solution with stirring were added four (4) individual portions of 2.23 g solid sodium triacetoxyborohydride (II, 2.0 equiv) at appropriate time intervals (Table 2). Then excess borohydride was added (0.5 equiv) with the last two (2) portions of 1.12 g of (II) that were added at the suitable time intervals (total 11.16 g, 50.0 mmol, fw=211.94, corrected for 95% purity). Table I set forth below shows the details including wait-times after each addition of (II) and sampling schedule (HPLC). The end of Reaction 4 was determined by the HPLC results after the 5th and 6th additions of the borohydride reagent. That is, in sample #6, when (a) the area-% (276 nm) of aldehyde (III) is 0.3%, the area-% (276 nm) of Monoalkylated-TACN (Mon1) was 2.5-3.0% and when the area-% (276 nm) of Trialkylated-TACN (Tri111) was 5-7 times as large as the area-% (276 nm) of Monoalkylated-TACN (Mon1). These measurements were only valid when there was a small excess of borohydride reagent present. If the HPLC peak associated with monoalkylated-TACN (Mon1) was too large, a small additional amount of aldehyde (III) may need to be added followed by more borohydride reagent (II). The dialkylated intermediate, N,N'-Bis(MOM-Hydroxybenzyl)-TACN, was thus produced as the major product (80-82%) along with some monoalkylated product (2.5-3%) and some trialkylated product (16-17%). Sampling was carried out after the "Wait-Time" but before the addition of the next reagent. Five to ten microliters (5-10 µL) of the reaction mixture was added to 990 µL of a diluent solution which is a 50/50 (v/v) mixture of acetonitrile/water.

TABLE 2

| Borohydride Addition (1st) | Weight add/total | Total Amount | Wait-Time* after Addition | HPLC Sampling |
|---|---|---|---|---|
| 1 | 2.23/2.23 g | 10.0 mmole | 60 min | yes |
| 2 | 2.23/4.46 g | 20.0 mmole | 60 min | yes |
| 3 | 2.23/6.69 g | 30.0 mmole | 120 min | yes |
| 4 | 2.23/8.92 g | 40.0 mmole | 120 min | yes |
| 5 | 1.12/10.04 g | 45.0 mmole | 15 hr | yes |
| 6 | 1.12/11.16 g | 50.0 mmole | 15 hr | yes |

Next, excess reducing agent was added in order to ensure that Reaction 4 goes to completion. Because the MOM-salicylaldehyde compounds react faster with the secondary amine of the macrocycle than with triacetoxyborohydride (reduction), a small excess of the borohydride reagent can be used in Reaction 4 without the excess significantly interfering with Reaction 5. With each addition of (II), about 2 mL of additional dry THF was added (~12 mL total) in order to wash the funnel. After the final addition, the mixture was stirred at 0° C. for 15 hours until almost all of MOM-salicylaldehyde (III) is consumed as determined by HPLC as noted above.

Reaction 5: To the above reaction mixture was added carefully solid BOC-MOM-Tyramine aldehyde (IV) (6.19 g, 20.0 mmol, fw=309.36) all at once. The mixture was magnetically stirred overnight (15 hr) at about 0° C. The solid BOC-MOM-Tyramine aldehyde (IV) was prepared according to the general scheme set forth below.

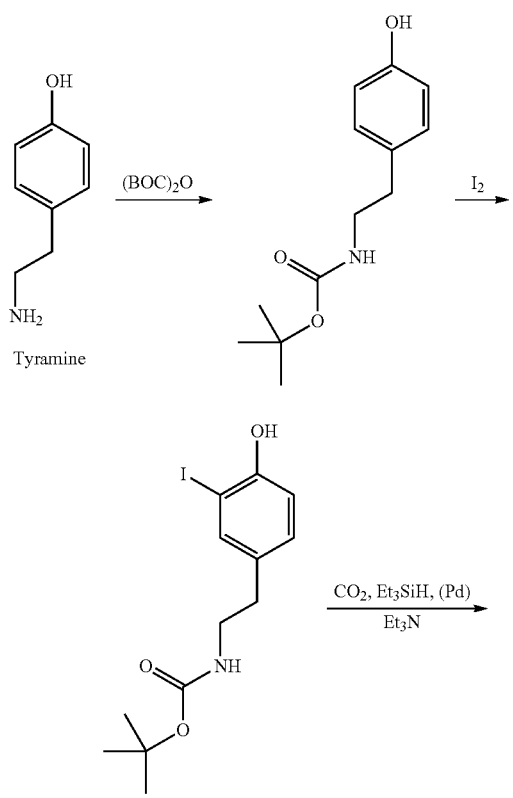

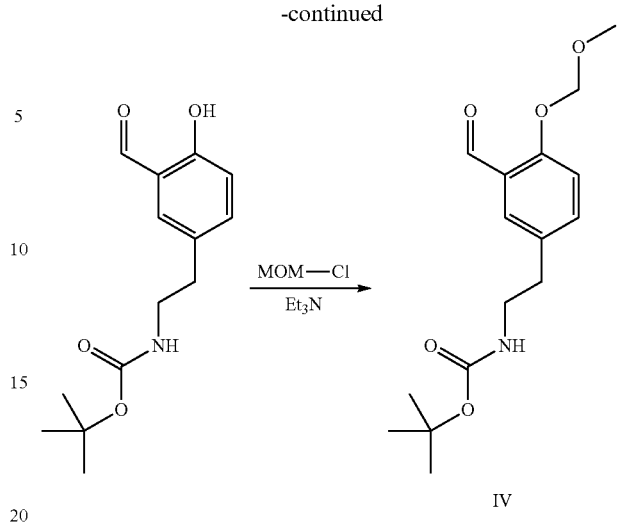

Reaction 6: To the resulting stirring solution was added three (3) individual portions (2.24 g+1.12 g+1.12 g) of solid sodium triacetoxyborohydride (II) at time intervals indicated in Table 3 below (4.48 g, 20.1 mmol, fw=211.94), corrected for 95% purity). This reaction mixture was stirred for at least 15 hours. In order to drive the alkylation reactions of TACN and its partially alkylated intermediates toward fully trialkylated species, additional aldehyde and borohydride reagents were added. This process was continued in a stepwise fashion (Table 3) until the dialkylated intermediate (V) is reduced to ≤0.4 area-%. The reaction temperature was increased to 20° C. Additional solid BOC-MOM-Tyramine aldehyde (IV) (0.62 g, 2.0 mmole) was added all at once followed 7 hours later by sodium triacetoxyborohydride (II) (0.45 g, 2.0 mmole). After stirring for more than 15 hr, the reaction mixture was monitored using HPLC. Again, more solid BOC-MOM-Tyramine aldehyde (IV) (0.62 g, 2.0 mmole) was added all at once followed 7 hours later by sodium triacetoxyborohydride (II) (0.45 g, 2.0 mmole).

After stirring for more than 15 hours, the reaction mixture was monitored using HPLC. This process was repeated for a third time with 0.31 g (IV) followed by 0.45 g (II). The reaction mixture was again stirred for 15 hours and sampled by HPLC. This last part of the reaction sequence was slow and required additional reaction time as determined by HPLC monitoring. Some of the excess free aldehyde (IV) formed the corresponding reduced benzyl alcohol by reaction with excess reducing agent during the course of Reaction 6. In order to facilitate the chromatographic purification of the product, unreacted aldehydes (later eluting) were converted to the corresponding benzyl alcohols (earlier eluting) by adding suitable amounts of excess sodium triacetoxyborohydride at the end of reaction while waiting for aldehyde peaks (III, IV) in the HPLC to almost completely disappear (≤0.2 area-%). This leads to a >99.5% conversion (by HPLC) of the reaction intermediate (V, Bis(MOM-hydroxybenzyl)-TACN) to XP-345.

TABLE 3

| Borohydride Addition (2nd) | Weight add/total | Total Amount | Wait-Time* after Addition | HPLC Sampling |
|---|---|---|---|---|
| 1 | 2.24/2.24 g | 10.0 mmole | 3 hr | yes |
| 2 | 1.12/3.36 g | 15.1 mmole | 4 hr | yes |

TABLE 3-continued

| Borohydride Addition (2nd) | Weight add/total | Total Amount | Wait-Time* after Addition | HPLC Sampling |
|---|---|---|---|---|
| 3 | 1.12/3.36 g | 20.1 mmole | 15 hr | yes |
| -Increase Reaction temperature from 0° C. to 20° C. (add 0.62 g IV-stir for 7 hours) | | | | |
| 4 | 0.45/4.93 g | 22.1 mmole | 15 hr | yes |
| (add 0.62 g IV-stir for 7 hours) | | | | |
| 5 | 0.45/5.38 g | 24.1 mmole | 15 hr | yes |
| (add 0.31 g IV-stir for 7 hours) | | | | |
| 6 | 0.45/5.83 g | 26.1 mmole | 15 hr | yes |

Work up: Deionized water (120 mL, ambient temp) was added in a dropwise fashion over a period of 60 minutes to the stirring reaction mixture at 20° C. With stirring, the pH was then adjusted to 9 (pH-paper) by adding 25% aqueous NaOH in 1 mL increments over 20 minutes (about 17-19 mL). At this point, there are two liquid layers. The layers were carefully separated, and the upper yellow organic layer was retained for further processing. Reagent dichloromethane (60 mL) was then added to the lower aqueous layer. After through mixing, the lower methylene chloride layer was carefully separated from the upper aqueous layer. The aqueous layer was again extracted a second time using another 60 mL of dichloromethane. The two dichloromethane layers were combined (not dried), and then the organic solvents (dichloromethane and THF) and other volatiles were carefully evaporated using a rotary evaporator (bath temp. ≤40° C.) under a suitable vacuum. Most of the product was contained in the upper yellow organic layer which was also subject to solvent stripping using a rotary evaporator (bath temp. ≤45° C.) in order to remove THF and most of the water. When the two products were combined, the yield of crude material as a damp viscous oil was 20.1 g. When all of the organic solvent and water were completely removed using a lyophillizer, the yield of crude material was about 17 g.

Purification: About 1.41 g damp crude product was dissolved in 46 mL of dichloromethane solvent. 4.65 g powdered RP-silica (from Teledyne 5 g RediSep Loading Cartridge) was added to the dichloromethane solution. The silica slurry is placed in a rotary evaporator (bath temp 35° C.), and the solvent ($CH_2Cl_2$) and other volatiles are removed. The dried silica powder was placed in a 5 g RediSep Loading cartridge which was placed before the RediSep Column on a Flash Chromatography Unit. The column used was a 100 g Gold C18 RF RediSep Column. Smaller prep chromatography runs are carried out on 100 g RP-silica columns, and larger prep chromatography runs were carried out on 415 g RP-silica columns.

Using the preparative method and the mobile phases described below, this flash chromatography separation experiment gave a reasonable yield of XP-345 with >98% purity. Suitable fractions were collected and combined, and the acetonitrile solvent with some water was removed using a rotary evaporator (bath temp. ≤45° C.). When (a) the evaporation rate slowed significantly, (b) the distillate looks like water rather than an organic solvent and (c) the product mixture becomes cloudy with oily droplets, the solvent evaporation was stopped. The product mixture was extracted three-times with 80 mL $CH_2Cl_2$. The organic layers were combined (not dried), and then the volatile solvents were completely removed using a rotary evaporator (bath temp. ≤45° C.) yielding a colorless, viscous oil (0.66 g, 65% overall yield (based on TACN), FW=722.91). The product material in the fractions from the overlap area between the broad peaks needs further chromatographic purification and can generate additional pure XP-345. A safe pH range (3.5-4.5) for the mobile aqueous phase in flash chromatography needs to be maintained in order to keep MOM and BOC protecting groups from being removed from the desired product during the time-consuming purification runs.

Example 2

A metal-chelating resin was prepared using the 9-membered ring macrocyclic chelate compound of Example 1 (XP-345) according to the following process.

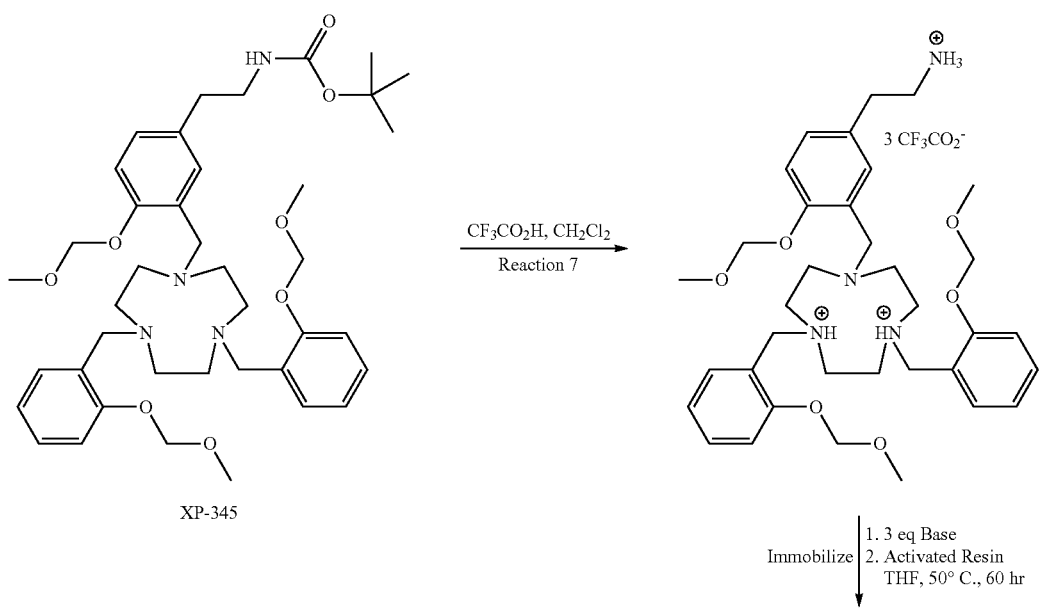

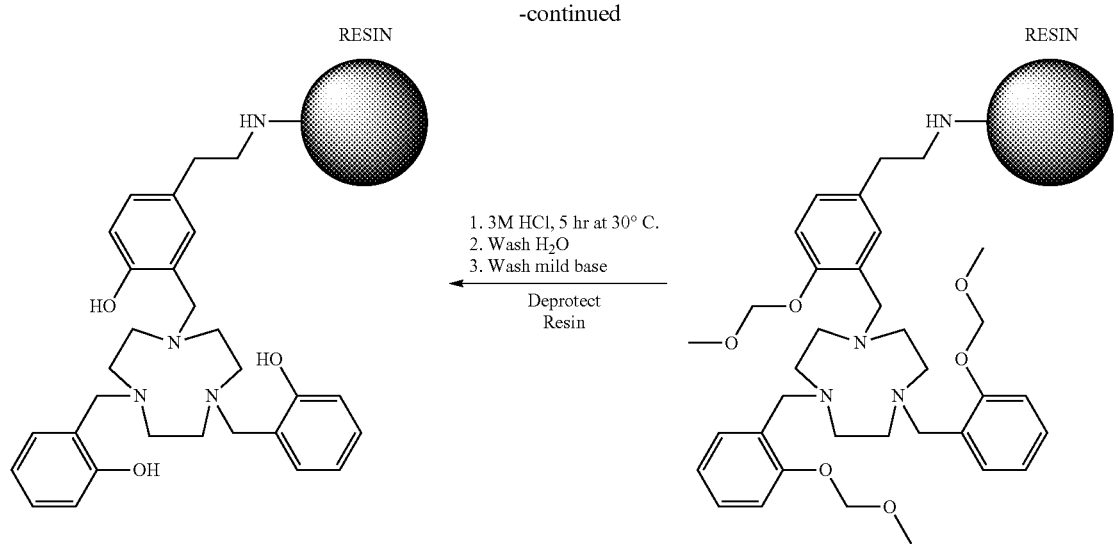

Reaction 7: In a 40 mL vial immersed in a water bath at 10° C., 10.0 mmole of XP-345 trihydrofluoroacetate salt was dissolved in 1.0 mL dichloromethane. Next, to this mixture 10 mL of a 2M trifluoroacetic acid solution in 1:1 dichloromethane:1,1,1,3,3,3-hexafluoro-2-propanol was added. The mixture was sampled every 30 minutes and analyzed using HPLC. After 6.5 h at 64% conversion of starting material to the desired product without a BOC protecting group, the reaction mixture was quenched by adding 20 mL water. The product was extracted by 2×50 mL dichloromethane and washed with 2×50 mL of 1M NaOH aqueous solution. The organic phase was removed using a rotary evaporator.

6.0 mmol of the chelate (3.73 g, fw=622.81) was dissolved in 20 mL of TIF. Next 1.0 g of activated (chloromethylated), crosslinked, porous polystyrene resin beads (Tianjin Nankai Hecheng S&T Co.) (3.0 mmol/g active organic chlorine, 0.2 to 0.6 mm particle size) were suspended with gentle stirring in 10 mL of dry, high purity THE solvent at room temperature under argon for a period of about 12 hours. The washed and swollen resin was recovered by suction filtration and then added to the chelate solution.

The mixture was purged with argon and heated at 50° C. with gentle stirring for a period of about 60 hours. The mixture was cooled to ambient temperature, and the functionalized resin was then collected by filtration. The filtrate mixture was retained for fur use. The resin was washed with 3×16 mL of reagent grade THF, 3×16 mL of purified water, 3×16 mL of absolute ethanol, then soaked with gentile agitation in 16 mL of 3.0 M aqueous hydrochloric acid for 5 hours at 30° C. The acid removes the methoxymethyl protecting groups from the immobilized chelate. Next, the functionalized resin was washed with 3×16 mL purified water, 3×16 mL of 1.0 M aqueous sodium carbonate and then with 3×16 mL of purified water.

The beads were suspended in 16 mL of a 2.0 M aqueous ferric ammonium sulfate solution, and then gently stirred for a period of about 4 hours at about 30° C. The colored beads were collected by filtration, washed with 3×16 mL of purified water and then washed with 3×16 mL methanol. The damp resin beads were dried overnight (about 15 hours) by passing dry $N_2$ through the filter that contained the beads. The sample was prepared for iron analysis by microwave assisted digestion of the resin beads in nitric acid, and the iron level was then measured by elemental analysis using ICP (Inductively coupled plasma).

Example 3

A metal-chelating resin was prepared using the 9-membered ring macrocyclic chelate compound of Example 1 (XP-345) according to the following process.

For each mmol of the protected compound of Example 1 (0.72 g) 5-7 mL THE and 4 mL t-BuOK in 1M THE solution were added. This reaction needs 1 eq water (0.018 g) to facilitate removal of the tert-butyloxycarbonyl protecting group. After refluxing for 1 hour, the mixture was cooled down to room temperature and acidified to pH=3 using 10% citric acid. Next, impurities were extracted from acidic solution by EtOAc and pH was increased to 11 by slow addition of 25% NaOH. The desired product was extracted with EtOAc at 98% purity. The dry product was a yellow oil.

Next, 7.5 g (12.0 mmol) of the compound with a free amino linking site was dissolved in 20 to 30 mL toluene. 1 g chloromethylated polystyrene beads were added to a 50 mL flask and soaked in 2-5 mL toluene for 3 hours. Toluene on the beads was removed and the solution of the chelate compound was added to the resin. The reaction mixture was gently stirred at 70° C. for 3 days. Next, toluene was removed, and the resin beads were washed 3X with EtOH. A sample of resin was dried and used for CHN elemental analysis. Based on N %, the sample contained 0.7 mmol of chelate per gram of dry resin. To remove the methoxymethyl protecting groups, the rest of the resin was soaked in a solution of ethanolic HCl (7.0 g 10% aq HCl and 3.0 g EtOH) and heated at 50° C. overnight. The beads were filtered and washed with excess EtOH and water, soaked in a 50:50 solution of water:EtOH for 1 hour, and washed again with water. Next, to deprotonate active sites, the beads were soaked in 0.1N $NH_4OH$ solution for 1 hour, and washed with excess water.

The wet resin was used for metal total capacity test. A small portion of final resin was soaked in a 20% solution of ferric ammonium sulfate and copper sulfate for 1 h, colored beads were filtered and washed with excess water, soaked in water for 1 h, filtered again, and dried in a vacuum oven. The dry colored beads loaded with Fe and Cu were analyzed for metal ions by ICP-OES (Inductively coupled plasma-optical emission spectrometry). The metal capacity for Fe is 0.1 mmol per gram of dry resin. The loading for Cu was higher at 0.32 mmol per gram of dry resin.

Example 4

A 9-membered macrocyclic chelate compound, also referred to as XP-316, was prepared according to the following process.

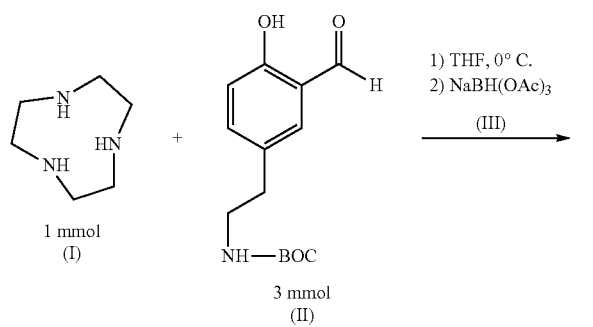

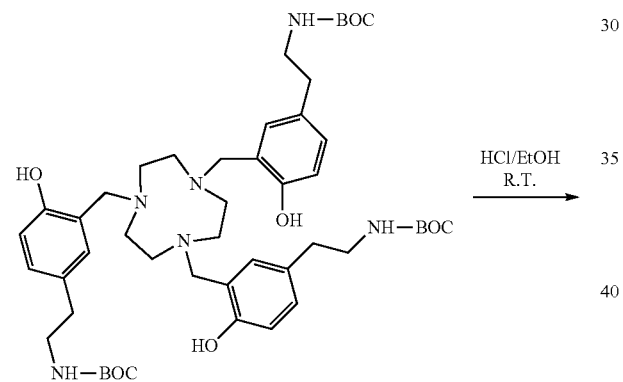

The chelate compound, XP-316, was made from a reductive amination reaction between TACN (I) and BOC-Tyramine aldehyde (II). In a 3-neck under argon is added BOC-tyramine aldehyde (15.92 g, 60 mmol), TACN (2.58 g, 20 mmol) and anhydrous THF (100 g), purged with argon, sealed, and stirred overnight (pale yellow color forms after few hours). To the resultant solution was added 2.2 g of solid sodium triacetoxyhydroborate every 30 minutes (total of 7 additions, 15.3 g) and the mixture was stirred for an additional 5 hours. Next, 50 to 100 mL of water was added, and the pH was adjusted to 8 to 9 by the slow addition of 25% NaOH. The organics were extracted by 3× EtOAc, washed with 3× water and dried over magnesium sulfate. Column purification was required to obtain a purity of >98%. To remove the BOC protecting groups the dark yellow oil from the previous step was dissolved in 100 g EtOH, 220 g concentrated HCl (32-35%) was added to the solution, and the mixture was stirred overnight at room temperature. The fully deprotected chelate compound, XP-316, was obtained with quantitative conversion yield to the desired salt with three protonated amino linking groups.

Example 5

A metal-chelating resin was prepared using the 9-membered ring macrocyclic chelate compound of Example 4 (XP-316) according to the following process.

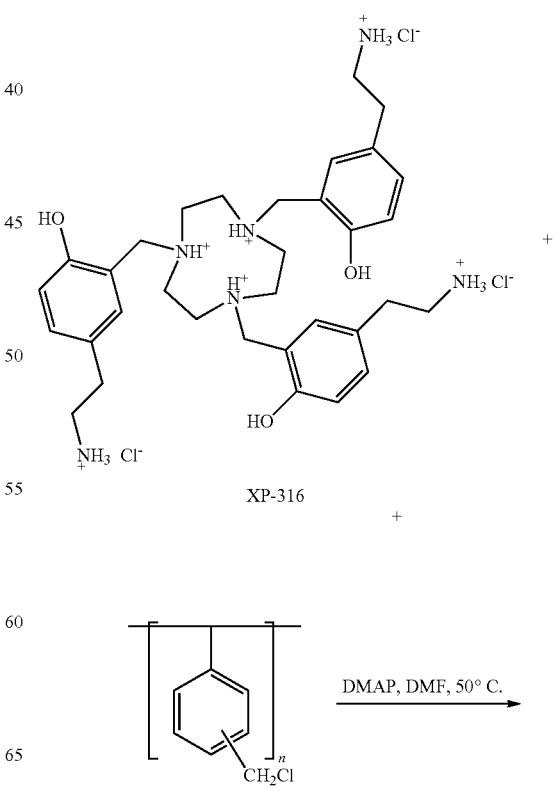

-continued

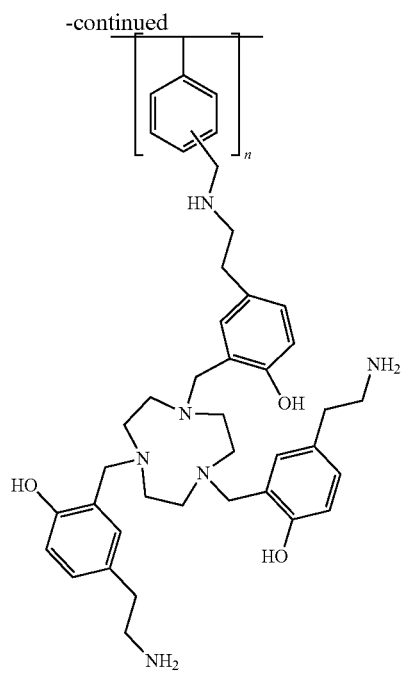

1 g chloromethylated polystyrene beads from Hecheng (70-150 mesh, 3.3 mmol Cl per gram dry resin) was soaked in 5 mL purified dimethylformamide (DMF) for 3 hours. Next, 6.8 g of the chelate compound of Example 5 (XP-316) (9.9 mmol) was dissolved in 50 mL DMF, and 7.26 g 4-dimethylaminopyridine (59.4 mmol) was added and the mixture was stirred for 1 hour. DMF was decanted from the resin, and solution of the chelate compound of Example 5 was added and gently stirred at 50° C. for 12 hours. The resin beads were washed with 3× EtOH, 3× water, and dried in the vacuum oven at 50° C. overnight. Elemental analysis for N showed 0.32 mmoles of chelate loaded on 1 gram of dry resin. Total capacity test for Fe and Cu showed 0.15 mmol Cu and 0.08 mmol Fe per gram of dry resin.

Testing

1. Stability of Metal-Chelating Resin of Example 3 with the Beads Loaded with Iron.

0.3 g of the metal-chelating resin of Example 3 was soaked in water and then 2 mL of 20% ferric ammonium sulfate solution was added. The resin beads turned to red as a result of forming an Fe complex with the chelate compound on the resin. These beads were kept in the solution for 1 hour and filtered and washed with excess water, soaked in water and filtered and washed with water again to remove excess metal ions. One third of this sample was transferred to another vial and 2 mL 25% TMH was added to it. To a second metal chelate resin sample, 2 mL of 10% HCl was added. After 48 hours, all three samples including control, TMH, and HCl samples were filtered and washed with excess water and dried in the vacuum oven. The samples were analyzed for Fe metal by ICP techniques. Fe content for control sample was 0.3 wt. %. While Fe loaded resin soaked in TMH did not show any leaching for Fe (0.29 wt. %), beads soaked in HCl lost about 15% of their Fe content and the Fe level went down to 0.255 wt. %.

2. Stability of the Chelating Compound of Example 4 at Extreme pH.

In one example an Fe complex of the chelate compound of Example 4 was made in water, and 3×1 mL of the solution was transferred to 3 small vials. One vial was kept as control sample. A second vial was added 1 mL 25% TMH and a third vial was added 1 mL 20% HCl. These samples were kept at 25° C. and tested for the presence of related peak to the iron complex of the chelate. A same series of samples were made and kept at 45° C. As shown in FIG. 2, the samples kept at room temperature showed good stability over time proving that the metal complex of chelate was stable at extreme pH at room temperature. As shown in FIG. 3, the hot HCl sample did not show the related peak for the metal complex at 475 nm.

3. Comparing the Metal-Chelating Resin of Example 3 with Commercially Available IEX Resins for Removal of Fe.

The metal-chelating resin of Example 3 was evaluated by equilibration against the commercially available resins Lewatit TP 208 (Lanxess), Lewatit TP 260 (Lanxess) and WK40 (Mitsubishi) for 24 hours with a test TMH solution containing 4.5 ppb Fe. By measuring the Ferric ion content in TMH solution over time the chelate efficiency was compared for the resins. As shown in FIG. 4, the metal-chelating resin of Example 3 was both more efficient and more effective in removing Fe as compared with the commercially available resins.

Example 6

A metal-chelating resin with a 12-membered ring chelate compound was prepared having the following structure.

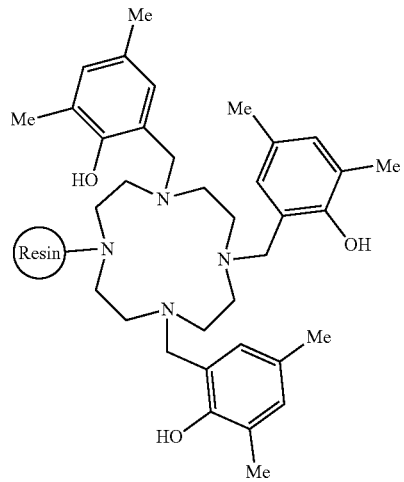

First, 9.0 mmol of purified (98%) cyclic chelate (cyclen (1,4,7,10-tetraazacyclododecane), 1.55 g, fw=172.276) was suspended in 20 mL of THF at ambient temperature and stirred for 1 hour to provide a cyclen solution. Next, 1.0 g of activated (chloromethylated), crosslinked, porous polystyrene resin beads (Tianjin Nankai Hecheng S&T Co.) (3.0 mmol/g active organic chlorine, 0.2 to 0.6 mm particle size) were suspended by gentle stirring in 10 mL of dry, high purity THF solvent at room temperature under argon for a period of about 12 hours. The resin was recovered by suction filtration and added to the cyclen solution.

The mixture was purged with argon and heated at 50° C. with gentle stirring for a period of 24 hours. The mixture was cooled to ambient temperature, and the resin was then collected by filtration. The supernatant THF solution was retained in order to recover the unreacted chelate for future use. The resin was washed with 3×16 mL of reagent grade THF, 3×16 mL of purified water, 3×16 mL of absolute ethanol and then dried under vacuum at 40° C. overnight. This resin that was functionalized with the cyclen chelate was used for the next reaction.

MeOH: Methanol Solvent

To facilitate the Mannich reaction on the solid surface of the cyclen resin, the reaction was carried out in two steps. First, 1.0 g of the cyclen resin (1.5 mmol cyclen per 1 g dry resin) was suspended by gentle stirring in 10 mL of dry, high purity MeOH solvent at room temperature under argon for a period of about 12 hours. Next, 18 mmol paraformaldehyde (0.54 g, FW=30.03) was added to the suspension containing the functionalized resin in MeOH and gently stirred and refluxed for 12 hours. To this mixture, 9.0 mmol 2,4-dimethylphenol (1.1 g, FW=122.17) was added and refluxed for 12 hours.

The mixture was cooled to ambient temperature, and the resin was washed with 3×16 mL of reagent grade MeOH, 3×16 mL of purified water, 3×16 mL of absolute ethanol, 3×16 mL of 1.0 M aqueous hydrochloric acid, 3×16 mL purified water, 3×16 mL of 1.0 M aqueous sodium carbonate and finally washed with 3×16 mL of purified water. The beads were then suspended in 16 mL of a 2.0 M aqueous copper (II) acetate solution. Next, the beads were gently stirred for a period of about 4 hours at about 30° C. The colored beads were collected by filtration, washed with 3×16 mL of purified water and then washed with 3×16 mL methanol. The damp resin beads were dried by passing dry $N_2$ through the filter that contained the beads.

The resin beads that contained the immobilized chelate were subsequently washed with 3×16 mL of 6.0 M aqueous hydrochloric acid in order to remove the chelated copper. The supernatant hydrochloric acid solution was retained, weighed, analyzed for copper content, and then the copper-binding capacity was calculated. Upon demetallation, the color of the chelating resin changed from medium green to a very pale yellow in color. The resin was then washed with 3×16 mL of purified water, 3×16 mL of 1.0 M aqueous sodium hydroxide, 3×16 mL of purified water followed by resuspension in 16 mL of 2.0 M aqueous copper acetate solution. The resin beads were washed, regenerated and handled as before. The copper-binding capacity was measured again after one cycle of regeneration.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present formulations and are disclosed herein just as if each and every such sub-combination was individually and explicitly disclosed herein.

It will be understood that various modifications may be made to the embodiments disclosed herein. Therefore, the above description should not be construed as limiting, but merely as exemplifications of certain embodiments. For example, the functions described above and implemented as the best mode for operating the embodiments disclosed herein are for illustration purposes only. Other arrangements and methods may be implemented by those skilled in the art without departing from the scope and spirit of this invention. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A metal-chelating resin, comprising:
(a) a compound represented by Formula (I):

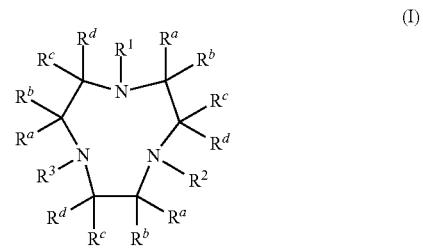

or a stereoisomeric form thereof or a salt thereof,
wherein
$R^1$, $R^2$ and $R^3$ are independently a protonated or deprotonated, substituted or unsubstituted 2-hydroxybenzyl moiety containing a linking group for covalently linking the compound of Formula (I) to an organic polymer resin; and
$R^a$, $R^b$, $R^c$ and $R^d$ are hydrogen; and
(b) an organic polymer resin comprising a styrenic polymer or copolymer having at least one complementary reactive functional group covalently linked with the at least one linking group of the compound represented by Formula (I).

2. The metal-chelating resin of claim 1, wherein the linking group is represented by the formula —$(CH_2)_x$—$NHR^5$ where x is 2 to 6, and $R^5$ is independently hydrogen, methyl or ethyl.

3. The metal-chelating resin of claim 2, wherein $R^5$ is hydrogen.

4. The metal-chelating resin of claim 2, wherein $R^5$ is methyl.

5. The metal-chelating resin of claim 1, wherein the compound of Formula (I) is represented by a structure of Formula (Ib):

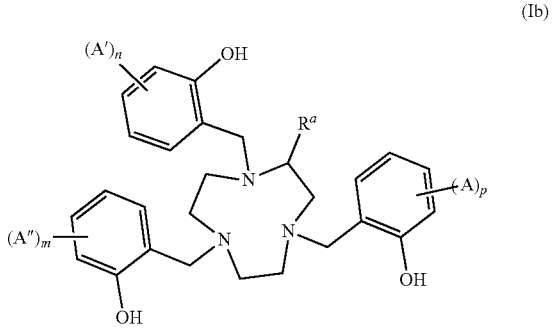

or a salt thereof, wherein m, n and p are independently an integer from 1 to 4, A, A', and A" are independently a linking group for covalently linking the compound of Formula (Ib) to the organic polymer resin and $R^a$ is hydrogen.

6. The metal-chelating resin of claim 5, wherein the linking group is represented by the structure —$(CH_2)x$—$NH_2$ where x is from 2 to 6.

7. A metal-chelating resin, comprising:
(a) a compound represented by Formula (II):

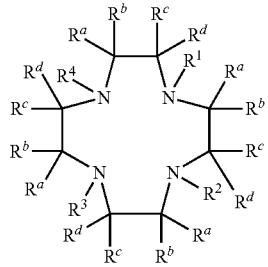

(II)

or a stereoisomeric form thereof or a salt thereof;
wherein
one of $R^1$, $R^2$, $R^3$ and $R^4$ is a protonated or deprotonated, substituted or unsubstituted 2-hydroxybenzyl moiety containing a linking group for covalently linking the compound of Formula (II) to an organic polymer resin, and the other ones of $R^1$, $R^2$, $R^3$ and $R^4$ are independently hydrogen, a protonated or deprotonated, substituted or unsubstituted 2-hydroxybenzyl moiety optionally containing a linking group for covalently linking the compound of Formula (II) to an organic polymer resin, a protonated or deprotonated, substituted or unsubstituted carboxyalkyl-containing moiety wherein the alkyl group is a substituted or unsubstituted methylene group or a substituted or unsubstituted ethylene group optionally containing a linking group for covalently linking the compound of Formula (II) to an organic polymer resin, a protonated or deprotonated, substituted or unsubstituted phosphonoalkyl-containing moiety wherein the alkyl group is a substituted or unsubstituted methylene group or a substituted or unsubstituted ethylene group optionally containing a linking group for covalently linking the compound of Formula (II) to an organic polymer resin or a protonated or deprotonated, substituted or unsubstituted hydroxyalkyl-containing moiety wherein the alkyl group is a substituted or unsubstituted ethylene group or a substituted or unsubstituted propylene group optionally containing a linking group for covalently linking the compound of Formula (II) to an organic polymer resin, wherein the 2-hydroxybenzyl moiety occurs no more than three times in the compound, and with the proviso that no more than one of $R^1$, $R^2$, $R^3$ and $R^4$ can be hydrogen;
$R^a$, $R^b$, $R^c$ and $R^d$ are independently R or a linking group for covalently linking the compound of Formula (II) to an organic polymer resin or wherein one of adjacent $R^a$ and $R^c$ or $R^a$ and $R^d$ or $R^b$ and $R^c$ or $R^b$ and $R^d$ are joined together to form a cis- or trans-cyclopentane moiety or a cis- or trans-cyclohexane moiety;
R is independently hydrogen, a substituted or unsubstituted hydrocarbyl group of from 1 to about 18 carbon atoms, a halogen, and a polar functional group;
wherein when one of $R^1$, $R^2$, $R^3$ and $R^4$ is not hydrogen then at least one linking group for covalently linking the compound of Formula (II) to an organic polymer resin occurs in the compound; and
(b) an organic polymer resin having at least one complementary reactive functional group covalently linked with the linking group of the compound represented by Formula (II).

8. The metal-chelating resin of claim 7, wherein the linking group is represented by the formula —$(CH_2)_x$—$NHR^5$ where x is 2 to 6, and $R^5$ is hydrogen.

9. The metal-chelating resin of claim 7, wherein the linking group is represented by the formula —$(CH_2)_x$—$NHR^5$ where x is 2 to 6, and $R^5$ is methyl.

10. The metal-chelating resin of claim 7, wherein the linking group is represented by the formula —$(CH_2)_x$—$NHR^5$ where x is 2 to 6, and $R^5$ is ethyl.

11. The metal-chelating resin of claim 7, wherein the protonated or deprotonated, substituted or unsubstituted 2-hydroxybenzyl moiety independently is a moiety represented by the structure of Formula (III) or a moiety represented by the structure of Formula (IV):

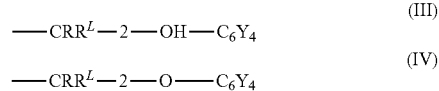

wherein R is independently hydrogen, a linear or branched $C_1$ to $C_4$ alkyl moiety, a linear or branched $C_1$ to $C_4$ hydroxyalkyl or a linear or branched $C_1$ to $C_4$ alkyl moiety containing one or more ether linkages, $R^L$ is the linking group for covalently linking the compound of Formula (II) to the organic polymer resin, and Y is hydrogen.

12. The metal-chelating resin of claim 11, wherein the linking group is represented by the formula —$(CH_2)_x$—$NHR^5$ where x is 2 to 6, and $R^5$ is hydrogen.

13. The metal-chelating resin of claim 11, wherein the linking group is represented by the formula —$(CH_2)_x$—$NHR^5$ where x is 2 to 6, and $R^5$ is methyl.

14. The metal-chelating resin of claim 11, wherein the linking group is represented by the formula —$(CH_2)_x$—$NHR^5$ where x is 2 to 6, and $R^5$ is ethyl.

15. The metal-chelating resin of claim 2, wherein $R^5$ is ethyl.

16. The metal-chelating resin of claim 1, wherein the protonated or deprotonated, substituted or unsubstituted 2-hydroxybenzyl moiety independently is a moiety represented by the structure of Formula (II) or a moiety represented by the structure of Formula (III):

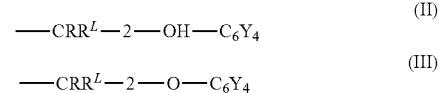

wherein R is independently hydrogen, a linear or branched $C_1$ to $C_4$ alkyl moiety, a linear or branched $C_1$ to $C_4$ hydroxyalkyl or a linear or branched $C_1$ to $C_4$ alkyl moiety containing one or more ether linkages, $R^L$ is the linking group for covalently linking the compound of Formula (I) to the organic polymer resin, and Y is hydrogen.

17. The metal-chelating resin of claim 16, wherein the linking group is represented by the formula —$(CH_2)_x$—$NHR^5$ where x is 2 to 6, and $R^5$ is hydrogen.

18. The metal-chelating resin of claim 16, wherein the linking group is represented by the formula —$(CH_2)_x$—$NHR^5$ where x is 2 to 6, and $R^5$ is methyl.

19. The metal-chelating resin of claim 16, wherein the linking group is represented by the formula —$(CH_2)_x$—$NHR^5$ where x is 2 to 6, and $R^5$ is ethyl.

* * * * *